US012580219B2

(12) United States Patent
    Kim et al.

(10) Patent No.:  US 12,580,219 B2
(45) Date of Patent:     Mar. 17, 2026

(54) BATTERY AND ELECTRONIC DEVICE COMPRISING SAME

(71) Applicant: SAMSUNG ELECTRONICS CO., LTD., Suwon-si (KR)

(72) Inventors: Guyeon Kim, Suwon-si (KR); Seongil Lee, Suwon-si (KR); Yongsub Jeon, Suwon-si (KR); Jooyil Pyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 487 days.

(21) Appl. No.: 18/099,725

(22) Filed: Jan. 20, 2023

(65) Prior Publication Data

US 2023/0155161 A1      May 18, 2023

Related U.S. Application Data

(63) Continuation of application No. PCT/KR2021/009501, filed on Jul. 22, 2021.

(30) Foreign Application Priority Data

Jul. 22, 2020    (KR) ........................ 10-2020-0091124

(51) Int. Cl.
    H01M 10/04        (2006.01)
    H01M 10/42        (2006.01)
          (Continued)

(52) U.S. Cl.
    CPC ................. H01M 10/0431 (2013.01); H01M 10/4235 (2013.01); H01M 50/531 (2021.01);
          (Continued)

(58) Field of Classification Search
    CPC ........... H01M 10/0431; H01M 10/422; H01M 10/045; H01M 50/586; H01M 50/588;
          (Continued)

(56) References Cited

U.S. PATENT DOCUMENTS 6,887,616 B2    5/2005  Kim et al.
7,824,794 B2 *  11/2010  Kim .................. H01M 10/0431
                                                          429/161
          (Continued)

FOREIGN PATENT DOCUMENTS

CN        108028433 A     5/2018
CN        110088972 A     8/2019
          (Continued)

OTHER PUBLICATIONS

International Search Report (PCT/ISA/210) dated Nov. 18, 2021 issued by the International Searching Authority in International Application No. PCT/KR2021/009501.

(Continued)

*Primary Examiner* — Raymond Alejandro
(74) *Attorney, Agent, or Firm* — Sughrue Mion, PLLC

(57)        ABSTRACT

A battery includes: a positive electrode including a positive electrode substrate having a first surface and a second surface, a positive active material applied to the first surface of the positive electrode substrate, and a positive electrode tab attached to the first surface of the positive electrode substrate; a negative electrode including a negative electrode substrate having a first surface and a second surface, a negative active material applied to the first surface of the negative electrode substrate, and a negative electrode tab attached to the first surface of the negative electrode substrate; and a separator provided between the positive electrode and the negative electrode, wherein the first surface of the negative electrode substrate includes a first region to which the negative active material is not applied and which faces the positive electrode tab, the first surface of the negative electrode substrate includes a second region to which the negative active material is applied and which is adjacent to the first region in a longitudinal direction of the positive electrode tab, and the negative electrode includes an (Continued)

insulating layer disposed in at least a portion of the first region.

8 Claims, 31 Drawing Sheets

(51) Int. Cl.

| | |
|---|---|
| *H01M 50/531* | (2021.01) |
| *H01M 50/586* | (2021.01) |
| *H01M 50/59* | (2021.01) |

(52) U.S. Cl.

CPC ......... *H01M 50/586* (2021.01); *H01M 50/59* (2021.01); *H01M 2220/30* (2013.01)

(58) Field of Classification Search

CPC .............. H01M 50/531; H01M 50/59; H01M 50/597; H01M 10/4235; H01M 2220/30

See application file for complete search history.

(56) References Cited

U.S. PATENT DOCUMENTS

| | | | |
|---|---|---|---|
| 8,293,410 B2 | 10/2012 | Kim | |
| 8,557,423 B2 | 10/2013 | Lee et al. | |
| 8,628,876 B2 | 1/2014 | Kim et al. | |
| 9,048,489 B2 | 6/2015 | Oh et al. | |
| 9,178,204 B2* | 11/2015 | Moon | ................. H01M 50/572 |
| 9,240,617 B2 | 1/2016 | Kim | |
| 10,388,952 B2 | 8/2019 | Park et al. | |
| 2006/0051662 A1 | 3/2006 | Kwak et al. | |
| 2006/0257732 A1* | 11/2006 | Yageta | .............. H01M 50/1243 |
| | | | 429/162 |
| 2012/0321924 A1 | 12/2012 | Ahn | |
| 2018/0183059 A1 | 6/2018 | Park et al. | |
| 2018/0241026 A1 | 8/2018 | Shibutani et al. | |
| 2020/0144624 A1 | 5/2020 | Zheng et al. | |
| 2021/0265708 A1 | 8/2021 | Lim et al. | |

FOREIGN PATENT DOCUMENTS

| | | |
|---|---|---|
| CN | 110729447 A | 1/2020 |
| JP | 2006-302509 A | 11/2006 |
| KR | 10-2005-0123366 A | 12/2005 |
| KR | 10-2012-0095039 A | 8/2012 |
| KR | 10-2012-0139362 A | 12/2012 |
| KR | 10-1386079 B1 | 4/2014 |
| KR | 10-2018-0074178 A | 7/2018 |
| KR | 10-2097107 B1 | 4/2020 |
| WO | 2019/103008 A1 | 5/2019 |

OTHER PUBLICATIONS

Written Opinion (PCT/ISA/237) dated Nov. 18, 2021 issued by the International Searching Authority in International Application No. PCT/KR2021/009501.

Office Action dated Feb. 18, 2025, issued by Korean Intellectual Property Office in Korean Patent Application No. 10-2020-0091124.

Communication issued on Sep. 27, 2024 by the European Patent Office in European Patent Application No. 21845657.2.

Communication issued Oct. 24, 2025 by the Korean Ministry of Intellectual Property in Korean Patent Application No. 10-2020-0091124.

Communication issued on Jan. 9, 2026 by the China National Intellectual Property Administration in in Chinese Patent Application No. 202180059445.5.

\* cited by examiner

BATTERY AND ELECTRONIC DEVICE COMPRISING SAME

CROSS-REFERENCE TO RELATED APPLICATIONS

This application is a by-pass continuation of International Application No. PCT/KR2021/009501, filed on Jul. 22, 2021, which is based on and claims priority to Korean Patent Application No. 10-2020-0091124, filed on Jul. 22, 2020, in the Korean Intellectual Property Office, the disclosures of which are incorporated by reference herein in their entireties.

BACKGROUND

1. Field

The disclosure relates to a battery and an electronic device including the same.

2. Description of Related Art

Recently, the demand for batteries is increasing due to an increase in the demand for portable electronic devices. For example, among various types of batteries, a lithium-ion battery is widely used in portable electronic devices due to advantages such as high energy density, high discharge voltage, and output stability.

A lithium-ion battery may include a negative electrode substrate to which a negative active material is applied, a positive electrode substrate to which a positive active material is applied, and a separator disposed between the negative electrode substrate and the positive electrode substrate.

One research subject in the field of batteries is improvement of safety. Lithium-ion batteries, which are commonly used in portable electronic devices, may cause accidents such as fire and explosion due to various factors such as an internal short, exceeding the allowed current (or voltage) during charging, temperature rise, and external shock.

In the related art, in order to prevent the above-mentioned accidents, in the active material (a positive active material or a negative active material) applied to an electrode plate (a positive electrode substrate or a negative electrode substrate), the active material in facing region (hereinafter, a "facing region") facing a tab (a positive electrode tab or a negative electrode tab) is removed. However, the facing region from which the active material was removed may cause pressure imbalance during the manufacturing process of the battery due to a difference in thickness between the facing region from which the active material is removed and the remaining region to which the active material is applied. In addition, in the facing region from which the active material is removed, resistance may be locally increased. Such an increase in local resistance may cause accumulation of lithium (Li) in the electrolyte, which may eventually lead to swelling of the battery.

SUMMARY

Provided are a battery in which the thickness of the facing region from which the active material is removed is made to be uniform with the thickness of the other region to which the active material is applied, so that safety of the battery may be improved, and an electronic device including the battery.

According to an aspect of the disclosure, a battery includes: a positive electrode including a positive electrode substrate having a first surface and a second surface, a positive active material applied to the first surface of the positive electrode substrate, and a positive electrode tab attached to the first surface of the positive electrode substrate; a negative electrode including a negative electrode substrate having a first surface and a second surface, a negative active material applied to the first surface of the negative electrode substrate, and a negative electrode tab attached to the first surface of the negative electrode substrate; and a separator provided between the positive electrode and the negative electrode, wherein the first surface of the negative electrode substrate includes a first region to which the negative active material is not applied and which faces the positive electrode tab, the first surface of the negative electrode substrate includes a second region to which the negative active material is applied and which is adjacent to the first region in a longitudinal direction of the positive electrode tab, and the negative electrode includes an insulating layer disposed in at least a portion of the first region.

The insulating layer may include a first insulating layer disposed from the first region up to a peripheral region of the second region within a predetermined range from the first region.

The insulating layer may include a second insulating layer disposed in the first region.

An end of the positive electrode substrate and an end of the negative electrode substrate may not overlap.

The battery may further include a plurality of turn regions including a first turn region and a second turn region, and the positive electrode substrate, the separator, and the negative electrode substrate are wound in a jelly-roll type configuration.

The first region to which the negative active material is not applied may be disposed in a turn region, from among the plurality of turn regions, that is adjacent to a different turn region from among the plurality of turn regions, and the positive electrode tab may be disposed in the different turn region.

On the second surface of the negative electrode substrate, the negative active material may not be applied to a region corresponding to the first region.

According to an aspect of the disclosure, an electronic device includes: a memory; a processor; and a battery configured to supply power to the memory and the processor, wherein the battery includes: a positive electrode including a positive electrode substrate having a first surface and a second surface, a positive active material applied to the first surface of the positive electrode substrate, and a positive electrode tab attached to the first surface of the positive electrode substrate; a negative electrode including a negative electrode substrate having a first surface and a second surface, a negative active material applied to the first surface of the negative electrode substrate, and a negative electrode tab attached to the first surface of the negative electrode substrate; and a separator located between the positive electrode and the negative electrode, wherein the first surface of the negative electrode substrate includes a first region to which the negative active material is not applied and which faces the positive electrode tab, wherein the first surface of the negative electrode substrate includes a second region to which the negative active material is applied and which is adjacent to the first region in a longitudinal direction of the positive electrode tab, and wherein the negative electrode further includes an insulating layer disposed in at least a portion of the first region.

The insulating layer may include a first insulating layer disposed from the first region up to a peripheral region of the second region within a predetermined range from the first region.

The insulating layer may include a second insulating layer disposed in the first region.

The insulating layer may further include a third insulating layer disposed up to a peripheral region of the second region within a predetermined range from the first region and covering the first region in which the second insulating layer is disposed.

The insulating layer may include an insulative material.

The insulating layer may have a thickness corresponding to a thickness of the negative active material surrounding the first region.

The first surface of the positive electrode substrate further may include a third region and a fourth region, the positive active material may not be applied to the third region and the third region faces the negative electrode tab, the positive active material may be applied to the fourth region and the fourth region may be adjacent to the third region in a longitudinal direction of the negative electrode tab, and the positive electrode further may include an insulating layer disposed in at least a portion of the third region.

The third region to which the positive active material is not applied may be disposed in a turn region adjacent to a different turn region, and the negative electrode tab may be disposed in the different turn region.

According to one or more embodiments of the disclosure, a battery and an electronic device including the same are configured such that the thickness of the facing region from which the active material is removed is made to be uniform with the thickness of the other region to which the active material is applied, so that pressure during the manufacturing process of the battery may be uniformly transferred, an increase in local resistance generated in the facing region from which the active material is removed may be suppressed, and a dendrite phenomenon of the battery may be prevented.

In addition, various effects directly or indirectly identified through the disclosure may be provided.

BRIEF DESCRIPTION OF THE DRAWINGS

The above and other aspects, features, and advantages of example embodiments of the present disclosure will be more apparent from the following description taken in conjunction with the accompanying drawings, in which.

In relation to the description of drawings, the same reference numbers may be assigned to the same or corresponding components.

DETAILED DESCRIPTION

Hereinafter, various embodiments of the disclosure will be described with reference to the accompanying drawings. However, it shall be understood that it is not intended to limit the disclosure to specific embodiments, and that the disclosure includes various modifications, equivalents, and/or alternatives of the embodiments of the disclosure.

Figure 1A:
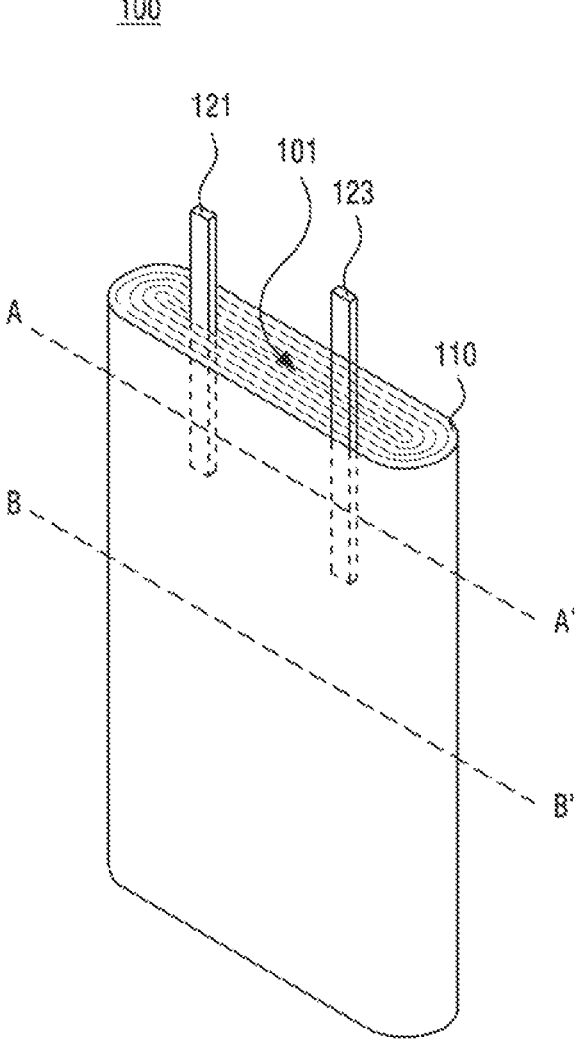
FIG. 1A is a perspective view schematically illustrating a battery according to various embodiments.
Figure 1B:
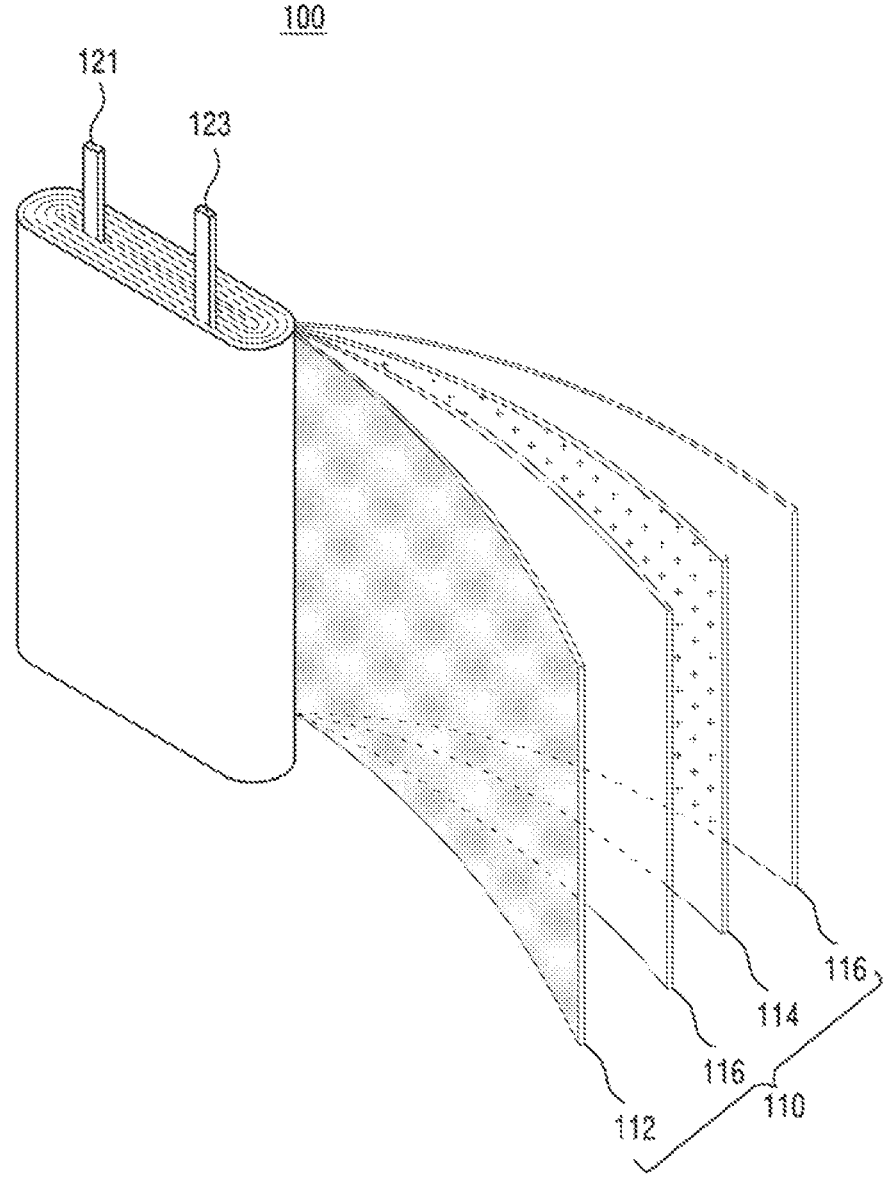
FIG. 1B is a perspective view schematically illustrating the battery in which some components according to various embodiments are exposed.

FIG. 1A is a perspective view schematically illustrating a battery according to various embodiments of the disclosure. FIG. 1B is a perspective view schematically illustrating the battery in which some components according to various embodiments are exposed.

Referring to FIGS. 1A and 1B, the battery 100 may include an electrode assembly 110 including a positive electrode 112, a separator 116, and a negative electrode 114. In an embodiment, the electrode assembly 110 may be in a form of being sequentially wound from the central region 101 of the battery 100.

According to an embodiment, the positive electrode 112 may include a positive electrode substrate, a positive active material applied to one surface of the positive electrode substrate, and a positive electrode tab 121 attached to the one surface.

According to an embodiment, the negative electrode 114 may include a negative electrode substrate, a negative active material applied to one surface of the negative electrode substrate, and a negative electrode tab 123 attached to one surface of the negative electrode substrate.

According to an embodiment, the separator 116 may be located between the positive electrode 112 and the negative electrode 114.

According to an embodiment, the positive electrode substrate may be, for example, a metal made of aluminum, stainless steel, titanium, copper, silver, or a combination of materials selected from these. A positive active material may be applied to the surface of the positive electrode substrate. For example, the positive active material may be applied to each of both surfaces of the positive electrode substrate.

According to an embodiment, the positive active material may be made of a material capable of reversibly intercalating and deintercalating lithium ions. For example, the positive active material may include at least one material selected from a group consisting of a lithium transition metal oxide such as a lithium cobalt oxide, a lithium nickel oxide, a lithium nickel cobalt oxide, a lithium nickel cobalt aluminum oxide, a lithium nickel cobalt manganese oxide, a lithium manganese oxide, and a lithium iron phosphate, a nickel sulfide, a copper sulfide, sulfur, an iron oxide, and a vanadium oxide. According to an embodiment, the positive active material may be applied to both surfaces of the positive electrode substrate.

According to an embodiment, a binder and a conductive additive may be further applied to a surface of the positive electrode substrate in addition to the positive active material.

The binder may include at least one material selected from a group consisting of a polyvinylidene fluoride-containing binder such as a polyvinylidene fluoride, a vinylidene fluoride/hexafluoropropylene copolymer, a carboxymethyl cellulose-containing binder such as sodium-carboxymethyl cellulose and lithium-carboxymethyl cellulose, an acrylate-containing binder such as a polyacrylic acid, a lithium-polyacrylic acid, an acrylic, a polyacrylonitrile, a polymethyl methacrylate, and a polybutylacrylate, a polyimide-imide, a polytetrafluoroethylene, a polyethylene oxide, a polypyrrole, a lithium-Nafion, and a styrene butadiene rubber-containing polymer.

According to an embodiment, the conductive material may include at least one material selected from a group consisting of a carbon-containing conducting agent such as carbon black, carbon fiber, and graphite, conductive fiber such as metal fiber, metal powder such as carbon fluoride powder, metal powder such as carbon fluoride powder, aluminum powder, and nickel powder, conductive whisker such as zinc oxides and potassium titanate, a conductive metal oxide such as a titanium oxide, and a conductive polymer such as a polyphenylene derivative.

According to an embodiment, the positive electrode tab 121 may be attached to one end of the positive electrode substrate by, for example, ultrasonic welding. For example, the positive electrode tab 121 may be disposed at one end along the longitudinal direction of the positive electrode substrate. One end of the positive electrode substrate to which the positive electrode tab 121 is attached may be disposed adjacent to a starting point where the winding of the electrode assembly 110 starts. For example, one end of the positive electrode substrate to which the positive electrode tab 121 is attached may be disposed adjacent to the central region 101 of the battery 100. Alternatively, the positive electrode tab 121 may include a plurality of positive electrode tabs 121, and the plurality of positive electrode tabs 121 may be disposed at specific intervals along the longitudinal direction of the positive electrode substrate.

According to an embodiment, the negative electrode substrate may include, for example, at least one metal selected from a group consisting of copper, stainless steel, nickel, aluminum, and titanium. A negative active material may be applied to the surface of the negative electrode substrate. For example, the negative active material may be applied to each of both surfaces of the negative electrode substrate.

According to an embodiment, the negative active material may be made of a material capable of forming an alloy together with lithium or a material capable of reversibly intercalating and deintercalating lithium. For example, the negative active material may include at least one material selected from a group consisting of a metal, a carbon-containing material, a metal oxide, and a lithium metal nitride. According to an embodiment, the negative active material may be applied to both surfaces of the negative electrode substrate.

According to an embodiment, the metal may include at least one material selected from a group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

According to an embodiment, the carbon-containing material may include at least one material selected from a group consisting of graphite, graphite carbon fiber, coke, mesocarbon microbeads (MCMBS), polyacene, pitch-derived carbon fibers, and hard carbon.

According to an embodiment, the metal oxide may include at least one selected from a group consisting of a lithium titanium oxide, a titanium oxide, a molybdenum oxide, a niobium oxide, an iron oxide, a tungsten oxide, a tin oxide, an amorphous tin oxide composite, a silicon monoxide, a cobalt oxide, and a nickel oxide.

According to an embodiment, a binder and a conductive material may be further applied to a surface of the negative electrode substrate in addition to the negative active material. The binder and the conductive material may be the same as or similar to the binder and the conductive material applied to the positive electrode substrate.

According to an embodiment, the negative electrode tab 123 may be attached to one end of the negative electrode substrate. For example, the negative electrode tab 123 may be disposed at one end along the longitudinal direction of the negative electrode substrate. One end of the negative electrode substrate to which the negative electrode tab 123 is attached may be disposed adjacent to a starting point where the winding of the electrode assembly 110 starts. For example, one end of the negative electrode substrate to which the negative electrode tab 123 is attached may be disposed adjacent to the central region 101 of the battery 100. Alternatively, the negative electrode tab 123 may include a plurality of negative electrode tabs 123, and the plurality of negative electrode tabs 123 may be disposed at specific intervals along the longitudinal direction of the negative electrode substrate.

According to an embodiment, the separator 116 may be disposed between the positive electrode substrate and the negative electrode substrate to insulate the positive electrode substrate and the negative electrode substrate from each other. The separator 116 may be made of, for example, a porous polymer membrane such as a polyethylene or polypropylene membrane.

Figure 2:
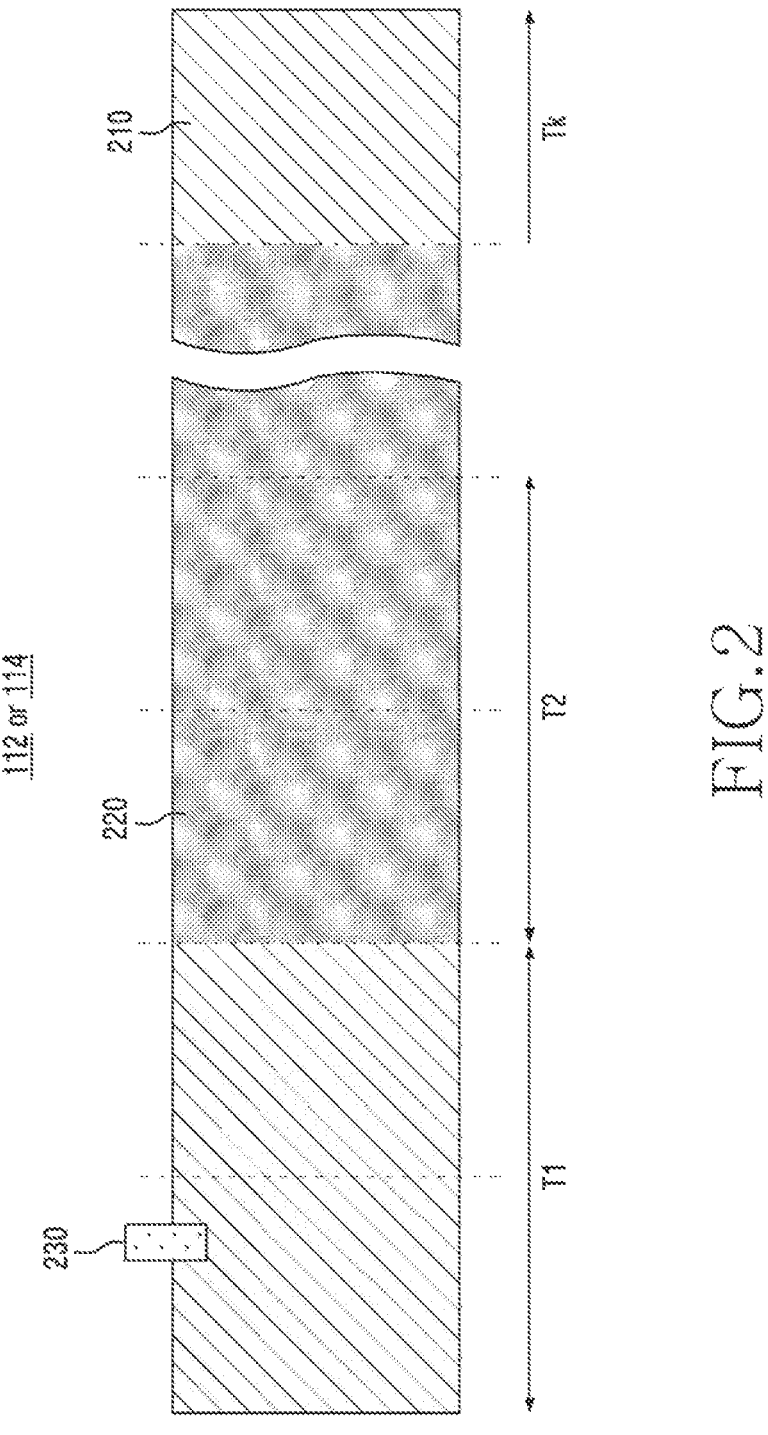
FIG. 2 is a plan view illustrating one surface of a positive electrode substrate or a negative electrode substrate according to an embodiment in an unwound state.

FIG. 2 is a plan view illustrating one surface of a positive electrode substrate or a negative electrode substrate according to an embodiment in an unwound state.

Referring to FIG. 2, each of the positive electrode substrate 112 and the negative electrode substrate 114 according to an embodiment may be of a normal type in which an active material 220 (e.g., a positive active material or a negative active material) is not applied to an end of the substrate 210 (e.g., the positive electrode substrate 112 or the negative electrode substrate 114) provided with an electrode tab 230 (e.g., the positive electrode tab 121 or the negative electrode tab 123).

For example, FIG. 2 may be a plan view illustrating one surface of the positive electrode substrate 112.

According to an embodiment, the positive electrode tab 230 may be attached to one end of the positive electrode substrate 210, and the positive active material 220 may not be applied around the region to which the positive electrode tab 230 is attached. For example, a positive uncoated region to which the positive active material 220 is not applied may be provided at each end of the positive electrode substrate 210. Accordingly, the positive active material 220 may not be applied to one end of the positive electrode substrate 210 to which the positive electrode tab 230 is attached.

According to an embodiment, the electrode assembly 110 in which the positive electrode substrate 210, the separator, and the negative electrode substrate 114 are stacked may be wound k times (k is an integer) from the central region 101 of the battery 100, and may include first to $k_{th}$ turn regions T1 to Tk depending on the number of windings. For example, the first turn region T1 may be a region in which the electrode assembly 110 is first wound to form a first turn, the second turn region T2 may be a region in which the electrode assembly 110 forms the second turn while enclosing the periphery of the first turn region T2, and the $k^{th}$ region Tk may be a region in which the electrode assembly 110 forms the $k^{th}$ turn while being wound last. In FIG. 2, the dotted lines indicated in the vertical direction may indicate regions where the electrode assembly 110 is bent while being wound.

Referring to FIG. 2, the positive electrode substrate 210 according to an embodiment may be provided with a positive uncoated region to correspond to the first turn region of the electrode assembly 110, and a positive uncoated region may be provided to correspond to at least a portion of the $k^{th}$ turn region of the electrode assembly 110.

FIG. 2 may be a plan view illustrating one surface of the negative electrode substrate 114.

According to an embodiment, the negative electrode tab 230 may be attached to one end of the negative electrode substrate 210, and the negative active material 220 may not be applied around the region to which the negative electrode tab 230 is attached. For example, a negative uncoated region to which the negative active material 220 is not applied may be provided at each end of the negative electrode substrate 210. Accordingly, the negative active material 220 may not be applied to one end of the negative electrode substrate 210 to which the negative electrode tab 230 is attached.

According to an embodiment, like the positive electrode substrate 112, the negative electrode substrate 210 may be provided with a negative uncoated region to correspond to the first turn region of the electrode assembly 110, and a negative uncoated region may be provided to correspond to at least a portion of the $k^{th}$ turn region of the electrode assembly 110.

In general, when the battery 100 receives an external shock or is charged abnormally, a short circuit phenomenon may occur in at least some regions, and when a short circuit occurs, large current unintended during design may flow. When large current flows through the positive electrode tab 121, the temperature of the positive electrode tab 121 may increase, and the separator 116 around the positive electrode tab 121 may be contracted or deformed by the heat of the positive electrode tab 121. In addition, since the positive electrode tab 121 or the negative electrode tab 123 forms a step in the substrate, when an external shock or external pressure is applied, deformation such as tearing of the separator 116 may occur. When the separator 116 is contracted or deformed, at least a portion of the positive electrode substrate 112 and at least a portion of the negative electrode substrate 114 may be short-circuited. When the positive electrode tab 121 and the negative active material are in contact with each other, a safety accident in which the battery 100 ignites or explodes due to a rapid increase in current may occur. According to various embodiments of the disclosure, in order to prevent ignition or explosion of the battery 100 due to the above problem, in the state in which the electrode assembly 110 is wound, the negative uncoated region and the positive electrode tab 121 may be disposed to overlap each other, and the positive uncoated region and the negative electrode tab 123 may be disposed to overlap each other.

According to various embodiments of the disclosure, since the negative uncoated region and the positive electrode tab 121 are disposed to overlap each other, even if the peripheral separator is deformed due to heat generated from the positive electrode tab 121 or the step occurring due to the positive electrode tab 121, the positive electrode tab 121 is brought into contact with the negative uncoated region rather than the negative active material, which may make it possible to prevent ignition or explosion of the battery 100. According to various embodiments of the disclosure, since the positive uncoated region overlaps the negative electrode tab, even if deformation such as tearing of the separator due to the step occurring due to the negative electrode tab, the negative electrode tab is brought into contact with the positive uncoated region rather than the positive active material, which may make it possible to prevent ignition or explosion of the battery 100.

Figure 3:
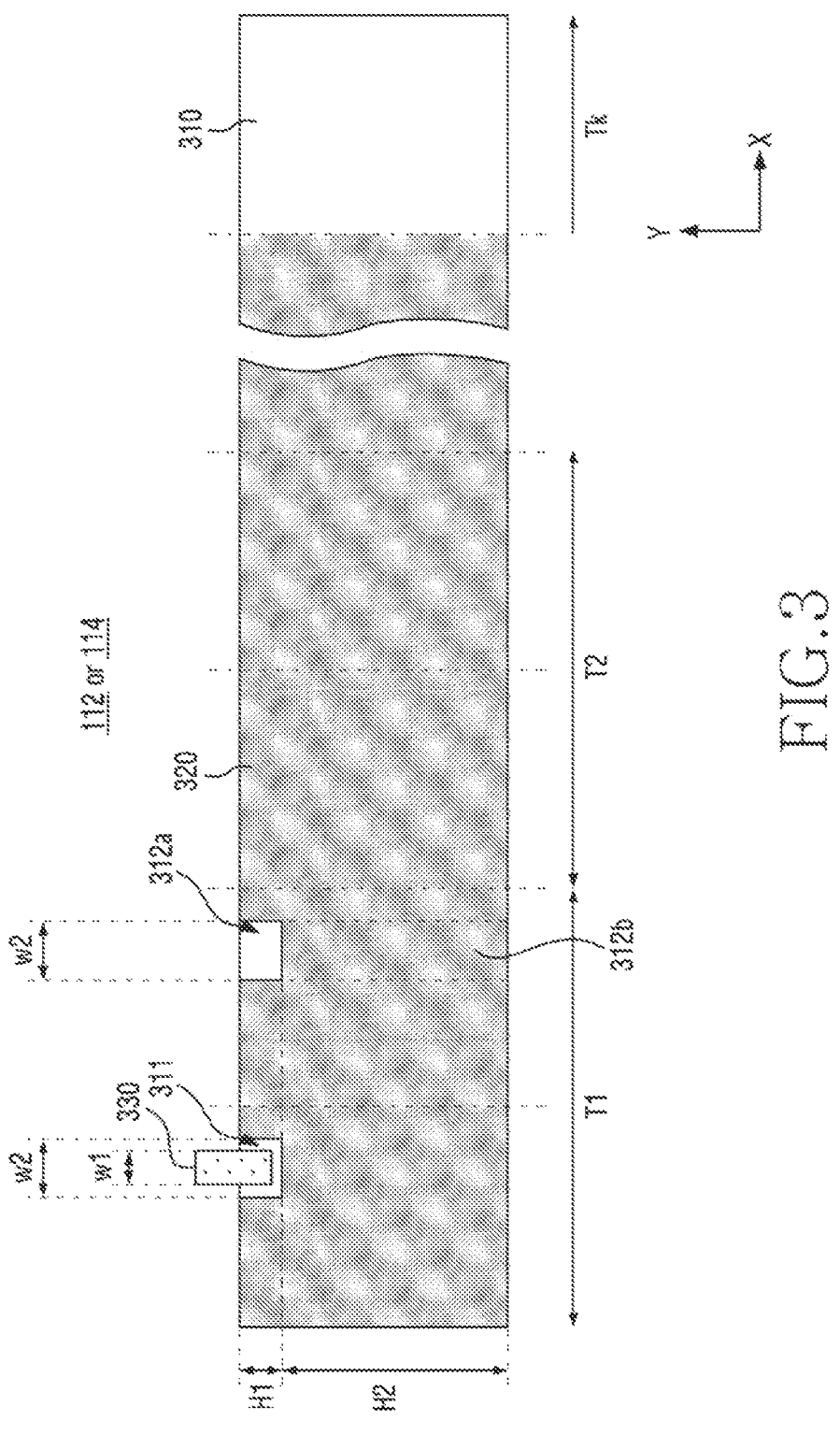
FIG. 3 is a plan view of a positive electrode substrate or a negative electrode substrate according to another embodiment.

FIG. 3 is a plan view of a positive electrode substrate or a negative electrode substrate according to another embodiment.

Referring to FIG. 3, each of the positive electrode substrate 112 and the negative electrode substrate 114 according to another embodiment may be of an expanded type in which an active material 320 (a positive active material or a negative active material) is applied up to an end of the substrate 310 (the positive electrode substrate 112 or the negative electrode substrate 114) provided with an electrode tab 330 (the positive electrode tab 121 or the negative electrode tab 123). In the battery 100 in which the positive electrode substrate 112 or the negative electrode substrate 114 is configured in an expanded type, the active material application area increases, and thus, the charging capacity may increase compared to the normal type illustrated in FIG. 2.

For example, FIG. 3 may be a plan view illustrating one surface of the positive electrode substrate 112 or the negative electrode substrate 114.

According to various embodiments, the positive active material 320 is applied to one end of the positive electrode substrate 310 to which the positive electrode tab 330 is attached, wherein an attachment region to which the positive electrode tab 330 is attached, the region 311 surrounding the attachment region, and a region 312*a* overlapping or facing the negative electrode tab may be a positive uncoated region on which the positive active material 320 is not applied. For example, the first turn region T1 to which the positive electrode tab 330 is attached may be divided into a positive uncoated region to which the positive electrode tab 330 is attached and the positive active material 320 is not applied, and a positive active material region to which the positive active material 320 is applied.

According to various embodiments, the positive uncoated regions 311 and 312*a* in the first turn region T1 may include a tab-peripheral region 311 disposed to surround the region to which the positive electrode tab 330 is attached, and a first region 312*a* disposed to overlap or face the negative electrode tab when the electrode assembly (e.g., the electrode assembly 110 in FIG. 1A or FIG. 1B) is wound. According to an embodiment, the width W2 of each of the tab-peripheral region 311 and the first region 312*a* in the longitudinal direction (the X direction in the drawing) of the positive electrode substrate 112 may be greater than the width W1 of the positive electrode tab 330 or the negative electrode tab. Alternatively, the height H1 of each of the tab-peripheral region 311 and the first region 312*a* in the width direction (the Y direction in the drawing) of the positive electrode substrate 112 may be smaller than the height H2 of the second region 312*b* which is adjacent to the first region 312*a* in the width direction and to which the positive active material is applied. For example, the first region 312*a* is a positive uncoated region that overlaps or faces the negative electrode tab when the electrode assembly 110 is wound, wherein the first region 312*a* may have a second width W2 greater than the first width W1 of the negative electrode tab and a first height H1 in the width direction of the positive electrode substrate 112. The tab-peripheral region 311 is a positive uncoated region, which is located in a region to which the positive electrode tab 330 is attached, and may have a width W2 and height H1 which are equal or similar to those of the first region 312*a*. The second region 312*b* is a positive active material region to which a positive active material is applied, wherein the second region 312*b* may be located adjacent to the first region 312*a* in the width direction of the positive electrode substrate 112 and may have a second width W2 equal to that of the first region 312*a* and a second height H2 greater than the first height H1 of the first region 312*a*. Alternatively, the first height H1 may be greater than the second height H2.

According to an embodiment, the combined area of all the positive active material regions in the first turn region T1 may be greater than the combined area of all the positive uncoated regions 311 and 312*a*. Therefore, this embodiment of the disclosure may increase the charging capacity of the battery.

FIG. 3 may also be a plan view illustrating one surface of the negative electrode substrate 114.

Like the positive active material, the negative active material 320 according to various embodiments may be applied up to one end of the negative electrode substrate 310 to which the negative electrode tab 330 is attached. However, the attachment region to which the negative electrode tab 330 is attached and the region 311 surrounding the attachment region may be negative uncoated regions to which the negative active material 320 is not applied. For example, the first turn region T1 to which the negative electrode tab 330 is attached may be divided into a negative uncoated region 311 to which the negative electrode tab 330 is attached and the negative active material 320 is not applied, and a negative active material region to which the negative active material 320 is applied.

According to various embodiments, the negative uncoated regions 311 and 312*a* in the first turn region T1 may include a tab-peripheral region 311 disposed to surround the region to which the negative electrode tab 330 is attached, and a first region 312*a* disposed to overlap or face the positive electrode tab when the electrode assembly 110 is wound. According to an embodiment, the width W2 of each of the tab-peripheral region 311 and the first region 312*a* in the longitudinal direction (the X direction in the drawing) of the negative electrode substrate 112 may be greater than the width W1 of the positive electrode tab 330 or the positive electrode tab. Alternatively, the height H1 of each of the tab-peripheral region 311 and the first region 312*a* in the width direction (the Y direction in the drawing) of the negative electrode substrate 112 may be smaller than the height H2 of the second region 312*b* which is adjacent to the first region 312*a* in the width direction and to which the negative active material is applied. For example, the first region 312*a* is a negative uncoated region that overlaps or faces the positive electrode tab when the electrode assembly 110 is wound, wherein the first region 312*a* may have a second width W2 greater than the first width W1 of the positive electrode tab and a first height H1 in the width direction of the negative electrode substrate 112. The tab-peripheral region 311 is a negative uncoated region, which is located in a region to which the negative electrode tab 330 is attached, and may have a width W2 and height H1 which are equal or similar to those of the first region 312*a*. The second region 312*b* is a negative active material region to which a negative active material is applied, wherein the second region 312*b* may be located adjacent to the first region 312*a* in the width direction of the negative electrode substrate 112 and may have a second width W2 equal to that of the first region 312*a* and a second height H2 greater than the first height H1 of the first region 312a. Alternatively, the first height H1 may be greater than the second height H2.

According to an embodiment, the combined area of all the negative active material regions in the first turn region T1 may be greater than the combined area of all the negative uncoated regions 311 and 312a. Therefore, this embodiment of the disclosure may increase the charging capacity of the battery.

Figure 4A:
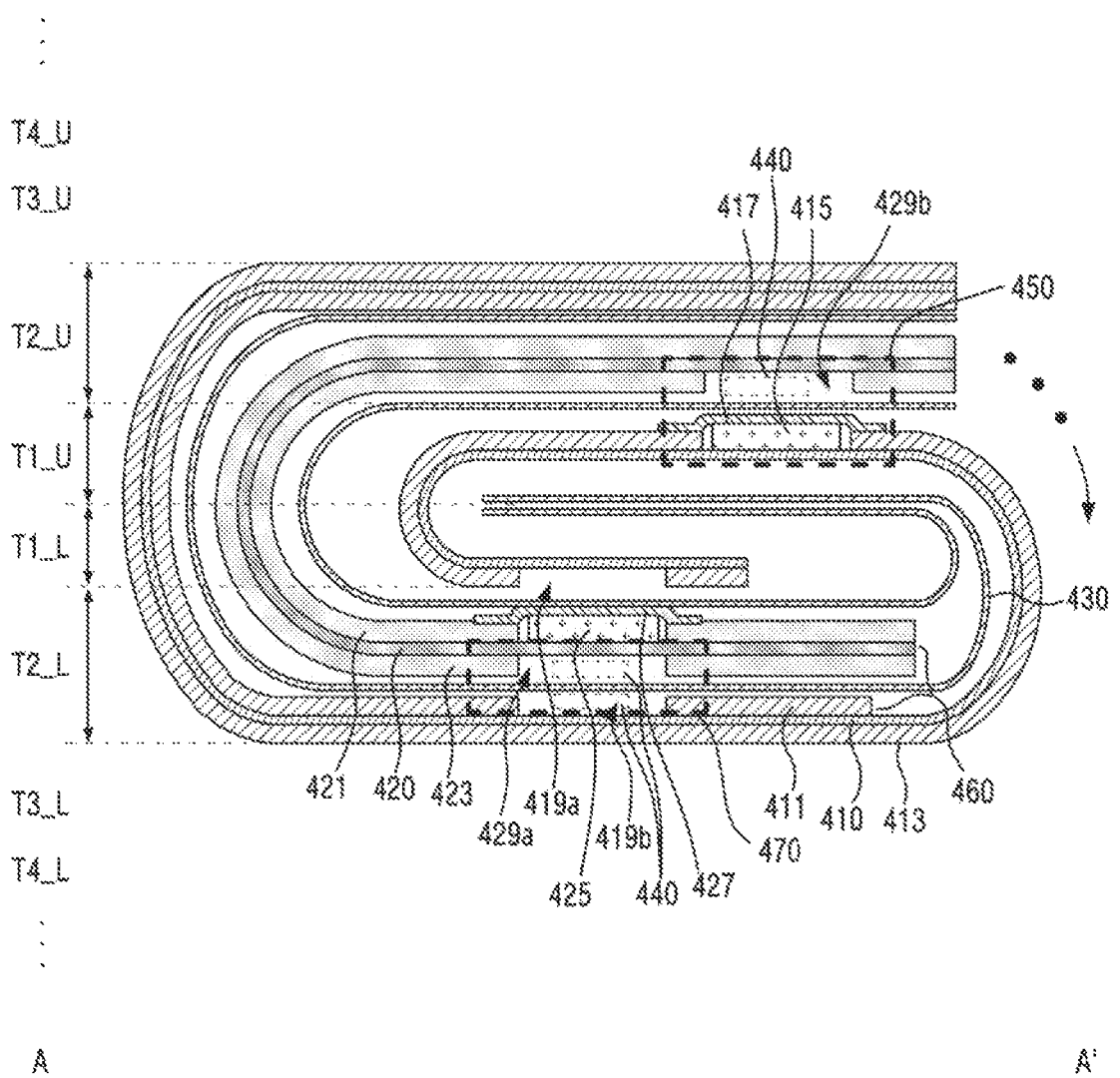
FIG. 4A is a cross-sectional view of a battery in a region to which a positive electrode tab and a negative electrode tab according to an embodiment are attached.

FIG. 4A is a cross-sectional view of a battery in a region to which a positive electrode tab and a negative electrode tab according to an embodiment are attached. For example, FIG. 4A may be a cross-sectional view of the battery 100 taken along line A-A' in FIG. 1A.

Referring to FIG. 4A, the electrode assembly (e.g., the electrode assembly 110 in FIG. 1A or FIG. 1B) may take a form in which a positive electrode substrate 410, a separator 430, and a negative electrode substrate 420 are sequentially wound from the central region 101 of the battery 100. In the positive electrode substrate 410, positive active materials 411 and 413 may include a first positive active material 411 applied to the inner peripheral surface of the positive electrode substrate 410 and a second positive active material 413 applied to the outer peripheral surface of the positive electrode substrate 410. In the negative electrode substrate 420, negative active materials 421 and 423 may include a first negative active material 421 applied to the inner peripheral surface of the negative electrode substrate 420 and a second negative active material 423 applied to the outer peripheral surface of the negative electrode substrate 420.

According to an embodiment, when wound, the electrode assembly 110 may be divided into a first turn region T1 forming a first turn, a second turn region T2 forming a second turn, and a third turn forming third turn region T3, . . . , a $k^{th}$ turn region Tk forming a $k^{th}$ turn. When viewed in a cross-section in a state in which the electrode assembly 110 is wound, each of the turn regions T1 to Tk may be divided into an upper region and a lower region. For example, when viewed in the cross-section, the first turn region T1 may be divided into a first turn upper region T1_U disposed at a relatively upper side and a first turn lower region T1_L disposed at a relatively lower side. When viewed in the cross-section, the second turn region T2 may be divided into a second turn upper region T2_U disposed at a relatively upper side and a second turn lower region T2_L disposed at a relatively lower side. When viewed in the cross-section, the third turn region T3 may be divided into a third turn upper region T3_U disposed at a relatively upper side and a third turn lower region T3_L disposed at a relatively lower side, and the regions subsequent to the third turn region T3 may also be similar to the above-described example.

According to an embodiment, when the winding of the electrode assembly 110 starts from the first turn lower region T1_L, the first turn upper region T1_U may be bent from one side to be connected to the second turn lower region T2_L, the second turn upper region T2_U may also be bent at the one side to be connected to the third turn lower region T3_L, and the fourth turn upper region T4_U and the subsequent turn upper regions may also be similar to the above-described example. Alternatively, when the winding of the electrode assembly 110 starts from the first turn upper region T1_U, the first turn lower region T1_L may be bent from one side to be connected to the second turn upper region T2_U, the second turn lower region T2_L may also be bent at the one side to be connected to the third turn upper region T3_U, and the fourth turn lower region T4_L and the subsequent turn lower regions may also be similar to the above-described example. In the illustrated example, the winding of the electrode assembly 110 starts from the first turn lower region T1_L, but may not be limited thereto.

According to an embodiment, a positive electrode tab 415 may be attached to the positive electrode substrate 410, and an insulating tape 417 may be attached on the positive electrode tab 415. The insulating tape 417 may insulate the positive electrode tab 415, and may prevent the positive electrode tab 415 from coming into direct contact with the separator 430 which might deform or damage the separator 430.

According to an embodiment, a negative electrode tab 425 may be attached to the negative electrode substrate 420, and an insulating tape 427 may be attached on the negative electrode tab 425. The insulating tape 427 may insulate the negative electrode tab 425, and may prevent the negative electrode tab 425 from coming into direct contact with the separator 430 which might deform or damage the separator 430.

According to an embodiment, the facing portion or overlapping portion of the positive electrode tab 415 or the negative electrode tab 425 when the electrode assembly 110 is wound, the negative uncoated regions 429a and 429b or the positive uncoated regions 419a and 419b may be provided. According to an embodiment, an insulating layer 440 may be disposed in at least one of the negative uncoated regions 429a and 429b and the positive uncoated regions 419a and 419b.

According to an embodiment, the positive electrode tab 415 may be disposed on the outer peripheral surface of the positive electrode substrate 410 in the first turn upper region T1_U. For example, when the positive electrode tab 415 is disposed on the outer peripheral surface of the positive electrode substrate 410 in the first turn upper region T1_U, the positive electrode tab 415 may face the inner peripheral surface of the negative electrode substrate 420 disposed in the second turn upper region T2_U. In an embodiment, in the second turn upper region T2_U, the inner peripheral surface of the negative electrode substrate 420 may be provided with a negative uncoated region 429b to face the positive electrode tab 415. For example, the negative uncoated region 429b provided on the inner peripheral surface of the negative electrode substrate 420 in the second turn upper region T2_U may be the first region 312a illustrated in FIG. 3. Alternatively, in the second turn lower region T2_L, the outer peripheral surface of the negative electrode substrate 420 may be provided with a negative uncoated region 429a to overlap the negative electrode tab 425. According to various embodiments, the areas of the negative uncoated regions 429a and 429b may be equal to the area of the positive electrode tab 415 (or the negative electrode tab 425) or greater than the area of the positive electrode tab 415 (or the negative electrode tab 425).

According to an embodiment, in the second turn lower region T2_L, the negative electrode tab 425 may be disposed on the inner peripheral surface of the negative electrode substrate 420. For example, when the negative electrode tab 425 is disposed on the inner peripheral surface of the negative electrode substrate 420 in the second turn lower region T2_L, the negative electrode tab 425 may face the outer peripheral surface of the positive electrode substrate 410 disposed in the first turn lower region T1_L and may overlap the inner peripheral surface of the positive electrode substrate 410 disposed in the second turn lower region T2_L. According to an embodiment, the outer peripheral surface of the positive electrode substrate 410 disposed in the first turn lower region T1_L and the inner peripheral surface of the positive electrode substrate 410 disposed in the second turn lower region T2_L may be provided with positive uncoated regions 419a and 419b to overlap the negative electrode tab 425. According to various embodiments, the areas of the positive uncoated regions 419a and 419b may be equal to the area of the negative electrode tab 425 or greater than the area of the negative electrode tab 425.

According to an embodiment, in a first portion 450, the negative electrode substrate 420, the first negative active material 421, the separator 430, the second positive active material 413, and the positive electrode substrate 410 may be sequentially stacked. In an embodiment, the negative uncoated region 429b (e.g., the first region 312a of FIG. 3) to which the first negative active material 421 is not applied may be aligned with the positive electrode tab 415 on the positive electrode substrate 410.

According to an embodiment, in an extension 460, the negative electrode substrate 420, the second negative active material 423, and the first positive active material 411 may extend along the separator 430, which extends toward the first portion 450, to overlap the first portion 450. In an embodiment, when the extension 460 extends along the separator 430, which extends toward the first portion 450, a second portion 470 may be disposed to overlap the first portion 450. In this case, in the first portion 450 and the second portion 470, the negative electrode substrate 420, the first negative active material 421, the separator 430, the second positive active material 413, the positive electrode substrate 410, the first positive active material 411, the separator 430, the second negative active material 423, and the negative electrode substrate 420 may be sequentially stacked. In addition, in the first portion 450 and the second portion 470 disposed to face each other, the negative uncoated region 429b, the positive electrode tab 415, the positive uncoated region 419b, and the negative uncoated region 429a may be aligned with each other.

Figure 4B:
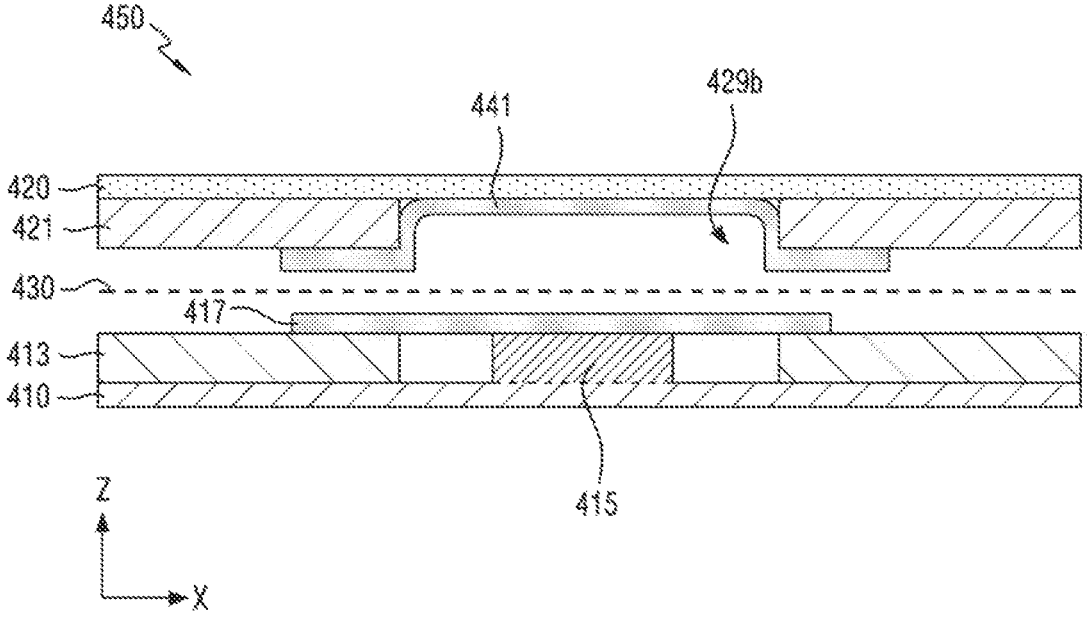
FIG. 4B is an enlarged cross-sectional view of a portion of a region to which a positive electrode tab and a negative electrode tab according to an embodiment are attached in a battery.

FIG. 4B is an enlarged cross-sectional view of a portion of a region to which a positive electrode tab and a negative electrode tab according to an embodiment are attached in a battery. In an embodiment, FIG. 4B may be an enlarged view of the first portion 450 of FIG. 4A.

According to an embodiment, the first portion 450 may include at least one of a negative electrode substrate 420, a first negative active material 421, a separator 430, an insulating tape 417, a second positive active material 413, and a positive electrode substrate 410. For example, in the first portion 450, the negative electrode substrate 420, the first negative active material 421, the separator 430, the second positive active material 413, and the positive electrode substrate 410 may be stacked in a direction substantially parallel to the x-axis direction. In various embodiments, the insulating tape 417 may be replaced with an insulative material, an insulating member, or the like.

According to an embodiment, the negative electrode substrate 420 may be provided with a negative uncoated region 429b (the first region) to which the first negative active material 421 is not applied. In an embodiment, in the negative electrode substrate 420, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 may include a first insulating layer 441 in order to compensate for the thickness difference occurring due to the negative uncoated region 429b. In an embodiment, the first insulating layer 441 may be disposed from the negative uncoated region 429b up to a peripheral region within a predetermined range from the negative uncoated region 429b (e.g., a partial region to which the first negative active material 421 is applied). For example, a portion (e.g., the central portion) of the first insulating layer 441 may be in contact with the negative electrode substrate 420 in the z-axis direction, and the remaining portion (e.g., the peripheral portion) of the first insulating layer 441 may be in contact with the peripheral region in the z-axis direction. In an embodiment, the first insulating layer 441 may be continuously disposed from the negative uncoated region 429b to the peripheral region. In this case, the first insulating layer 441 may fill a gap generated by the negative uncoated region 429b between the negative electrode substrate 420 and the peripheral region. In addition, the first insulating layer 441 may have a thickness equal or similar to the thickness of the region other than the peripheral region (e.g., the region to which the negative active material 421 is applied), thereby allowing pressure to be uniformly transferred in the process of manufacturing the battery (e.g., the battery 100 in FIG. 1A), suppressing an increase in local resistance generated in the negative uncoated region 429b, and preventing swelling of the battery 100.

According to an embodiment, the positive electrode substrate 410 may include a positive electrode tab 415. In an embodiment, the positive electrode tab 415 may be aligned with the negative uncoated region 429b in the z-axis direction.

Figure 4C:
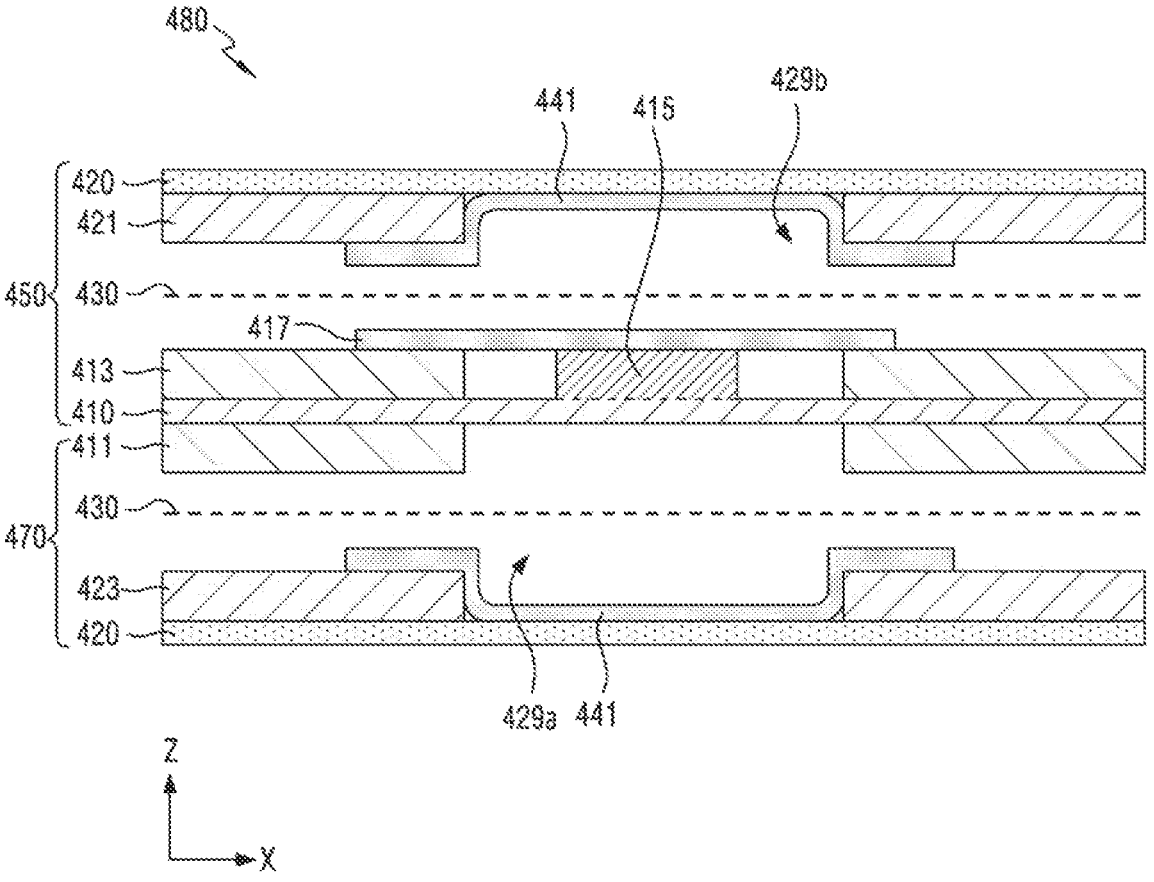
FIG. 4C is an enlarged cross-sectional view of a portion of a region to which a positive electrode tab and a negative electrode tab according to an embodiment are attached in a battery.

FIG. 4C is an enlarged cross-sectional view of a portion of a region to which a positive electrode tab and a negative electrode tab according to an embodiment are attached in a battery. In an embodiment, FIG. 4C may be a view illustrating the overlapping structure of the first portion 450 and the second portion 470 extending toward the first portion 450 in FIG. 4A.

According to an embodiment, the overlapping portion 480 may include an overlapping structure of the first portion 450 and the second portion 470. In an embodiment, the overlapping portion 480 may include at least one of a negative electrode substrate 420, a first negative active material 421, a separator 430, an insulating tape 417, a second positive active material 413, a positive electrode substrate 410, a first positive active material 411, a separator 430, a second negative active material 423, and a negative electrode substrate 420. For example, in the overlapping portion 480, the negative electrode substrate 420, the first negative active material 421, the separator 430, the insulating tape 417, the second positive active material 413, the positive electrode substrate 410, the first positive active material 411, the separator 430, the second negative active material 423, and the negative electrode substrate 420 may be stacked in a direction substantially parallel to the x-axis direction.

According to an embodiment, the negative uncoated region 429b (first region) to which the first negative active material 421 is not applied may be provided on the negative electrode substrate 420 of the first portion 450. In an embodiment, in the negative electrode substrate 420 of the first portion 450, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 of the first portion 450 may include a first insulating layer 441 in order to compensate for the thickness difference occurring due to the negative uncoated region 429*b*. In an embodiment, the first insulating layer 441 may be disposed from the negative uncoated region 429*b* up to a peripheral region within a predetermined range from the negative uncoated region 429*b* (e.g., a partial region to which the first negative active material 421 is applied). For example, a portion (e.g., the central portion) of the first insulating layer 441 may be in contact with the negative electrode substrate 420 in the z-axis direction, and the remaining portion (e.g., the peripheral portion) of the first insulating layer 441 may be in contact with the peripheral region in the z-axis direction. In an embodiment, the first insulating layer 441 may be continuously disposed from the negative uncoated region 429*b* to the peripheral region. In this case, the first insulating layer 441 may fill a gap generated by the negative uncoated region 429*b* between the negative electrode substrate 420 and the peripheral region.

According to an embodiment, the negative uncoated region 429*a* (first region) to which the second negative active material 423 is not applied may be provided on the negative electrode substrate 420 of the second portion 470. In an embodiment, in the negative electrode substrate 420 of the second portion 470, due to the negative uncoated region 429*a*, a predetermined thickness (e.g., the thickness corresponding to the thickness of the second negative active material 423) difference may occur in the z-axis direction between the negative uncoated region 429*a* and the region which surrounds the negative uncoated region 429*a* and to which the second negative active material 423 is applied.

According to an embodiment, the negative electrode substrate 420 of the second portion 470 may include a first insulating layer 441 in order to compensate for the thickness difference occurring due to the negative uncoated region 429*a*. In an embodiment, the first insulating layer 441 may be disposed from the negative uncoated region 429*a* up to a peripheral region within a predetermined range from the negative uncoated region 429*a* (e.g., a partial region to which the second negative active material 423 is applied). For example, a portion (e.g., the central portion) of the first insulating layer 441 may be in contact with the negative electrode substrate 420 in the −z-axis direction, and the remaining portion (e.g., the peripheral portion) of the first insulating layer 441 may be in contact with the peripheral region in the −z-axis direction. In an embodiment, the first insulating layer 441 may be continuously disposed from the negative uncoated region 429*a* to the peripheral region. In this case, the first insulating layer 441 may fill a gap generated by the negative uncoated region 429*a* between the negative electrode substrate 420 and the peripheral region. In an embodiment, the first insulating layer 441 disposed on the negative electrode substrate 420 of the second portion 470 may be disposed to be symmetrical with the first insulating layer 441 disposed on the negative electrode substrate 420 of the first portion 450.

According to an embodiment, the positive electrode substrate 410 may include a positive electrode tab 415. In an embodiment, the positive electrode tab 415 may be aligned with the negative uncoated regions 429*a* and 429*b* in the z-axis direction.

According to various embodiments, the overlapping portion 480 of FIG. 4C may be included not only in a jelly-roll type battery (e.g., the battery 100 of FIG. 1A or 1B) illustrated in FIG. 4A, but also in any type of battery to which the overlapping portion 480 is applicable (e.g., a spec-type structure). For example, when applied to a battery having a spec-type structure, the overlapping portion 480 of FIG. 4C may be disposed substantially horizontally from one side to the other side of the battery having the spec-type structure, corresponding to the shape of the spec-type structure.

Figure 4D:
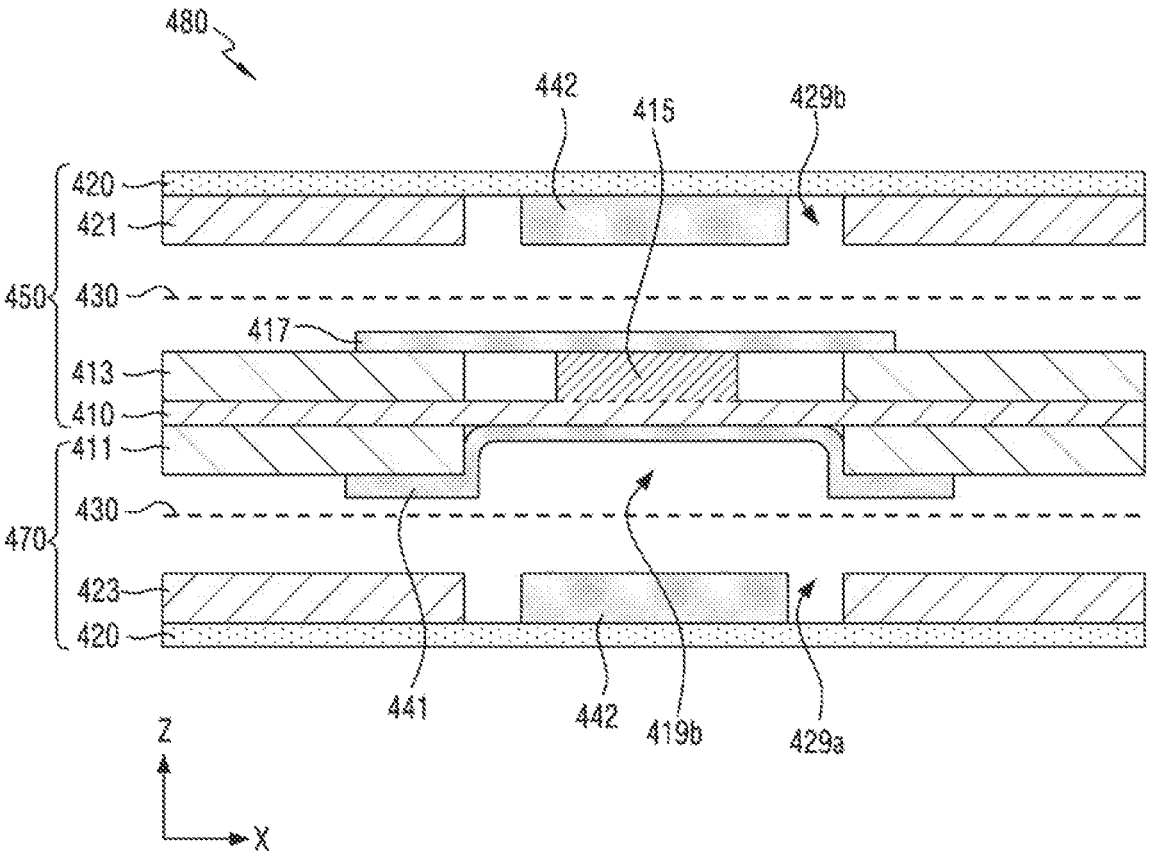
FIG. 4D is an enlarged cross-sectional view of a portion of a region to which a positive electrode tab and a negative electrode tab according to an embodiment are attached in a battery.

FIG. 4D is an enlarged cross-sectional view of a portion of a region to which a positive electrode tab and a negative electrode tab according to an embodiment are attached in a battery. In an embodiment, FIG. 4D may be a view illustrating the overlapping structure of the first portion 450 and the second portion 470 extending toward the first portion 450 in FIG. 4A.

According to an embodiment, the overlapping portion 480 may include an overlapping structure of the first portion 450 and the second portion 470. In an embodiment, the overlapping portion 480 may include at least one of a negative electrode substrate 420, a first negative active material 421, a separator 430, an insulating tape 417, a second positive active material 413, a positive electrode substrate 410, a first positive active material 411, a separator 430, a second negative active material 423, and a negative electrode substrate 420. For example, in the overlapping portion 480, the negative electrode substrate 420, the first negative active material 421, the separator 430, the insulating tape 417, the second positive active material 413, the positive electrode substrate 410, the first positive active material 411, the separator 430, the second negative active material 423, and the negative electrode substrate 420 may be stacked in a direction substantially parallel to the x-axis direction.

According to an embodiment, the negative uncoated region 429*b* (a first region) to which the first negative active material 421 is not applied may be provided on the negative electrode substrate 420 of the first portion 450. In an embodiment, in the negative electrode substrate 420 of the first portion 450, due to the negative uncoated region 429*b*, a predetermined thickness (e.g., the thickness corresponding to the thickness of the first negative active material 421) difference may occur in the z-axis direction between the negative uncoated region 429*b* and the region which surrounds the negative uncoated region 429*b* and to which the first negative active material 421 is applied.

According to an embodiment, the negative electrode substrate 420 of the first portion 450 may include a second insulating layer 442 in order to compensate for the thickness difference occurring due to the negative uncoated region 429*b*. In an embodiment, the second insulating layer 442 may be disposed in the negative uncoated region 429*b*. For example, the second insulating layer 442 may be in contact with the negative electrode substrate 420 in the z-axis direction. In an embodiment, the second insulating layer 442 may have a thickness equal or similar to that of the first negative active material 421 in order to compensate for the thickness difference generated in the negative electrode substrate 420 due to the negative uncoated region 429*b*. In addition, the second insulating layer 442 may have a thickness equal or similar to the thickness of the region to which the negative active material 421 is applied, thereby allowing pressure to be uniformly transferred in the process of manufacturing the battery (e.g., the battery 100 in FIG. 1A), suppressing an increase in local resistance generated in the negative uncoated region 429*b*, and preventing swelling of the battery 100.

According to an embodiment, the positive electrode substrate 410 may be provided with a negative uncoated region 419*b* (the third region) to which the first positive active material 411 is not applied. In an embodiment, in the positive electrode substrate 410, due to the positive uncoated region 419*b*, a predetermined thickness (e.g., the thickness corresponding to the thickness of the first positive active material 411) difference may occur in the z-axis direction between the positive uncoated region 419b and the region which surrounds the positive uncoated region 419b and to which the first positive active material 411 is applied.

According to an embodiment, the positive electrode substrate 410 may include a first insulating layer 441 in order to compensate for the thickness difference occurring due to the positive uncoated region 419b. In an embodiment, the first insulating layer 441 may be disposed from the positive uncoated region 419b up to a peripheral region within a predetermined range from the positive uncoated region 419b (e.g., a partial region to which the first positive active material 411 is applied). For example, a portion (e.g., the central portion) of the first insulating layer 441 may be in contact with the positive electrode substrate 410 in the z-axis direction, and the remaining portion (e.g., the peripheral portion) of the first insulating layer 441 may be in contact with the peripheral region in the z-axis direction. In an embodiment, the first insulating layer 441 may be continuously disposed from the positive uncoated region 419b to the peripheral region. In this case, the first insulating layer 441 may fill a gap generated by the positive uncoated region 419b between the positive electrode substrate 410 and the peripheral region. In addition, the first insulating layer 441 may have a thickness equal or similar to the thickness of the region other than the peripheral region (e.g., the region to which the negative active material 421 is applied), thereby allowing pressure to be uniformly transferred in the process of manufacturing the battery (e.g., the battery 100 in FIG. 1A), suppressing an increase in local resistance generated in the negative uncoated region 429b, and preventing swelling of the battery 100.

According to an embodiment, the negative uncoated region 429a (a first region) to which the second negative active material 423 is not applied may be provided on the negative electrode substrate 420 of the second portion 470. In an embodiment, in the negative electrode substrate 420 of the second portion 470, due to the negative uncoated region 429a, a predetermined thickness (e.g., the thickness corresponding to the thickness of the second negative active material 423) difference may occur in the z-axis direction between the negative uncoated region 429a and the region which surrounds the negative uncoated region 429a and to which the second negative active material 423 is applied.

According to an embodiment, the negative electrode substrate 420 of the second portion 470 may include a second insulating layer 442 in order to compensate for the thickness difference occurring due to the negative uncoated region 429a. In an embodiment, the second insulating layer 442 may be disposed in the negative uncoated region 429a. For example, the first insulating layer 441 may be in contact with the negative electrode substrate 420 in the z-axis direction. In an embodiment, the second insulating layer 442 may have a thickness equal or similar to that of the second negative active material 423 in order to compensate for the thickness difference generated in the negative electrode substrate 420 due to the negative uncoated region 429a. In an embodiment, the second insulating layer 442 disposed on the negative electrode substrate 420 of the second portion 470 may be disposed to be symmetrical with the second insulating layer 442 disposed on the negative electrode substrate 420 of the first portion 450.

According to an embodiment, the positive electrode substrate 410 may include a positive electrode tab 415. In an embodiment, the positive electrode tab 415 may be aligned with the negative uncoated regions 429a and 429b and the positive uncoated region 419b in the z-axis direction.

According to various embodiments, the overlapping portion 480 of FIG. 4D may be included not only in a jelly-roll type battery (e.g., the battery 100 of FIG. 1A or 1B) illustrated in FIG. 4A, but also in any type of battery to which the overlapping portion 480 is applicable (e.g., a spec-type structure). For example, when applied to a battery having a spec-type structure, the overlapping portion 480 of FIG. 4D may be disposed substantially horizontally from one side to the other side of the battery having the spec-type structure, corresponding to the shape of the spec-type structure.

Figure 4E:
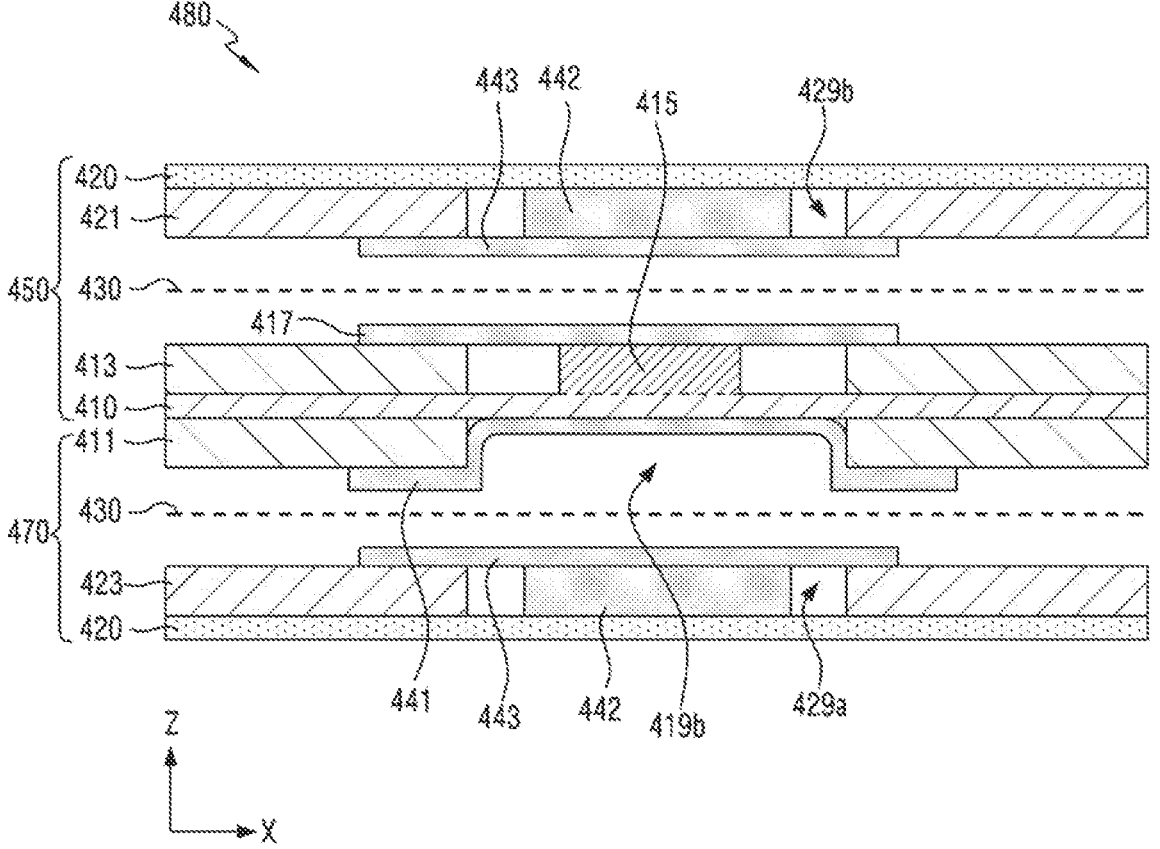
FIG. 4E is an enlarged cross-sectional view of a portion of a region to which a positive electrode tab and a negative electrode tab according to an embodiment are attached in a battery.

FIG. 4E is an enlarged cross-sectional view of a portion of a region to which a positive electrode tab and a negative electrode tab according to an embodiment are attached in a battery. In an embodiment, FIG. 4E may be a view illustrating the overlapping structure of the first portion 450 and the second portion 470 extending toward the first portion 450 in FIG. 4A.

According to an embodiment, the overlapping portion 480 may include an overlapping structure of the first portion 450 and the second portion 470. In an embodiment, the overlapping portion 480 may include at least one of a negative electrode substrate 420, a first negative active material 421, a separator 430, an insulating tape 417, a second positive active material 413, a positive electrode substrate 410, a first positive active material 411, a separator 430, a second negative active material 423, and a negative electrode substrate 420. For example, in the overlapping portion 480, the negative electrode substrate 420, the first negative active material 421, the separator 430, the insulating tape 417, the second positive active material 413, the positive electrode substrate 410, the first positive active material 411, the separator 430, the second negative active material 423, and the negative electrode substrate 420 may be stacked in a direction substantially parallel to the x-axis direction.

According to an embodiment, the negative uncoated region 429b (a first region) to which the first negative active material 421 is not applied may be provided on the negative electrode substrate 420 of the first portion 450. In an embodiment, in the negative electrode substrate 420 of the first portion 450, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 of the first portion 450 may include at least one of a second insulating layer 442 and a third insulating layer 443 in order to compensate for the thickness difference occurring due to the negative uncoated region 429b.

In an embodiment, the second insulating layer 442 may be disposed in the negative uncoated region 429b. For example, the second insulating layer 442 may be in contact with the negative electrode substrate 420 in the z-axis direction. In an embodiment, the second insulating layer 442 may have a thickness equal or similar to that of the first negative active material 421 in order to compensate for the thickness difference generated in the negative electrode substrate 420 due to the negative uncoated region 429b. In addition, the second insulating layer 442 may have a thickness equal or similar to the thickness of the region to which the negative active material 421 is applied, thereby allowing pressure to be uniformly transferred in the process of manufacturing the battery (e.g., the battery 100 in FIG. 1A), suppressing an increase in local resistance generated in the negative uncoated region 429b, and preventing swelling of the battery 100.

In an embodiment, the third insulating layer 443 may be disposed from the negative uncoated region 429b up to a peripheral region within a predetermined range from the negative uncoated region 429b (e.g., a partial region to which the first negative active material 421 is applied). For example, a portion (e.g., the central portion) of the third insulating layer 443 may be in contact with the second insulating layer 442 in the z-axis direction, and the remaining portion (e.g., the peripheral portion) of the third insulating layer 443 may be in contact with the peripheral region in the z-axis direction. In this case, the third insulating layer 443 may fill a gap between the second insulating layer 442 and the peripheral region. In addition, the second insulating layer 443 may have a thickness equal or similar to the thickness of the region other than the peripheral region (e.g., the region to which the negative active material 421 is applied), thereby allowing pressure to be uniformly transferred in the process of manufacturing the battery (e.g., the battery 100 in FIG. 1A), suppressing an increase in local resistance generated in the negative uncoated region 429b, and preventing swelling of the battery 100.

According to an embodiment, the positive electrode substrate 410 may be provided with a negative uncoated region 419b (the third region) to which the first positive active material 411 is not applied. In an embodiment, in the positive electrode substrate 410, due to the positive uncoated region 419b, a predetermined thickness (e.g., the thickness corresponding to the thickness of the first positive active material 411) difference may occur in the z-axis direction between the positive uncoated region 419b and the region which surrounds the positive uncoated region 419b and to which the first positive active material 411 is applied.

According to an embodiment, the positive electrode substrate 410 may include a first insulating layer 441 in order to compensate for the thickness difference occurring due to the positive uncoated region 419b. In an embodiment, the first insulating layer 441 may be disposed from the positive uncoated region 419b up to a peripheral region within a predetermined range from the positive uncoated region 419b (e.g., a partial region to which the first positive active material 411 is applied). For example, a portion (e.g., the central portion) of the first insulating layer 441 may be in contact with the positive electrode substrate 410 in the z-axis direction, and the remaining portion (e.g., the peripheral portion) of the first insulating layer 441 may be in contact with the peripheral region in the z-axis direction. In an embodiment, the first insulating layer 441 may be continuously disposed from the negative uncoated region 429b to the peripheral region. In this case, the first insulating layer 441 may fill a gap generated by the negative uncoated region 429b between the negative electrode substrate 420 and the peripheral region.

According to an embodiment, the negative uncoated region 429a (a first region) to which the second negative active material 423 is not applied may be provided on the negative electrode substrate 420 of the second portion 470. In an embodiment, in the negative electrode substrate 420 of the second portion 470, due to the negative uncoated region 429a, a predetermined thickness (e.g., the thickness corresponding to the thickness of the second negative active material 423) difference may occur in the z-axis direction between the negative uncoated region 429a and the region which surrounds the negative uncoated region 429a and to which the second negative active material 423 is applied.

According to an embodiment, the negative electrode substrate 420 of the second portion 470 may include at least one of a second insulating layer 442 and a third insulating layer 443 in order to compensate for the thickness difference occurring due to the negative uncoated region 429a. In an embodiment, the second insulating layer 442 and the third insulating layer 443 disposed on the negative electrode substrate 420 of the second portion 470 may be disposed to be symmetrical with the second insulating layer 442 and the third insulating layer 443 disposed on the negative electrode substrate 420 of the first portion 450.

In an embodiment, the second insulating layer 442 may be disposed in the negative uncoated region 429a. For example, the second insulating layer 442 may be in contact with the negative electrode substrate 420 in the −z-axis direction. In an embodiment, the second insulating layer 442 may have a thickness equal or similar to that of the second negative active material 423 in order to compensate for the thickness difference generated in the negative electrode substrate 420 due to the negative uncoated region 429a.

In an embodiment, the third insulating layer 443 may be disposed from the negative uncoated region 429a up to a peripheral region within a predetermined range from the negative uncoated region 429a (e.g., a partial region to which the second negative active material 423 is applied). For example, a portion (e.g., the central portion) of the third insulating layer 443 may be in contact with the second insulating layer 442 in the −z-axis direction, and the remaining portion (e.g., the peripheral portion) of the third insulating layer 443 may be in contact with the peripheral region in the −z-axis direction. In this case, the third insulating layer 443 may fill a gap between the second insulating layer 442 and the peripheral region.

According to an embodiment, the positive electrode substrate 410 may include a positive electrode tab 415. In an embodiment, the positive electrode tab 415 may be aligned with the negative uncoated regions 429a and 429b and the positive uncoated region 419b in the z-axis direction.

According to various embodiments, the overlapping portion 480 of FIG. 4E may be included not only in a jelly-roll type battery (e.g., the battery 100 of FIG. 1A or 1B) illustrated in FIG. 4A, but also in any type of battery to which the overlapping portion 480 is applicable (e.g., a spec-type structure). For example, when applied to a battery having a spec-type structure, the overlapping portion 480 of FIG. 4E may be disposed substantially horizontally from one side to the other side of the battery having the spec-type structure, corresponding to the shape of the spec-type structure.

Figure 5:
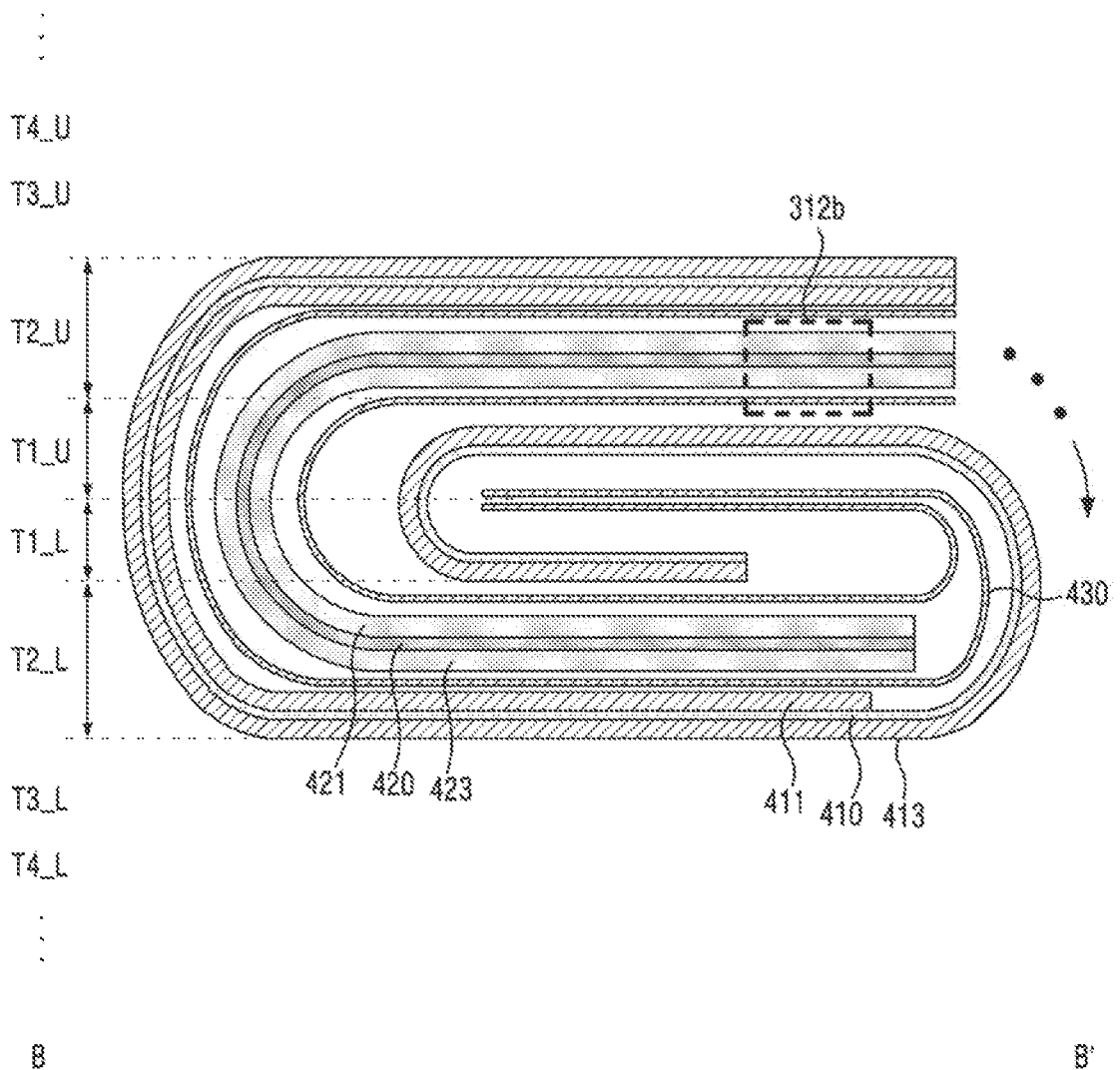
FIG. 5 is a cross-sectional view of a battery in a region to which a positive electrode tab and a negative electrode tab according to an exemplary embodiment are not attached.

FIG. 5 is a cross-sectional view of a battery in a region to which a positive electrode tab and a negative electrode tab according to an exemplary embodiment are not attached. For example, FIG. 5 may be a cross-sectional view of the battery 100 taken along line B-B' in FIG. 1A.

Referring to FIG. 5, in the electrode assembly (e.g., the electrode assembly 110 in FIG. 1A or FIG. 1B) according to an embodiment, except for a partial region to which a positive electrode tab 415 and a negative electrode tab 425 are attached, negative active materials 421 and 423 or positive active materials 411 and 413 may be applied, as illustrated in FIG. 3.

For example, as illustrated in FIG. 4A, when the positive electrode tab 415 is disposed on the outer peripheral surface of the positive electrode substrate 410 in the first turn upper region T1_U, a negative active material 421 may be applied to the inner peripheral surface of the negative electrode substrate 420 disposed in the second turn upper region T2_U and facing the positive electrode tab 415, except for a partial region overlapping the positive electrode tab 415.

Alternatively, as illustrated in FIG. 4A, when the negative electrode tab 425 is disposed on the inner peripheral surface of the negative electrode substrate 420 in the second turn lower region T2_L, negative active materials 411 and 413 may be applied to the outer peripheral surface of the positive electrode substrate 410 disposed in the first turn lower region T1_L and the inner peripheral surface of the positive electrode substrate 410 disposed in the second turn lower region T2_L, except for a partial region facing or overlapping the negative electrode tab 425.

According to various embodiments of the disclosure, while providing positive uncoated regions 419a and 419b and negative uncoated regions 429a and 429b to compensate for a step of the positive electrode tab 415 or the negative electrode tab 425, the positive uncoated regions 419a and 419b and the negative uncoated regions 429a and 429b are arranged only in a partial region that faces or overlaps the positive electrode tab 415 or the negative electrode tab 425, whereby it is possible to increase an active material application area, and thus to increase the capacity of the battery 100. In various embodiments, in the uncoated region of the positive electrode tab 415 or the negative electrode tab 425 to which an active material (a positive active material or a negative active material) is not applied, an insulating layer having a thickness that is equal or similar to that of the active material (e.g., the insulating layers 441 to 443 shown in FIGS. 4B to 4E) may be disposed. In this case, the insulating layers 441 to 443 may allow pressure to be uniformly transferred during the manufacturing process of the battery 100, suppress an increase in local resistance generated in the negative uncoated region 429b, and prevent swelling of the battery 100.

Figure 6A:
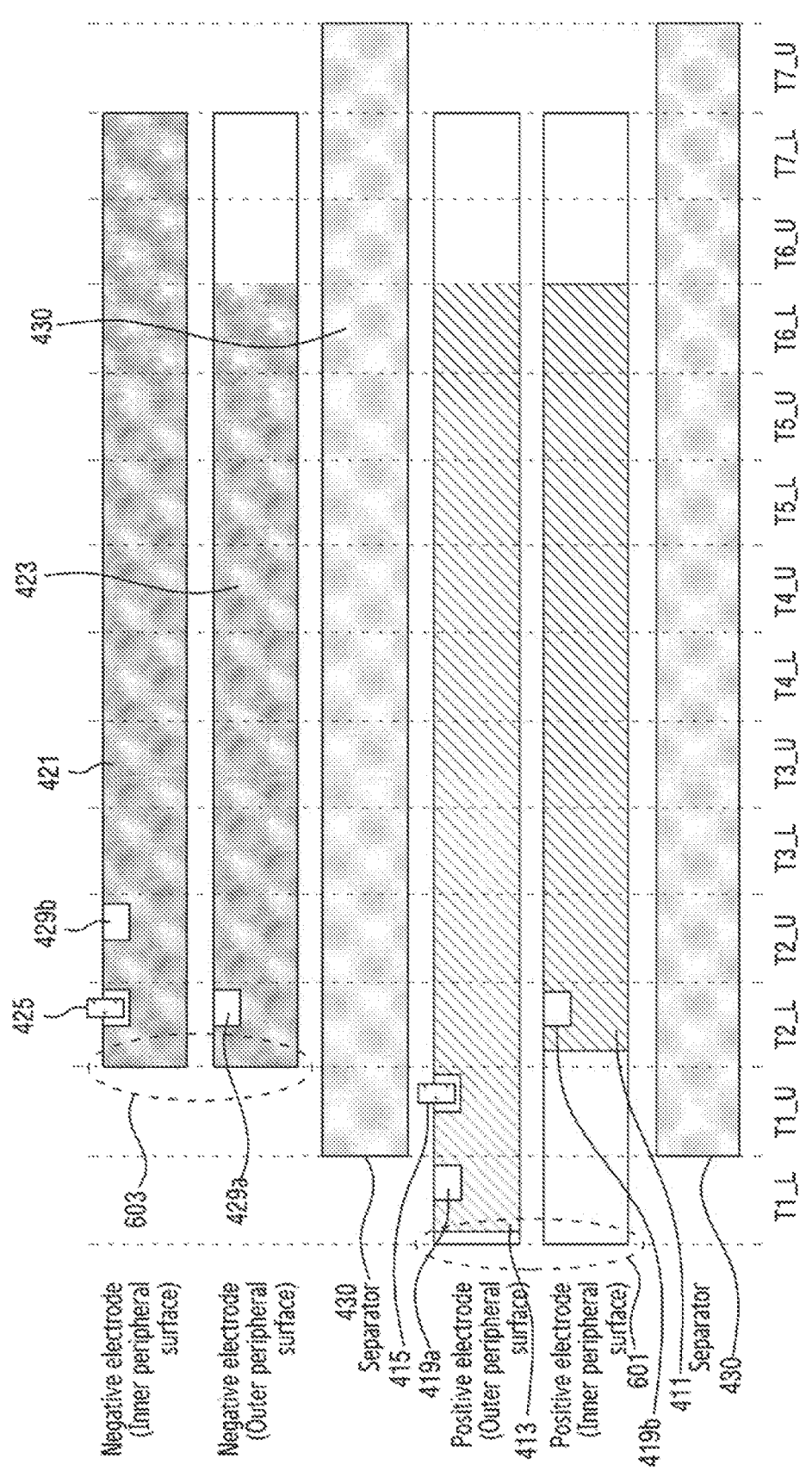
FIG. 6A is a view illustrating an arrangement structure of an electrode assembly according to an embodiment.

FIG. 6A is a view illustrating an arrangement structure of an electrode assembly according to an embodiment.

For example, the arrangement structure of the electrode assembly illustrated in FIG. 6A (e.g., the electrode assembly 110 in FIG. 1A or FIG. 1B) may be of an alignment type in which the negative uncoated regions 429a and 429b or the positive uncoated regions 419a and 419b are disposed in a facing portion or an overlapping portion of the positive electrode tab 415 or the negative electrode tab 425 when the assembly 110 is wound, as illustrated in FIG. 4A. Hereinafter, an arrangement structure and a stacked structure of the electrode assembly 110 will be described with reference to FIGS. 4A and 6A.

Referring to FIGS. 4A and 6A, the arrangement structure of the electrode assembly 110 according to an embodiment may be of a type in which the positions of respective ends of the positive electrode substrate 410 and the negative electrode substrate 420 (e.g., an end 601 of the positive electrode substrate and an end 603 of the negative electrode substrate) do not coincide with each other. For example, the electrode assembly 110 may be previously aligned such that the number of turns of the positive electrode substrate 410 is greater than the number of turns of the negative electrode substrate 420 by one time. For example, the positive electrode substrate 410 may be shifted to one side from the negative electrode substrate 420 by a length corresponding to the first turn region T1, and the positive electrode tab 415 may be disposed to the outer peripheral surface of the positive electrode substrate 410 to correspond to the first turn upper region T1_U.

According to an embodiment of the disclosure, when the positive electrode tab is disposed in the $n^{th}$ turn region, the negative electrode substrate may be provided with a negative uncoated region overlapping the positive electrode tab in a portion of the $(n-1)^{th}$ turn region and/or the $(n+1)^{th}$ turn region of the electrode assembly 110. Alternatively, when the negative electrode tab is disposed in the $m^{th}$ turn region, the positive electrode substrate may be provided with a positive uncoated region overlapping the negative electrode tab in a portion of the $(m-1)^{th}$ turn region and/or the $(m+1)^{th}$ turn region of the electrode assembly 110.

For example, in a region of the first turn upper region T1_U to which the positive electrode tab 415 is attached, and a region of the first turn lower region T1_L which overlaps the negative electrode tab 425, the outer peripheral surface of the positive electrode substrate 410 may be provided with a positive uncoated region 419a, and the remaining area may be applied with the second positive active material 413. According to an embodiment, the inner peripheral surface of the positive electrode substrate 410 may be applied with the first positive active material 411 from the second turn region T2. Since the inner peripheral surface of the positive electrode substrate 410 overlaps the negative electrode tab 425 in the second turn lower region T2_L, the positive uncoated region 419b may be provided in a portion of the second turn lower region T2_L, and the remaining region may be applied with the first positive active material 411.

For example, the negative electrode substrate 420 may be disposed to be wound from the region corresponding to the second turn region T2, and the negative electrode tab 425 may be attached to the inner peripheral surface to correspond to the second turn lower region T2_L. For example, in a region of the second turn lower region T2_L to which the negative electrode tab 425 is attached, and a region of the second turn upper region T2_U which faces the positive electrode tab 415, the inner peripheral surface of the negative electrode substrate 420 may be provided with a negative uncoated region 429b, and the remaining area may be applied with the first negative active material 421. In the second turn lower region T2_L, the outer peripheral surface of the negative electrode substrate 420 may be provided with the negative uncoated region 429a in a partial region overlapping the negative electrode tab 425, and the remaining region may be applied with the second negative active material 423.

Figure 6B:
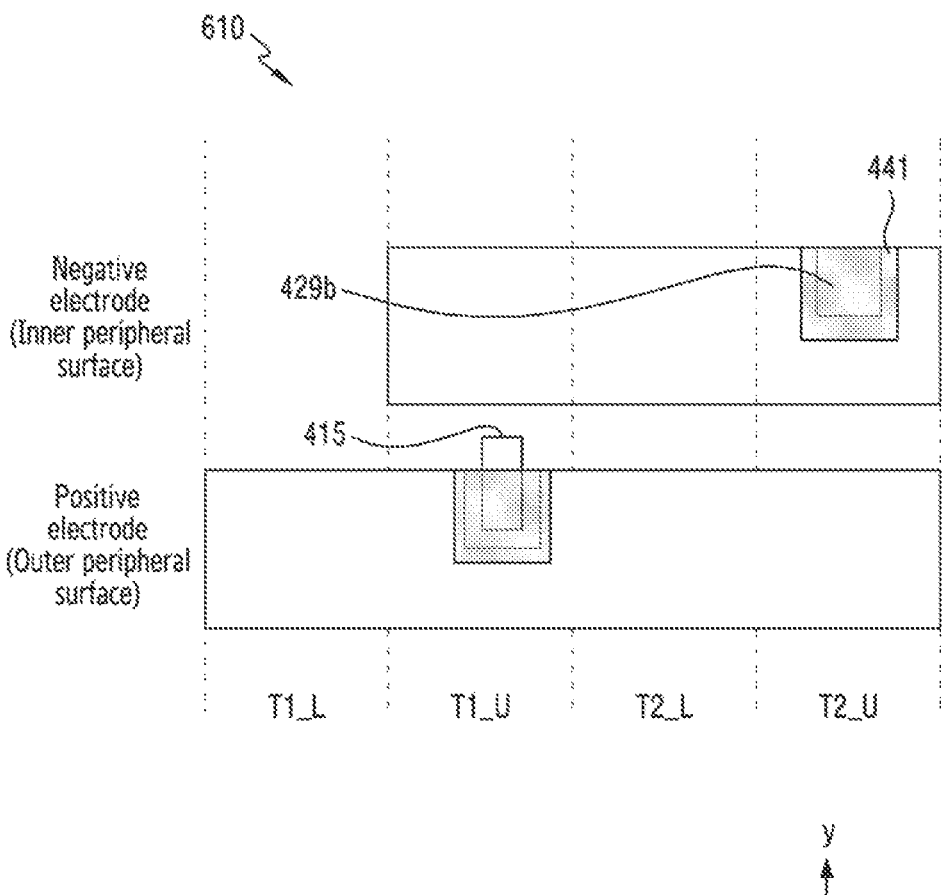
FIG. 6B is a view illustrating a portion of an arrangement structure of an electrode assembly according to an embodiment.

FIG. 6B is a view illustrating a portion of an arrangement structure of an electrode assembly according to an embodiment. In an embodiment, FIG. 6B may be a view illustrating the inner peripheral surface of the negative electrode and the outer peripheral surface of the positive electrode of FIG. 6A.

Referring to FIG. 6B, a first arrangement structure 610 according to an embodiment may be of an alignment type in which a positive electrode tab 415 is disposed in a negative uncoated region 429b (a first region) when the inner peripheral surface of a negative electrode substrate (e.g., the negative electrode substrate 420 in FIG. 4A) and the outer peripheral surface of a positive electrode substrate (e.g., the positive electrode substrate 410 in FIG. 4A) are wound. For example, the inner peripheral surface of the negative electrode substrate 420 and the outer peripheral surface of the positive electrode substrate 410 wound according to the first arrangement structure 610 may correspond to those of the alignment type illustrated in the first portion 450 of FIG. 4A.

According to an embodiment, the negative electrode substrate 420 may include a negative uncoated region 429b to which the first negative active material (e.g., the negative active material 421 in FIG. 4A) is not applied. For example, the negative uncoated region 429b may be provided in the second turn upper region T2_U. In an embodiment, in the negative electrode substrate 420, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 may include a first insulating layer 441 (e.g., the first insulating layer 441 in FIG. 4B) in order to compensate for the thickness difference occurring due to the negative uncoated region 429b. In an embodiment, the first insulating layer 441 may be disposed from the negative uncoated region 429b up to a peripheral region within a predetermined range from the negative uncoated region 429b (e.g., a partial region to which the first negative active material 421 is applied). For example, a portion (e.g., the central portion) of the first insulating layer 441 may be in contact with the negative electrode substrate 420 in the z-axis direction, and the remaining portion (e.g., the peripheral portion) of the first insulating layer 441 may be in contact with the peripheral region in the z-axis direction. In an embodiment, the first insulating layer 441 may be continuously disposed from the negative uncoated region 429b to the peripheral region. In this case, the first insulating layer 441 may fill a gap generated by the negative uncoated region 429b between the negative electrode substrate 420 and the peripheral region.

According to various embodiments, the first arrangement structure 610 may have a structure in which the negative electrode substrate 420 and the positive electrode substrate 410 are arranged oppositely. For example, in the first arrangement structure 610, a negative electrode tab (e.g., the negative electrode tab 425 in FIG. 6A) may be disposed on the negative electrode substrate 420, and a positive uncoated region (e.g., the positive uncoated region 419a in FIG. 6A) may be disposed on the positive electrode substrate 410. In various embodiments, a first insulating layer 441 may be disposed in the positive uncoated region 419a.

Figure 6C:
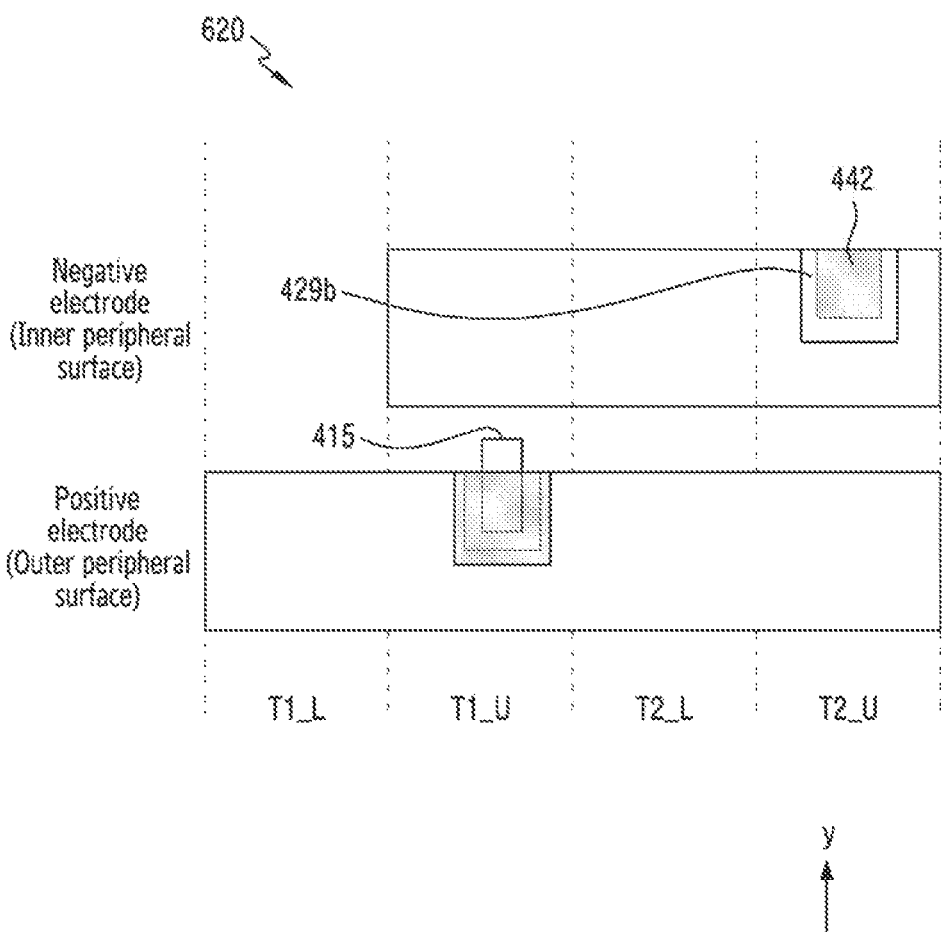
FIG. 6C is a view illustrating a portion of an arrangement structure of an electrode assembly according to an embodiment.

FIG. 6C is a view illustrating a portion of an arrangement structure of an electrode assembly according to an embodiment. In an embodiment, FIG. 6C may be a view illustrating the inner peripheral surface of the negative electrode and the outer peripheral surface of the positive electrode of FIG. 6A.

Referring to FIG. 6C, a second arrangement structure 620 according to an embodiment may be of an alignment type in which a positive electrode tab 415 is disposed in a negative uncoated region 429b (a first region) when the inner peripheral surface of a negative electrode substrate (e.g., the negative electrode substrate 420 in FIG. 4A) and the outer peripheral surface of a positive electrode substrate (e.g., the positive electrode substrate 410 in FIG. 4A) are wound. For example, the inner peripheral surface of the negative electrode substrate 420 and the outer peripheral surface of the positive electrode substrate 410 wound according to the second arrangement structure 620 may correspond to those of the alignment type illustrated in the first portion 450 of FIG. 4A.

According to an embodiment, the negative electrode substrate 420 may include a negative uncoated region 429b to which the first negative active material (e.g., the negative active material 421 in FIG. 4A) is not applied. For example, the negative uncoated region 429b may be provided in the second turn upper region T2_U. In an embodiment, in the negative electrode substrate 420, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 may include a second insulating layer 442 (e.g., the second insulating layer 442 in FIG. 4D) in order to compensate for the thickness difference occurring due to the negative uncoated region 429b. In an embodiment, the second insulating layer 442 may be disposed in the negative uncoated region 429b. For example, the second insulating layer 442 may be in contact with the negative electrode substrate 420 in the z-axis direction. In an embodiment, the second insulating layer 442 may have a thickness equal or similar to that of the first negative active material 421 in order to compensate for the thickness difference generated in the negative electrode substrate 420 due to the negative uncoated region 429b.

According to various embodiments, the second arrangement structure 620 may have a structure in which the negative electrode substrate 420 and the positive electrode substrate 410 are arranged oppositely. For example, in the second arrangement structure 620, a negative electrode tab (e.g., the negative electrode tab 425 in FIG. 6A) may be disposed on the negative electrode substrate 420, and a positive uncoated region (e.g., the positive uncoated region 419a in FIG. 6A) may be disposed on the positive electrode substrate 410. In various embodiments, a second insulating layer 442 may be disposed in the positive uncoated region 419a.

Figure 6D:
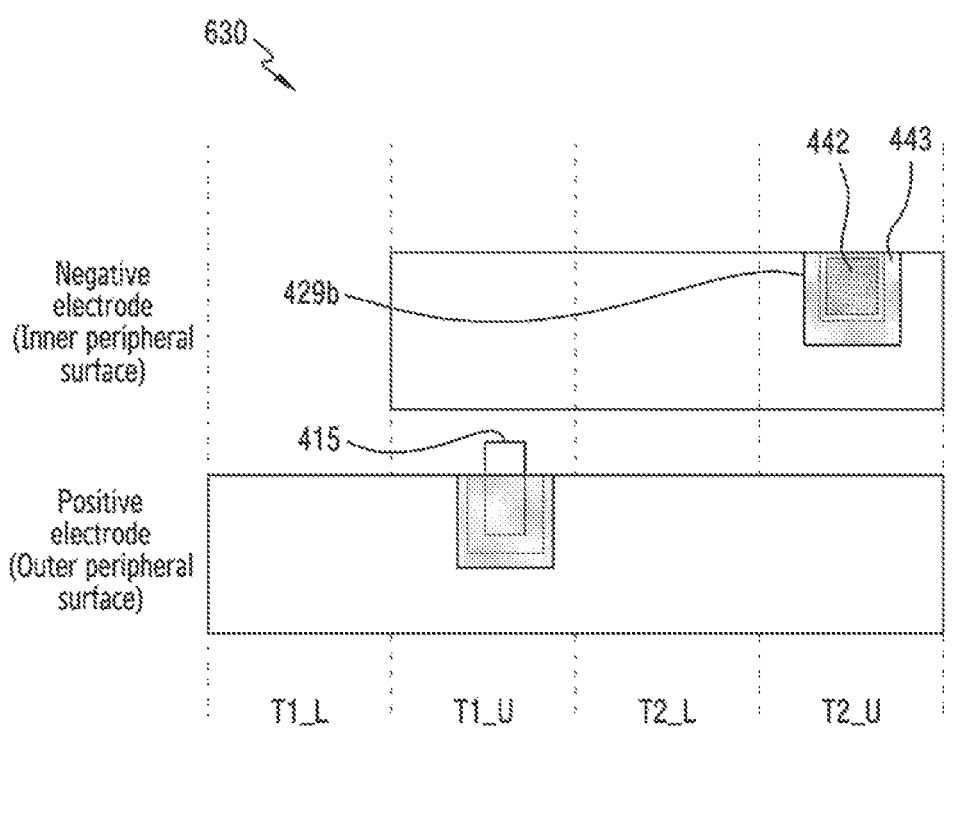
FIG. 6D is a view illustrating a portion of an arrangement structure of an electrode assembly according to an embodiment.

FIG. 6D is a view illustrating a portion of an arrangement structure of an electrode assembly according to an embodiment. In an embodiment, FIG. 6D may be a view illustrating the inner peripheral surface of the negative electrode and the outer peripheral surface of the positive electrode of FIG. 6A.

Referring to FIG. 6D, a third arrangement structure 630 according to an embodiment may be of an alignment type in which a positive electrode tab 415 is disposed in a negative uncoated region 429b (a first region) when the inner peripheral surface of a negative electrode substrate (e.g., the negative electrode substrate 420 in FIG. 4A) and the outer peripheral surface of a positive electrode substrate (e.g., the positive electrode substrate 410 in FIG. 4A) are wound. For example, the inner peripheral surface of the negative electrode substrate 420 and the outer peripheral surface of the positive electrode substrate 410 wound according to the third arrangement structure 630 may correspond to those of the alignment type illustrated in the first portion 450 of FIG. 4A.

According to an embodiment, the negative electrode substrate 420 may include a negative uncoated region 429b to which the first negative active material (e.g., the negative active material 421 in FIG. 4A) is not applied. For example, the negative uncoated region 429b may be provided in the second turn upper region T2_U. In an embodiment, in the negative electrode substrate 420, due to the negative uncoated region 429b, a predetermined thickness (e.g., the thickness corresponding to the thickness of the first negative active material 421) difference may occur in the z-axis direction between the negative uncoated region 429b and the region which surrounds the negative uncoated region 429b and to which the first negative active material 421 is applied.

According to an embodiment, the negative electrode substrate 420 may include at least one of a second insulating layer 442 (e.g., the second insulating layer 442 in FIG. 4E) and a third insulating layer 443 (e.g., the third insulating layer 443 in FIG. 4E) in order to compensate for the thickness difference occurring due to the negative uncoated region 429b.

In an embodiment, the second insulating layer 442 may be disposed in the negative uncoated region 429b. For example, the second insulating layer 442 may be in contact with the negative electrode substrate 420 in the z-axis direction. In an embodiment, the second insulating layer 442 may have a thickness equal or similar to that of the first negative active material 421 in order to compensate for the thickness difference generated in the negative electrode substrate 420 due to the negative uncoated region 429b.

In an embodiment, the third insulating layer 443 may be disposed from the negative uncoated region 429b up to a peripheral region within a predetermined range from the negative uncoated region 429b (e.g., a partial region to which the first negative active material 421 is applied). For example, a portion (e.g., the central portion) of the third insulating layer 443 may be in contact with the second insulating layer 442 in the z-axis direction, and the remaining portion (e.g., the peripheral portion) of the third insulating layer 443 may be in contact with the peripheral region in the z-axis direction. In this case, the third insulating layer 443 may fill a gap between the second insulating layer 442 and the peripheral region.

According to various embodiments, the third arrangement structure 630 may have a structure in which the negative electrode substrate 420 and the positive electrode substrate 410 are arranged oppositely. For example, in the third arrangement structure 630, a negative electrode tab (e.g., the negative electrode tab 425 in FIG. 6A) may be disposed on the negative electrode substrate 420, and a positive uncoated region (e.g., the positive uncoated region 419a in FIG. 6A) may be disposed on the positive electrode substrate 410. In various embodiments, at least one of a second insulating layer 442 and a third insulating layer 443 may be disposed in the positive uncoated region 419a.

Figure 7:
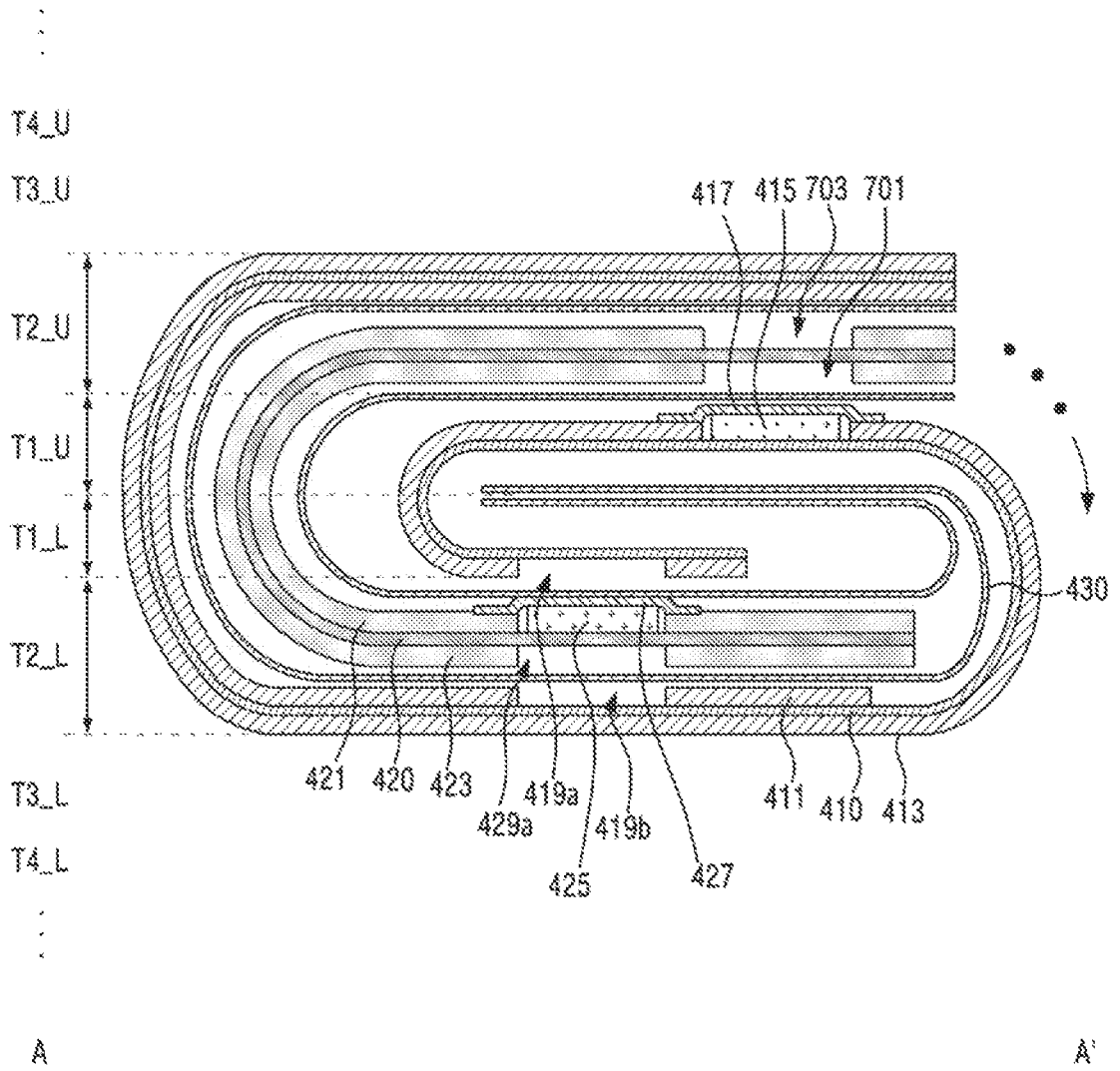
FIG. 7 is a cross-sectional view of a battery in a region to which a positive electrode tab and a negative electrode tab according to another embodiment are attached.

FIG. 7 is a cross-sectional view of a battery in a region to which a positive electrode tab and a negative electrode tab according to another embodiment are attached. For example, FIG. 7 may be a cross-sectional view of the battery 100 taken along line A-A' in FIG. 1A.

Referring to FIG. 7, unlike the electrode assembly 110 illustrated in FIG. 4A, in an electrode assembly (e.g., the electrode assembly 110 in FIG. 1A or FIG. 1B) according to another embodiment, the negative electrode substrate 420 may be provided with negative uncoated regions 701 and 703 on the inner and outer peripheral surfaces facing the positive electrode tab 415. For example, on the inner peripheral surface of the negative electrode substrate 420, a negative uncoated region 701 may be provided in a portion of the second turn upper region T2_U facing the positive electrode tab 415. On the outer peripheral surface of the negative electrode substrate 420, a negative uncoated region 703 may be provided in a portion of the second turn upper region T2_U facing the positive electrode tab 415.

In various embodiments, in the negative electrode substrate 420, due to the negative uncoated regions 701 and 703, a predetermined thickness (e.g., the thickness corresponding to the thicknesses of the negative active materials 421 and 423) difference may occur between the negative uncoated regions 701 and 703 and the regions which surround the negative uncoated regions 701 and 703 and to which the negative active materials 421 and 423 are applied. In various embodiments, the negative electrode substrate 420 may include an insulating layer (e.g., the insulating layers 441 to 443 in FIGS. 4B to 4E) to compensate for the thickness difference occurring due to the negative uncoated regions 701 and 703.

Figure 8:
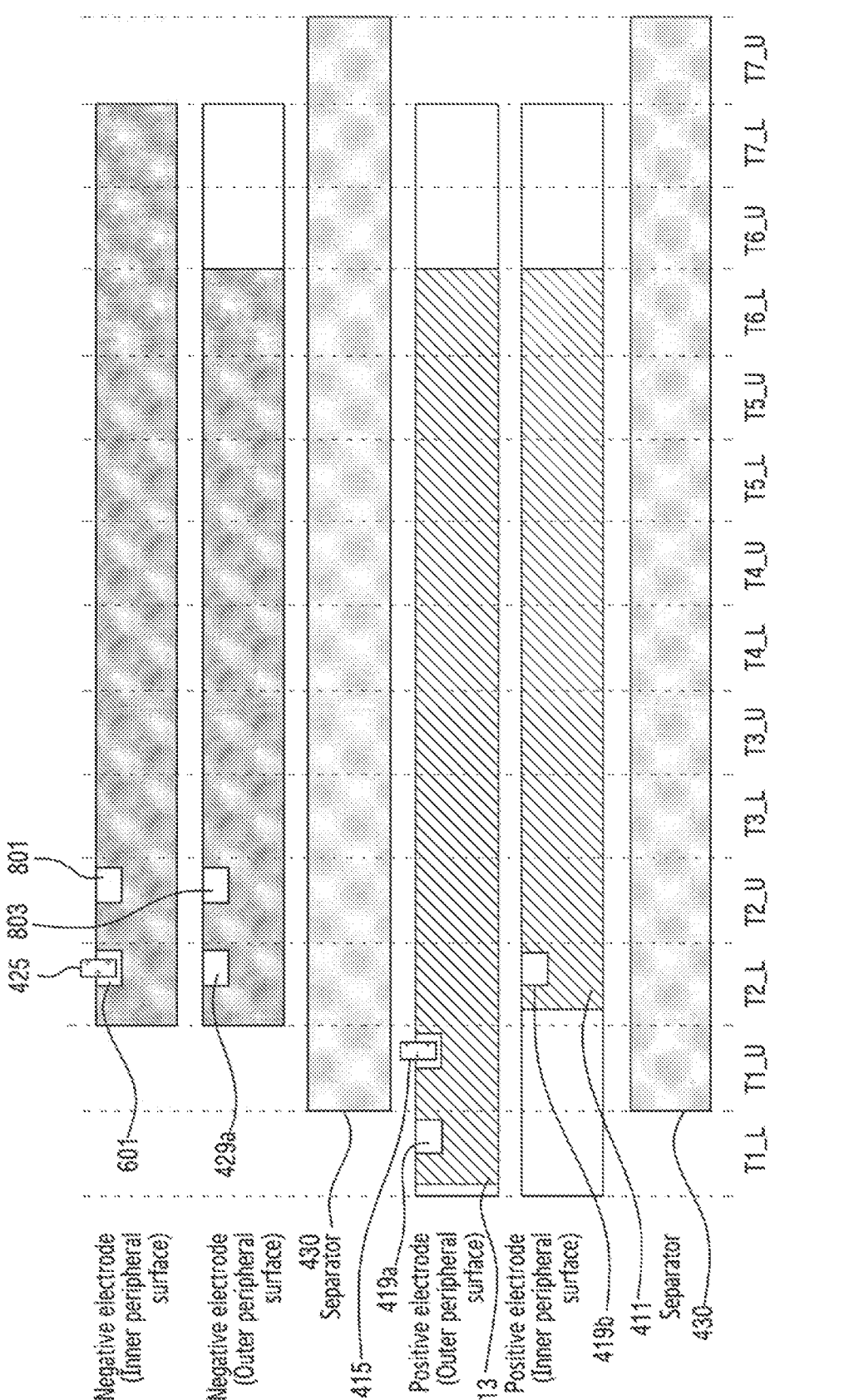
FIG. 8 is a cross-sectional view illustrating an arrangement structure of an electrode assembly according to an embodiment.

FIG. 8 is a cross-sectional view illustrating an arrangement structure of an electrode assembly according to an embodiment.

For example, the arrangement structure of the electrode assembly illustrated in FIG. 8 (e.g., the electrode assembly 110 in FIG. 1A or FIG. 1B) may be of an alignment type in which the negative uncoated regions 701 and 703 or the positive uncoated regions 419a and 419b are disposed in a facing portion or an overlapping portion of the positive electrode tab 415 or the negative electrode tab 425 when the assembly 110 is wound, as illustrated in FIG. 7.

Unlike the arrangement structure of the electrode assembly 110 illustrated in FIG. 6A, the arrangement structure of the electrode assembly 110 illustrated in FIG. 8 may be provided with a negative uncoated region 803 on the outer peripheral surface, as well as a negative uncoated region 801 (e.g., the negative uncoated region 429b in FIG. 4A) on the inner peripheral surface corresponding to the second turn upper region T2_U.

In various embodiments, in the negative electrode substrate (e.g., the negative electrode substrate 420 in FIG. 8), due to the negative uncoated regions 801 and 803, a predetermined thickness (e.g., the thickness corresponding to the thicknesses of the negative active materials 421 and 423) difference may occur between the negative uncoated regions 801 and 803 and the regions which surround the negative uncoated regions 801 and 803 and to which the negative active materials (e.g., the negative active materials 421 and 423 in FIG. 8) are applied. In various embodiments, the negative electrode substrate 420 may include an insulating layer (e.g., the insulating layers 441 to 443 in FIGS. 4B to 4E) to compensate for the thickness difference occurring due to the negative uncoated regions 801 and 803.

Figure 9:
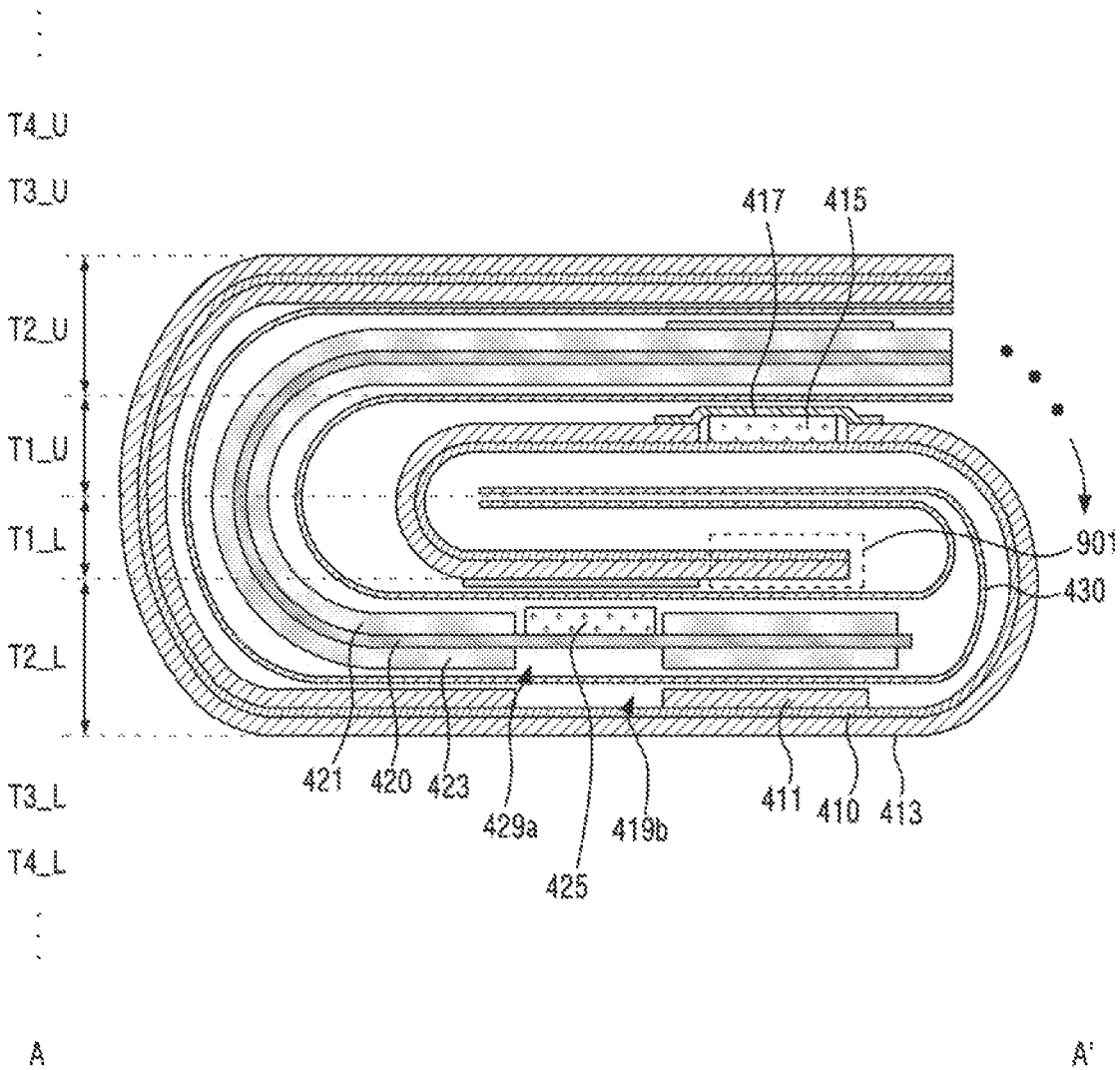
FIG. 9 is a cross-sectional view of a battery in a region to which a positive electrode tab and a negative electrode tab according to still another embodiment are attached.

FIG. 9 is a cross-sectional view of a battery in a region to which a positive electrode tab and a negative electrode tab according to still another embodiment are attached.

For example, FIG. 9 may be a cross-sectional view of the battery 100 taken along line A-A' in FIG. 1A.

Referring to FIG. 9, unlike the electrode assembly 110 illustrated in FIG. 4A, in an electrode assembly (e.g., the electrode assembly 110 in FIG. 1A or FIG. 1B) according to another embodiment, one end of the positive electrode substrate 410 to which a positive active material is applied may extend to a region 901 overlapping the positive electrode tab 415. For example, when the positive electrode tab 415 is disposed in the upper region T1_U of the first turn, the pressure due to the step of the positive electrode tab 415 may damage the separator 430 and bring the positive electrode tab 415 and the negative active material 421 above or below the positive electrode tab 415 into direct contact with each other and thus cause ignition or explosion. In an embodiment of the disclosure, since one end of the positive electrode substrate 410 applied with the positive active material extends to a region overlapping the positive electrode tab 415, even if the separator 430 is damaged due to the step of the positive electrode tab 415, it is possible to prevent ignition or explosion since the positive electrode tab 415 comes into contact with the positive electrode substrate 410 which has the same polarity as the positive electrode tab 415 and overlaps the lower portion of the positive electrode tab 415, rather than a negative electrode substrate 410.

In various embodiments, due to the negative uncoated region 429a (or the positive uncoated region 419b) in the negative electrode substrate 420 (or the positive electrode substrate 410), a predetermined thickness (e.g., the thickness corresponding to the thickness of the active material 423 or 411) difference may occur between the negative uncoated region 429*a* and the region which surrounds the negative uncoated region 429*a* (or the positive uncoated region 419*b*) and to which the second negative active material 423 (or the first positive active material 411) is applied. In various embodiments, the negative electrode substrate 420 (or the positive electrode substrate 410) may include an insulating layer (e.g., the insulating layer 441 to 443 in FIGS. 4B to 4E) in order to compensate for the thickness difference occurring due to the negative uncoated region 429*a* (or the positive uncoated region 419*b*).

Figure 10:
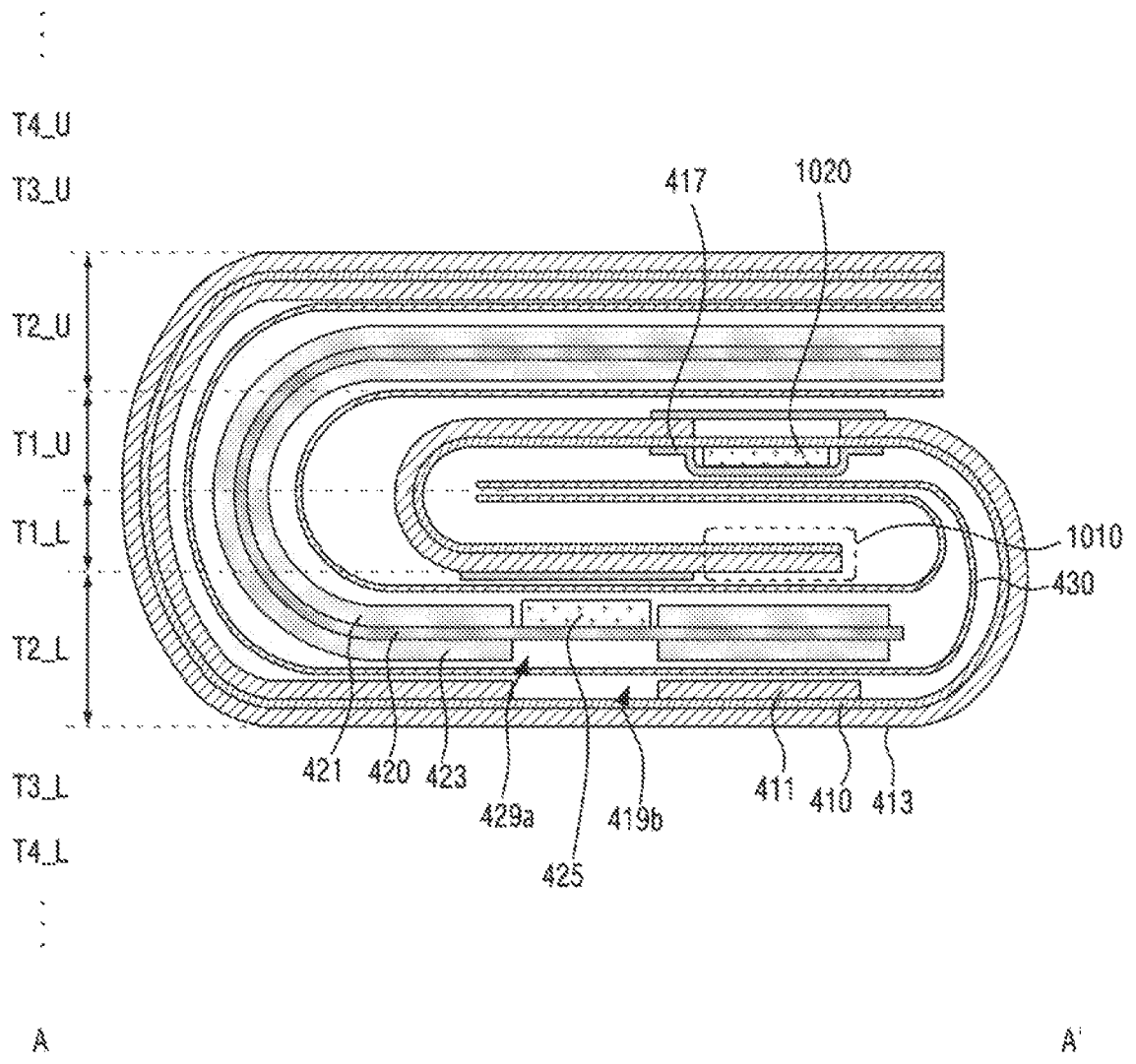
FIG. 10 is a view illustrating a modified example of a battery structure according to another embodiment.

FIG. 10 is a view illustrating a modified example of a battery structure according to another embodiment. For example, FIG. 10 may be a cross-sectional view of the battery 100 taken along line A-A' in FIG. 1A.

Referring to FIG. 10, unlike the electrode assembly 110 illustrated in FIG. 9, in the electrode assembly (e.g., the electrode assembly 110 in FIG. 1A or FIG. 1B) according to an embodiment of the disclosure, a positive electrode tab 1020 (e.g., the positive electrode tab 415) may be attached to the inner peripheral surface of the positive electrode substrate 410. When the positive electrode tab 1020 is attached to the inner peripheral surface of the positive electrode substrate 410, the pressure due to the step of the positive electrode tab 1020 may be reduced from the standpoint of the negative electrode substrate 420 located outside (above) the positive electrode tab 1020. However, since the positive electrode tab 1020 is attached to the inner peripheral surface, the downward pressure of the positive electrode tab 1020 is increased. Thus, in an embodiment of the disclosure, as indicated by reference numeral 1010, the positive active material (e.g., positive active material 411 or 413) may extend up to a region in which one end of the positive electrode substrate 410 and the positive electrode tab 1020 overlap each other.

In various embodiments, due to the negative uncoated region 429*a* (or the positive uncoated region 419*b*) in the negative electrode substrate 420 (or the positive electrode substrate 410), a predetermined thickness (e.g., the thickness corresponding to the thickness of the active material 423 or 411) difference may occur between the negative uncoated region 429*a* and the region which surrounds the negative uncoated region 429*a* (or the positive uncoated region 419*b*) and to which the second negative active material 423 (or the first positive active material 411) is applied. In various embodiments, the negative electrode substrate 420 (or the positive electrode substrate 410) may include an insulating layer (e.g., the insulating layer 441 to 443 in FIGS. 4B to 4E) in order to compensate for the thickness difference occurring due to the negative uncoated region 429*a* (or the positive uncoated region 419*b*).

Figure 11:
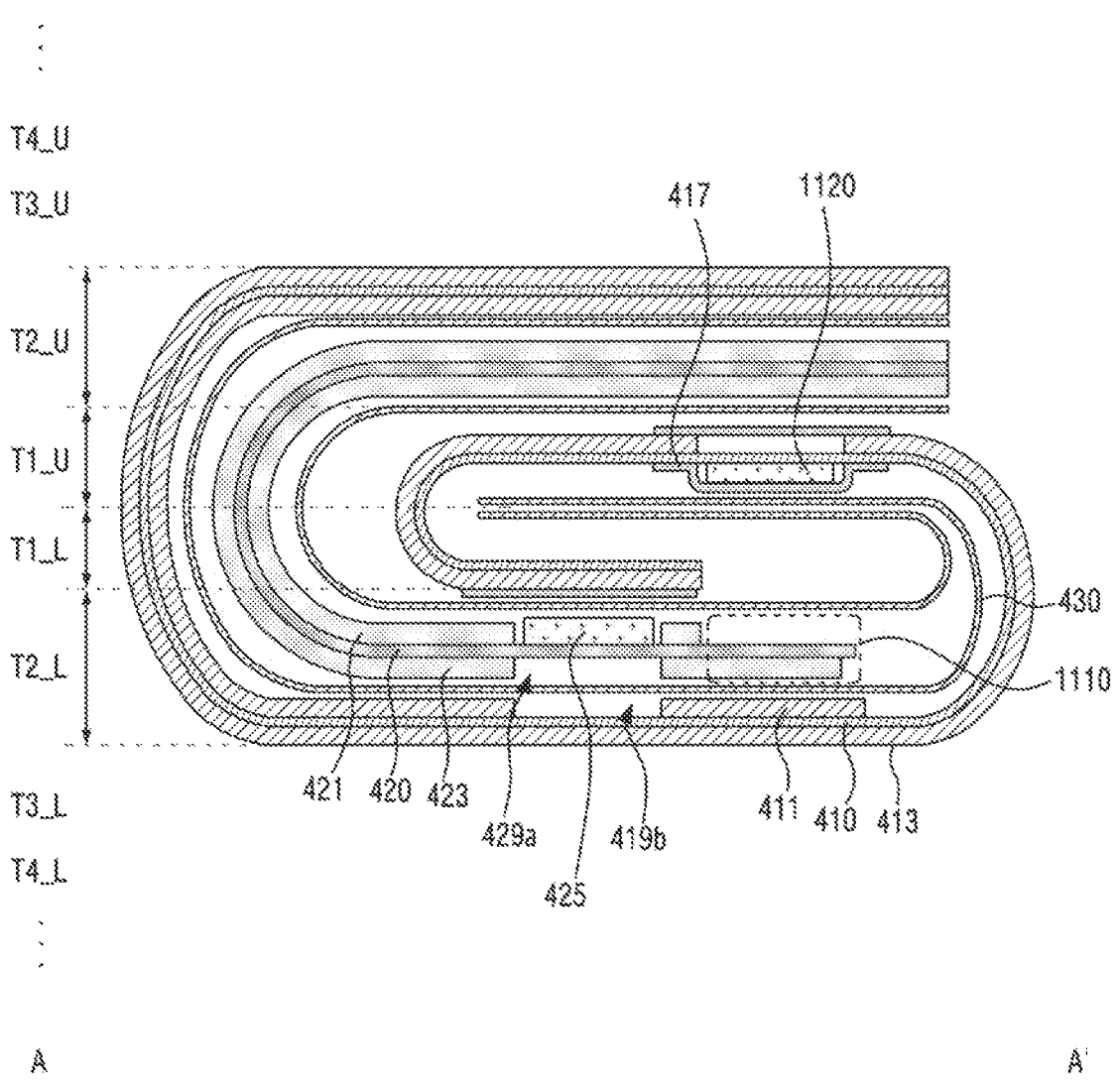
FIG. 11 is a view illustrating another modified example of a battery structure according to another embodiment.

FIG. 11 is a view illustrating another modified example of a battery structure according to another embodiment. For example, FIG. 11 may be a cross-sectional view of the battery 100 taken along line A-A' in FIG. 1A.

Referring to FIG. 11, unlike the electrode assembly 110 illustrated in FIG. 9, in the electrode assembly (e.g., the electrode assembly 110 in FIG. 1A or FIG. 1B) according to an embodiment of the disclosure, a positive electrode tab 1120 (e.g., the positive electrode tab 415) may be attached to the inner peripheral surface of the positive electrode substrate 410. When the positive electrode tab 1120 is attached to the inner peripheral surface of the positive electrode substrate 410, the pressure due to the step of the positive electrode tab 1120 may be reduced from the standpoint of the negative electrode substrate 420 located outside (above) the positive electrode tab 1120. However, since the positive electrode tab 1120 is attached to the inner peripheral surface, the downward pressure of the positive electrode tab 1120 is increased. Thus, in an embodiment of the disclosure, as indicated by reference numeral 1110, the inner peripheral surface overlapping the lower portion of the positive electrode tab 415 at one end of the negative electrode substrate 420 may be provided with a negative uncoated region to which a negative active material is applied. For example, when the positive electrode tab 1120 is attached to the inner peripheral surface of the positive electrode substrate 410 in the first turn upper region T1_U, the negative uncoated region 1110 may be provided since the end region of the inner peripheral surface of the negative electrode substrate 420 overlaps the lower portion of the positive electrode tab 415 in the first turn lower region T1_L. However, in the area overlapping the lower portion of the positive electrode tab 415, a negative active material 423 may be applied to the outer peripheral surface of the negative electrode tab 420.

In various embodiments, due to the negative uncoated region 429*a* (or the positive uncoated region 419*b*) in the negative electrode substrate 420 (or the positive electrode substrate 410), a predetermined thickness (e.g., the thickness corresponding to the thickness of the active material 423 or 411) difference may occur between the negative uncoated region 429*a* and the region which surrounds the negative uncoated region 429*a* (or the positive uncoated region 419*b*) and to which the second negative active material 423 (or the first positive active material 411) is applied. In various embodiments, the negative electrode substrate 420 (or the positive electrode substrate 410) may include an insulating layer (e.g., the insulating layer 441 to 443 in FIGS. 4B to 4E) in order to compensate for the thickness difference occurring due to the negative uncoated region 429*a* (or the positive uncoated region 419*b*).

Figure 12:
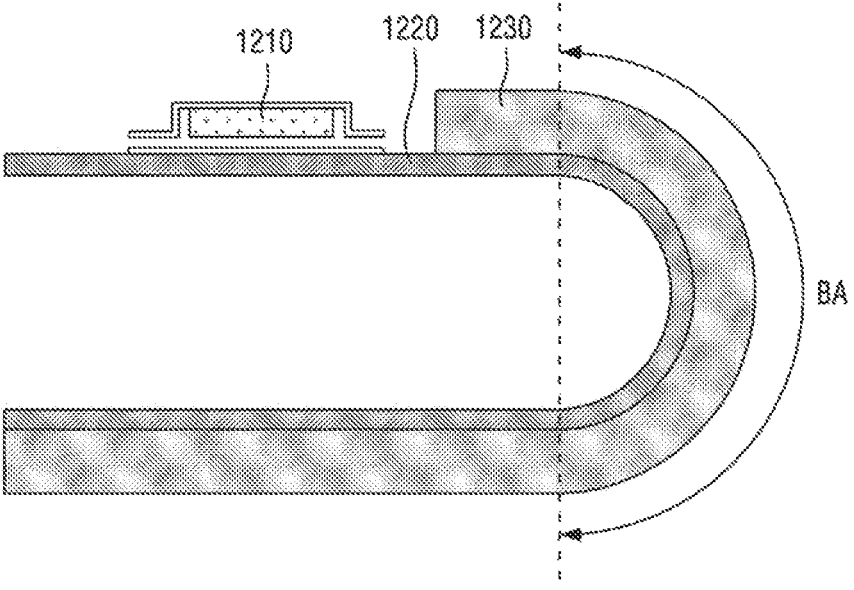
FIG. 12 is a view illustrating a portion of a cross section of a negative electrode substrate or a positive electrode substrate according to an embodiment.

FIG. 12 is a view illustrating a portion of a cross section of a negative electrode substrate or a positive electrode substrate according to an embodiment.

Referring to FIG. 12, when the battery 100 according to an embodiment of the disclosure is configured in a normal type to be the same as or similar to the example illustrated in FIG. 2, an active material 1230 (e.g., the positive active material 411 or 413 or the negative active material 421 or 423) may extend to a region in which a substrate 1220 to which an electrode tab 1210 (e.g., the positive electrode tab 121 or the negative electrode tab 123) is attached is bent. When the active material 1230 is also applied to the region in which the substrate 1220 is bent, separation of the active material 1230 may be prevented, and the capacity of the battery 100 may be increased.

Figure 13:
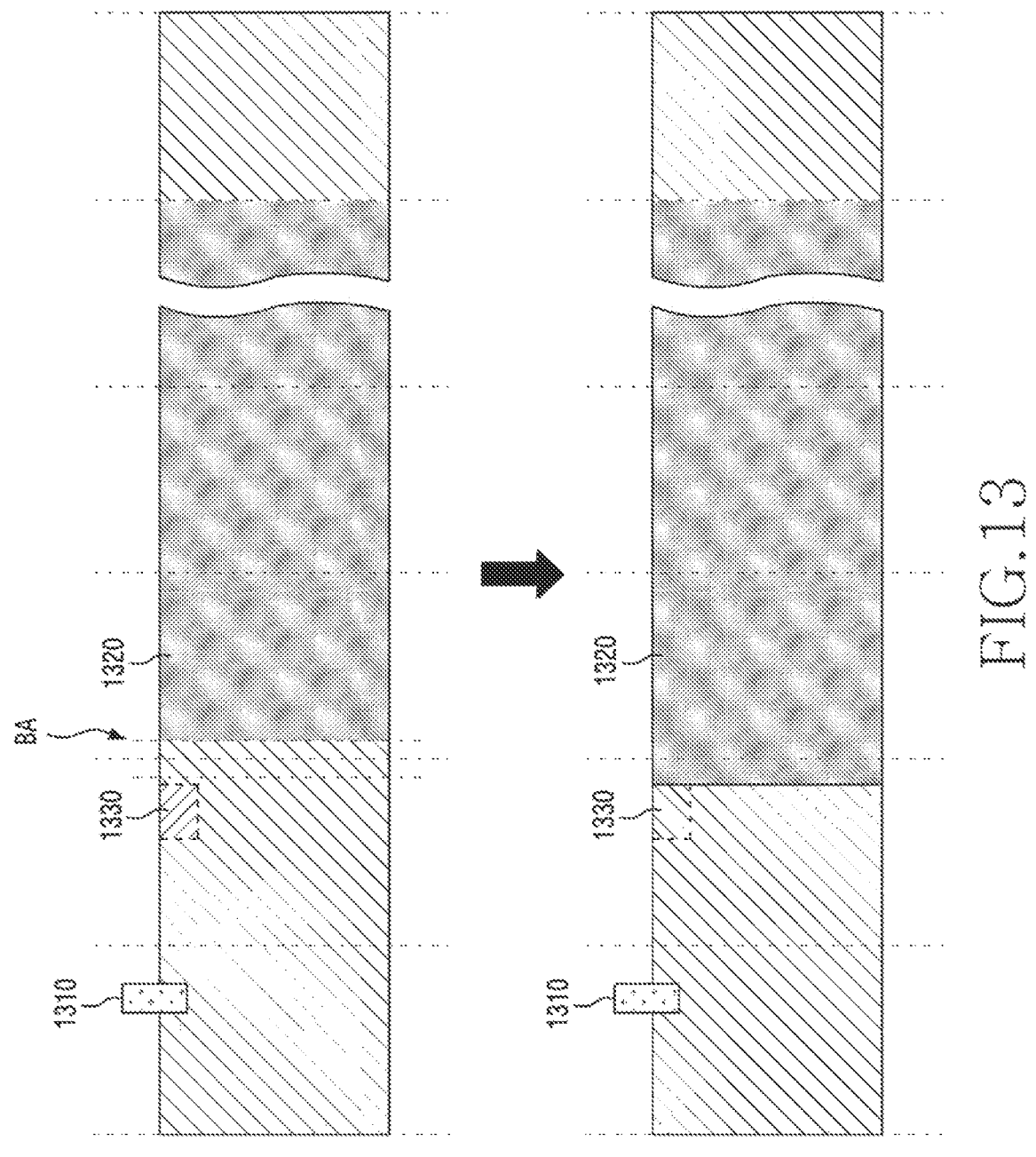
FIG. 13 is a view illustrating an active material application area of a negative electrode substrate or a positive electrode substrate according to an embodiment.

FIG. 13 is a view illustrating an active material application region of a negative electrode substrate or a positive electrode substrate according to an embodiment. For example, FIG. 13 may be a plan view illustrating the negative electrode substrate or the positive electrode substrate illustrated in FIG. 12 in an unwound state.

Referring to FIG. 13, the battery 100 according to an embodiment of the disclosure may be configured in a normal type to be the same as or similar to the example illustrated in FIG. 2. For example, a positive electrode tab 1310 (e.g., the positive electrode tab 415) may be attached to one end of the substrate, and the first turn region T1 around the positive electrode tab 1310 may be provided with a positive uncoated region to which a positive active material 1320 (e.g., the positive active material 411 or 413) is not applied.

According to an embodiment, a partial region of the positive uncoated region may be an overlapping portion 1330 overlapping a negative electrode tab 133, and unlike the example illustrated in FIG. 2, a positive active material 1320 application region may extend to a boundary point between a bending region BA and the overlapping portion 1330. According to various embodiments, the overlapping portion 1330 may be a region that faces or overlaps the negative electrode tab (e.g., the negative electrode tab 425) in the wound state.

According to various embodiments, each of the positive electrode substrate 112 and the negative electrode substrate 114, and the inner and outer peripheral surfaces of each of the substrates 112 and 114 may have structures to which the normal type illustrated in FIG. 2 or the expansion type as illustrated in FIG. 3 is selectively applied. The details will be described below.

In various embodiments, due to a positive uncoated region (e.g., the positive uncoated region 419b in FIG. 11), in the positive electrode substrate (e.g., the positive electrode substrate 410 in FIG. 11), a predetermined thickness (e.g., the thickness corresponding to the positive active material 1320) difference may occur between the positive uncoated region and the area to which the positive active material 1320 is applied. In various embodiments, the positive electrode substrate 410 may include an insulating layer (e.g., the insulating layers 441 to 443 in FIGS. 4B to 4E) to compensate for the thickness difference occurring due to the negative uncoated region 419b.

Figure 14:
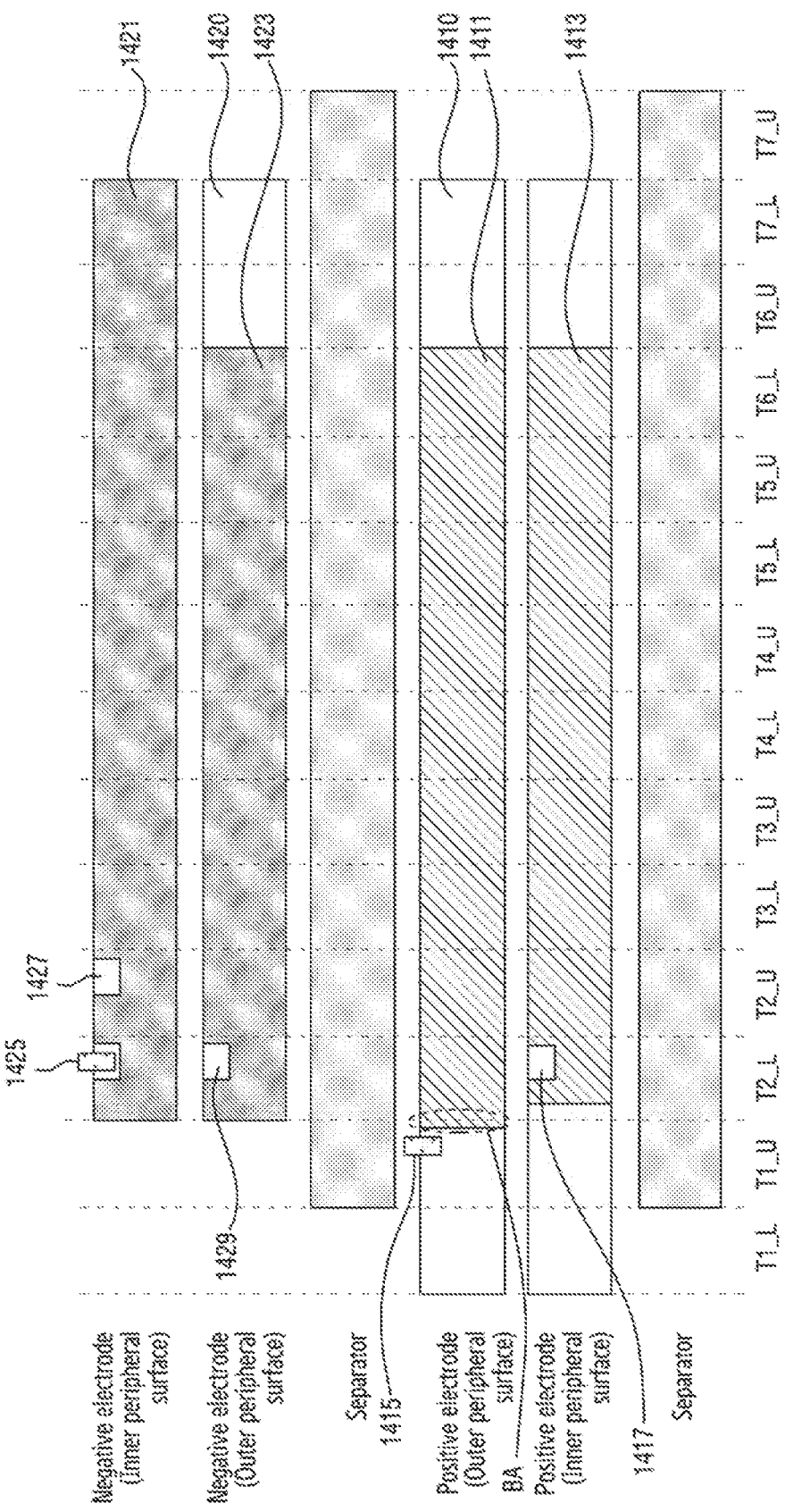
FIG. 14 is a view illustrating an arrangement structure of an electrode assembly according to a first embodiment.

FIG. 14 is a view illustrating an arrangement structure of an electrode assembly according to a first embodiment.

Referring to FIG. 14, in the electrode assembly 110 according to the first embodiment, a positive electrode substrate 1410 may be configured in a normal type, and a negative electrode substrate 1420 may be configured in an expansion type.

For example, a first positive active material 1411 may be applied to the outer peripheral surface of the positive electrode substrate 1410, wherein the first positive active material 1411 may be applied only to a portion before the region to which the positive electrode tab 1415 is attached, so that a positive uncoated region may be provided at the end of the outer peripheral surface adjacent to the positive electrode tab 1415. According to an embodiment, the first positive active material 1411 application region may extend to the bending region BA adjacent to the positive electrode tab 1415.

Alternatively, a second positive active material 1413 may be applied to the inner peripheral surface of the positive electrode substrate 1410, wherein the second positive active material 1413 may be applied only to a portion before the region to which the positive electrode tab 1415 is attached, so that a positive uncoated region may be provided at the end of the inner peripheral surface adjacent to the positive electrode tab 1415. According to an embodiment, as indicated by reference numeral 1417, the inner peripheral surface of the positive electrode substrate 1410 may be provided, in a region overlapping the negative electrode tab 1425, with a positive uncoated region to which the second positive active material 1413 is not applied.

Additionally, the first negative active material 1421 may be applied to the inner peripheral surface of the negative electrode substrate 1420, wherein the first negative active material 1421 may be applied up to the end of the inner peripheral surface to which the negative electrode tab 1425 is attached. According to an embodiment, around the region to which the negative electrode tab 1425 is attached and in a first region 1427 which overlaps the positive electrode tab

1415 when the electrode assembly 110 is wound, the inner peripheral surface of the negative electrode substrate 1420 may be provided with a negative uncoated region to which the first negative active material 1421 is not applied.

Alternatively, a second negative active material 1423 may be applied to the outer peripheral surface of the negative electrode substrate 1420, wherein the second negative active material 1423 may be applied up to the end of the outer peripheral surface to which the negative electrode tab 1415 is attached. According to an embodiment, the region 1429 overlapping the negative electrode tab 1425 on the outer peripheral surface of the negative electrode substrate 1420 may be provided with a negative uncoated region to which the second negative active material 1423 is not applied.

In various embodiments, in the negative electrode substrate (e.g., the negative electrode substrate 420 in FIG. 11), due to the negative uncoated region 1427, a predetermined thickness (e.g., the thickness corresponding to the thickness of the negative active material 421 or 423) difference may occur between the negative uncoated region 1427 and the region which surrounds the negative uncoated region 1427 and to which the negative active material (e.g., the negative active material 421 or 423 in FIG. 11) is applied. In various embodiments, the negative electrode substrate 420 may include an insulating layer (e.g., the insulating layers 441 to 443 in FIGS. 4B to 4E) to compensate for the thickness difference occurring due to the negative uncoated region 1427.

Figure 15:
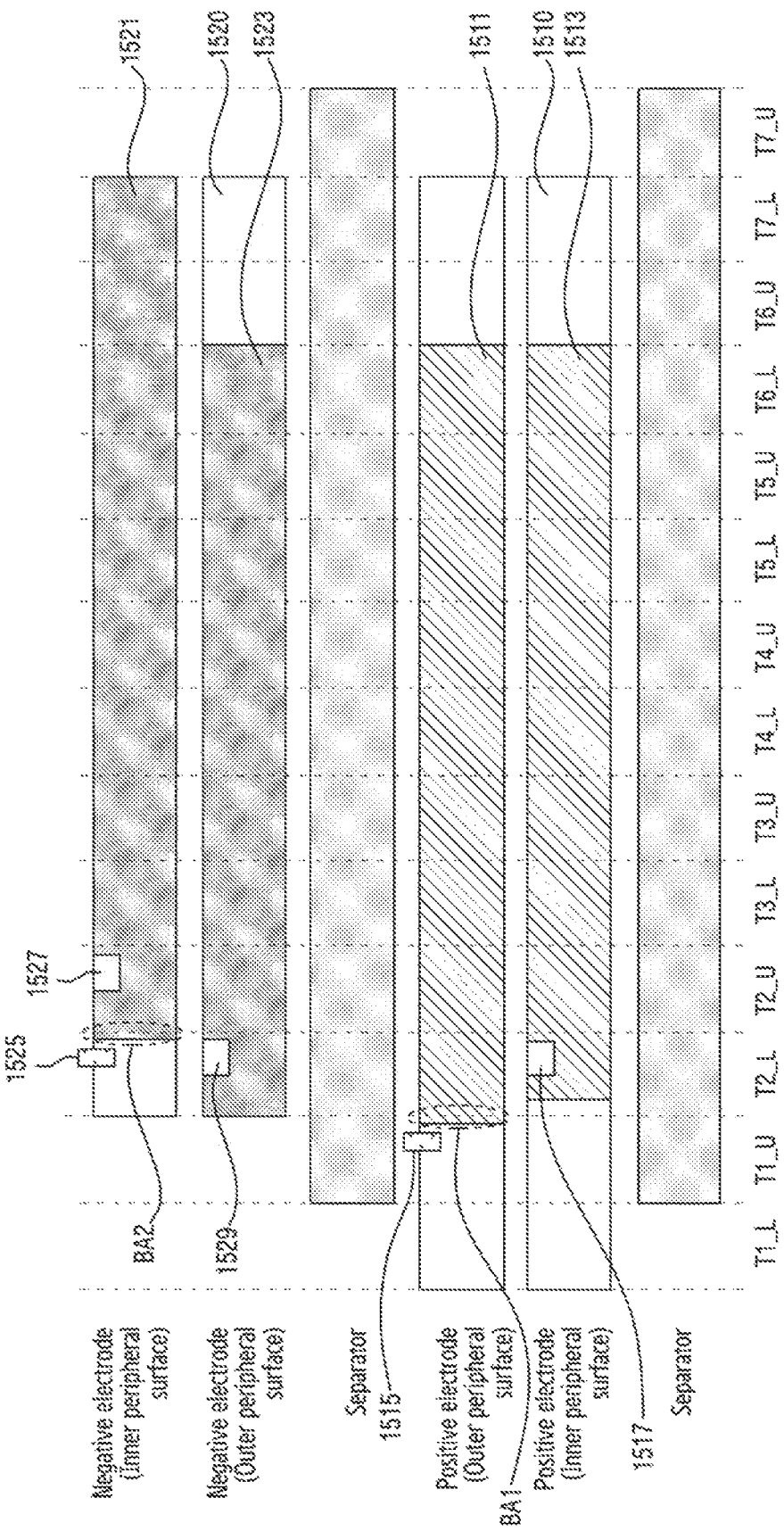
FIG. 15 is a view illustrating an arrangement structure of an electrode assembly according to a second embodiment.

FIG. 15 is a view illustrating an arrangement structure of an electrode assembly according to a second embodiment.

Referring to FIG. 15, in the electrode assembly (e.g., the electrode assembly 110 in FIG. 1A or FIG. 1B) according to the second embodiment, a positive electrode substrate 1510 may be configured in a normal type, and a negative electrode substrate 1520 may be configured in a normal type and an expansion type.

For example, the structure of the positive electrode substrate 1510 may be similar to that of the positive electrode substrate 1410 illustrated in FIG. 14. For example, a first positive active material 1511 may be applied to the outer peripheral surface of the positive electrode substrate 1510, wherein the first positive active material 1511 may be applied only to a portion before the region to which the positive electrode tab 1515 is attached, so that a positive uncoated region may be provided at the end of the outer peripheral surface adjacent to the positive electrode tab 1515. According to an embodiment, the first positive active material 1511 application region may extend to a first bending region BA1 adjacent to the positive electrode tab 1515.

Alternatively, a second positive active material 1513 may be applied to the inner peripheral surface of the positive electrode substrate 1510, wherein the second positive active material 1513 may be applied only to a portion before the region to which the positive electrode tab 1515 is attached, so that a positive uncoated region may be provided at the end of the inner peripheral surface adjacent to the positive electrode tab 1515. According to an embodiment, on the inner peripheral surface of the positive electrode substrate 1510, as indicated by reference numeral 1517, a positive uncoated region to which the second positive active material 1513 is not applied is provided in a region overlapping the negative electrode tab 1525.

Additionally, a first negative active material 1521 may be applied to the inner peripheral surface of the negative electrode substrate 1520, wherein the first negative active material 1521 may be applied only to a portion before the region to which the negative electrode tab 1525 is attached, so that a negative uncoated region may be provided at the end of the inner peripheral surface adjacent to the negative electrode tab 1525. According to an embodiment, the first negative active material 1521 application region may extend to a second bending region BA2 adjacent to the negative electrode tab 1525. According to an embodiment, in a first region 1527 which overlaps the positive electrode tab 1515 when the electrode assembly 110 is wound, the inner peripheral surface of the negative electrode substrate 1520 may be provided with a negative uncoated region to which the first negative active material 1521 is not applied.

Alternatively, a second negative active material 1523 may be applied to the outer peripheral surface of the negative electrode substrate 1520, wherein the second negative active material 1523 may be applied up to the end of the outer peripheral surface to which the negative electrode tab 1515 is attached. According to an embodiment, the region 1529 overlapping the negative electrode tab 1525 on the outer peripheral surface of the negative electrode substrate 1520 may be provided with a negative uncoated region to which the second negative active material 1523 is not applied.

In various embodiments, in the negative electrode substrate (e.g., the negative electrode substrate 420 in FIG. 11), due to the negative uncoated region 1527, a predetermined thickness (e.g., the thickness corresponding to the thickness of the negative active material 421 or 423) difference may occur between the negative uncoated region 1527 and the region which surrounds the negative uncoated region 1527 and to which the negative active material (e.g., the negative active material 421 or 423 in FIG. 11) is applied. In various embodiments, the negative electrode substrate 420 may include an insulating layer (e.g., the insulating layers 441 to 443 in FIGS. 4B to 4E) to compensate for the thickness difference occurring due to the negative uncoated region 1527.

Figure 16:
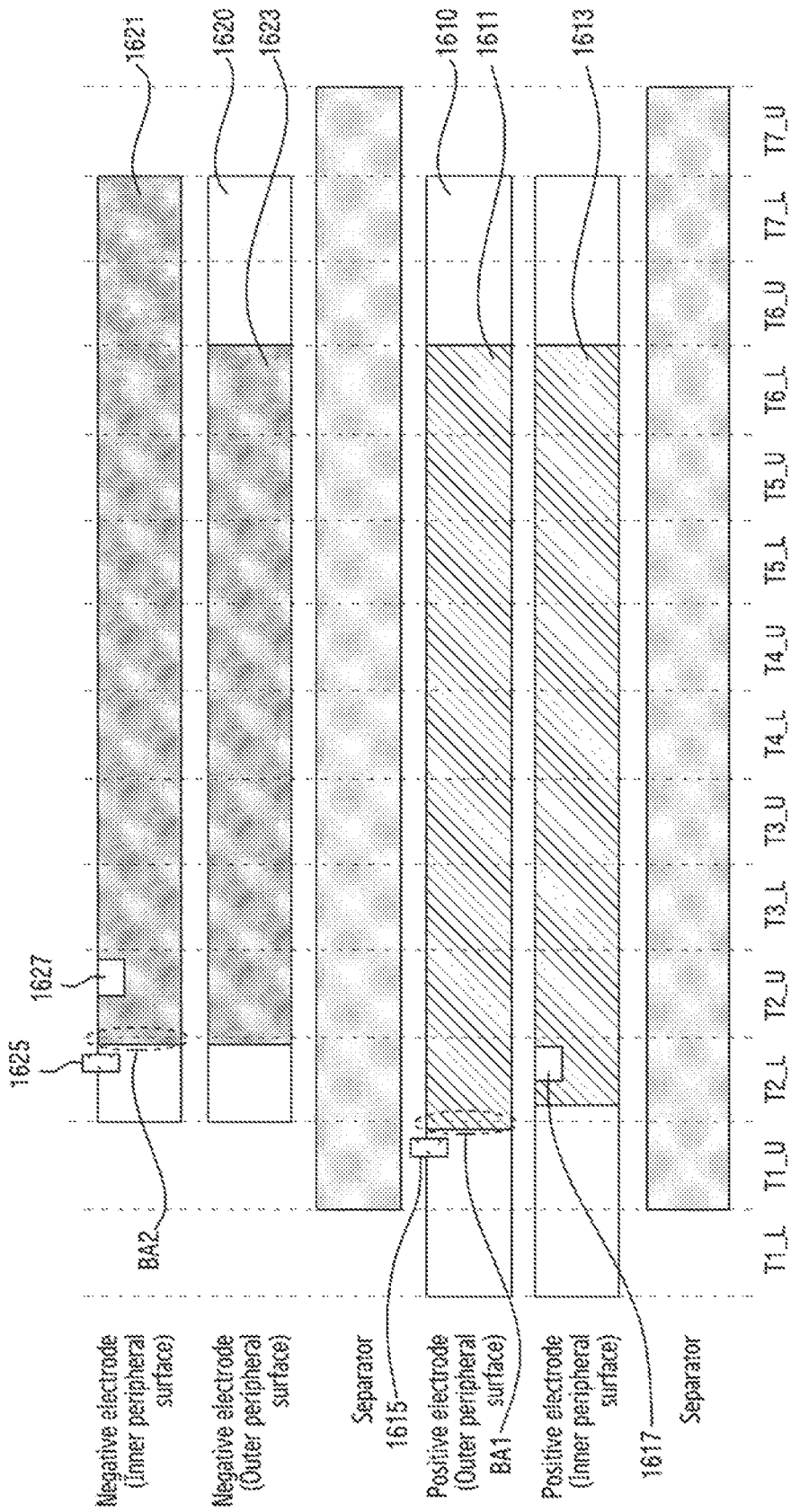
FIG. 16 is a view illustrating an arrangement structure of an electrode assembly according to a third embodiment.

FIG. 16 is a view illustrating an arrangement structure of an electrode assembly according to a third embodiment.

Referring to FIG. 16, in the electrode assembly (e.g., the electrode assembly 110 in FIG. 1A or FIG. 1B) according to an embodiment of the disclosure, the positive electrode substrate 1610 and the negative electrode substrate 1620 may be configured in a normal type.

For example, the structure of the positive electrode substrate 1610 may be similar to that of the positive electrode substrate 1410 illustrated in FIG. 14. For example, a first positive active material 1611 may be applied to the outer peripheral surface of the positive electrode substrate 1610, wherein the first positive active material 1611 may be applied only to a portion before the region to which the positive electrode tab 1615 is attached, so that a positive uncoated region may be provided at the end of the outer peripheral surface adjacent to the positive electrode tab 1615. According to an embodiment, the first positive active material 1611 application region may extend to a first bending region BA1 adjacent to the positive electrode tab 1615.

Alternatively, a second positive active material 1613 may be applied to the inner peripheral surface of the positive electrode substrate 1610, wherein the second positive active material 1613 may be applied only to a portion before the region to which the positive electrode tab 1615 is attached, so that a positive uncoated region may be provided at the end of the inner peripheral surface adjacent to the positive electrode tab 1615. According to an embodiment, on the inner peripheral surface of the positive electrode substrate 1610, as indicated by reference numeral 1617, a positive uncoated region to which the second positive active material 1613 is not applied is provided in a region overlapping the negative electrode tab 1625.

Additionally, a first negative active material 1621 may be applied to the inner peripheral surface of the negative electrode substrate 1620, wherein the first negative active material 1621 may be applied only to a portion before the region to which the negative electrode tab 1625 is attached, so that a negative uncoated region may be provided at the end of the inner peripheral surface adjacent to the negative electrode tab 1625. According to an embodiment, the first negative active material 1621 application region may extend to a second bending region BA2 adjacent to the negative electrode tab 1625. According to an embodiment, in a first region 1627 which overlaps the positive electrode tab 1515 when the electrode assembly 110 is wound, the inner peripheral surface of the negative electrode substrate 1620 may be provided with a negative uncoated region to which the first negative active material 1621 is not applied.

Alternatively, a second negative active material 1623 may be applied to the outer peripheral surface of the negative electrode substrate 1620, wherein the second negative active material 1623 may be applied only to a portion before the region to which the negative electrode tab 1625 is attached, so that a negative uncoated region may be provided at the end of the inner peripheral surface adjacent to the negative electrode tab 1625. According to an embodiment, the second negative active material 1623 application region may extend to a second bending region BA2 adjacent to the negative electrode tab 1625.

In various embodiments, in the negative electrode substrate (e.g., the negative electrode substrate 420 in FIG. 11), due to the negative uncoated region 1627, a predetermined thickness (e.g., the thickness corresponding to the thickness of the negative active material 421 or 423) difference may occur between the negative uncoated region 1627 and the region which surrounds the negative uncoated region 1627 and to which the negative active material (e.g., the negative active material 421 or 423 in FIG. 11) is applied. In various embodiments, the negative electrode substrate 420 may include an insulating layer (e.g., the insulating layers 441 to 443 in FIGS. 4B to 4E) to compensate for the thickness difference occurring due to the negative uncoated region 1627.

Figure 17:
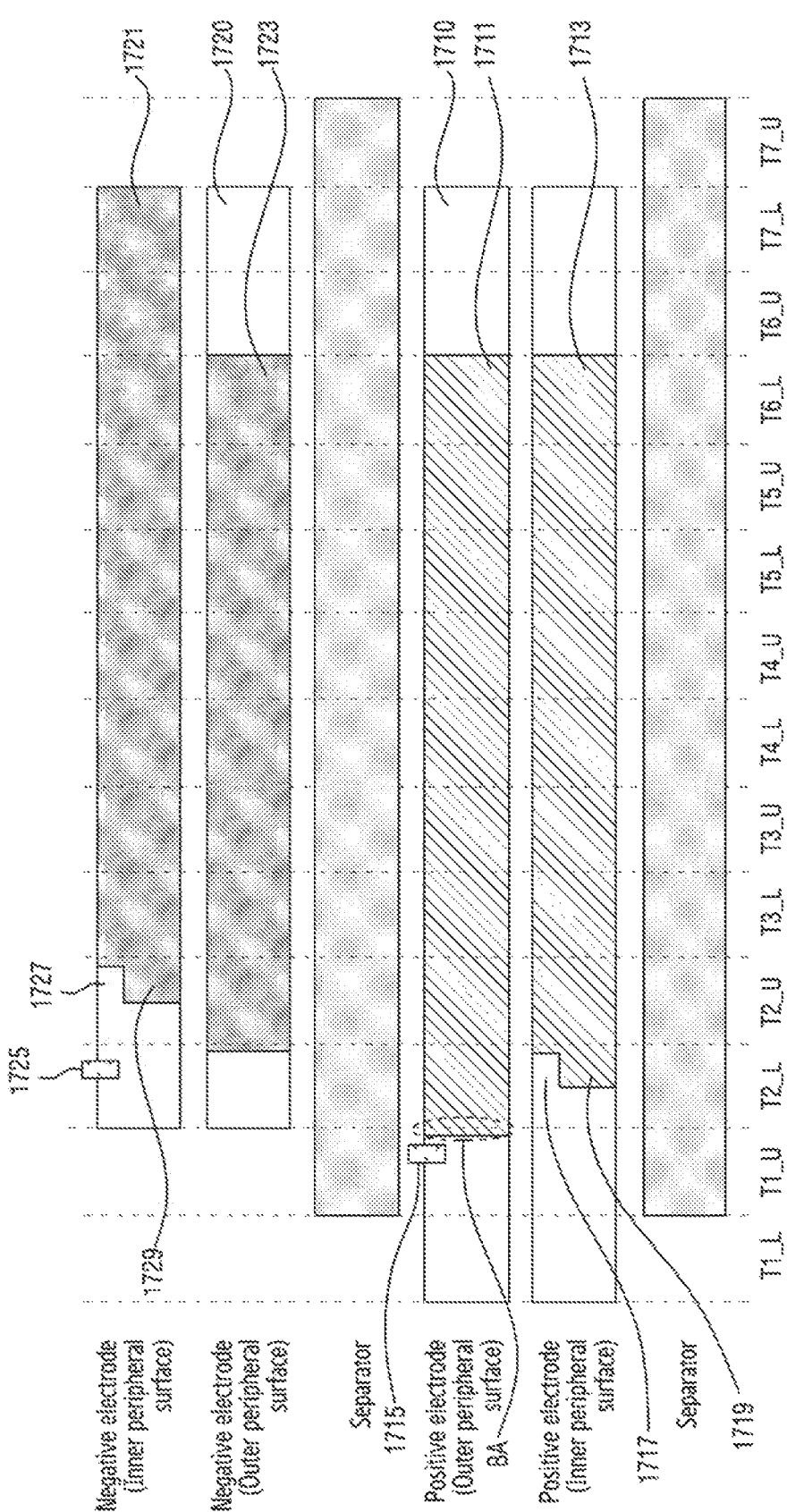
FIG. 17 is a view illustrating an arrangement structure of an electrode assembly according to a fourth embodiment.

FIG. 17 is a view illustrating an arrangement structure of an electrode assembly according to a fourth embodiment.

Referring to FIG. 17, in the electrode assembly (e.g., the electrode assembly 110 in FIG. 1A or FIG. 1B) according to the fourth embodiment, the positive electrode substrate 1710 and the negative electrode substrate 1720 may be configured in a normal type.

For example, the structure of the positive electrode substrate 1710 may differ from the positive electrode substrate 1610 illustrated in FIG. 16 in the shape of the positive uncoated region on the inner peripheral surface of the positive electrode substrate 1710. For example, a first positive active material 1711 may be applied to the outer peripheral surface of the positive electrode substrate 1710, wherein the first positive active material 1711 may be applied only to a portion before the region to which the positive electrode tab 1715 is attached, so that a positive uncoated region may be provided at the end of the outer peripheral surface adjacent to the positive electrode tab 1715. According to an embodiment, the first positive active material 1711 application region may extend to the bending region BA adjacent to the positive electrode tab 1715.

Alternatively, a second positive active material 1713 may be applied to the inner peripheral surface of the positive electrode substrate 1710, wherein the second positive active material 1713 may be applied only to a portion before the region to which the positive electrode tab 1715 is attached, so that a positive uncoated region may be provided at the end of the inner peripheral surface adjacent to the positive electrode tab 1715. According to an embodiment, on the inner peripheral surface of the positive electrode substrate 1710, a positive uncoated region to which the second positive active material 1713 is not applied is provided in a first region 1717 overlapping the negative electrode tab 1725, and the second positive active material 1713 may be applied to the second region 1719 adjacent to the first region 1717 in the width direction (the vertical direction in the drawing) of the positive electrode substrate 1710. That is, in the first and second regions 1717 and 1719, the second positive active material 1713 may be applied in a form having a step.

Alternatively, in another embodiment of the disclosure, the second positive active material 1713 may not be applied to the first and second regions 1717 and 1719. However, in another embodiment of the disclosure, in order to increase the charging capacity, the second positive active material 1713 may be applied to extend up to the boundary region between the first and second regions 1717 and 1719. Accordingly, the second positive active material 1713 may extend while covering a bending region adjacent to the first and second regions 1717 and 1719 (e.g., a region located between the second turn lower region T2_L and the second turn upper region T2_U).

The structure of the negative electrode substrate 1720 may differ from the negative electrode substrate 1620 illustrated in FIG. 16 in the shape of the negative uncoated region on the inner peripheral surface of the negative electrode substrate 1720. For example, a first negative active material 1721 may be applied to the inner peripheral surface of the negative electrode substrate 1720, wherein the first negative active material 1721 may be applied only to a portion before the region to which the negative electrode tab 1725 is attached, so that a negative uncoated region may be provided at the end of the inner peripheral surface adjacent to the negative electrode tab 1725. According to an embodiment, on the inner peripheral surface of the negative electrode substrate 1720, a negative uncoated region to which the first negative active material 1721 is not applied is provided in a third region 1727 overlapping the positive electrode tab 1715, and the first negative active material 1721 may be applied to the fourth region 1729 adjacent to the third region 1727 in the width direction (the vertical direction in the drawing) of the negative electrode substrate 1720. That is, in the third and fourth regions 1727,1729 the first negative active material 1723 may be applied in a form having a step.

Alternatively, in another embodiment of the disclosure, the first negative active material 1721 may not be applied to the third and fourth regions 1727 and 1729. However, in another embodiment of the disclosure, in order to increase the charging capacity, the first negative active material 1721 may be applied to extend up to the boundary region between the third and fourth regions 1727 and 1729. Accordingly, the first negative active material 1721 may extend while covering a bending region adjacent to the third and fourth regions 1727 and 1729 (e.g., a region located between the second turn upper region T2_U and the third turn lower region T3_L).

A second negative active material 1723 may be applied to the outer peripheral surface of the negative electrode substrate 1720, wherein the second negative active material 1723 may be applied only to a portion before the region to which the negative electrode tab 1725 is attached, so that a negative uncoated region may be provided at the end of the inner peripheral surface adjacent to the negative electrode tab 1725.

In various embodiments, in the negative electrode substrate (e.g., the negative electrode substrate 420 in FIG. 11), due to the negative uncoated region 1727, a predetermined thickness (e.g., the thickness corresponding to the thickness of the negative active material 421 or 423) difference may occur between the negative uncoated region 1727 and the region which surrounds the negative uncoated region 1727 and to which the negative active material (e.g., the negative active material 421 or 423 in FIG. 11) is applied. In various embodiments, the negative electrode substrate 420 may include an insulating layer (e.g., the insulating layers 441 to 443 in FIGS. 4B to 4E) to compensate for the thickness difference occurring due to the negative uncoated region 1727.

Figure 18:
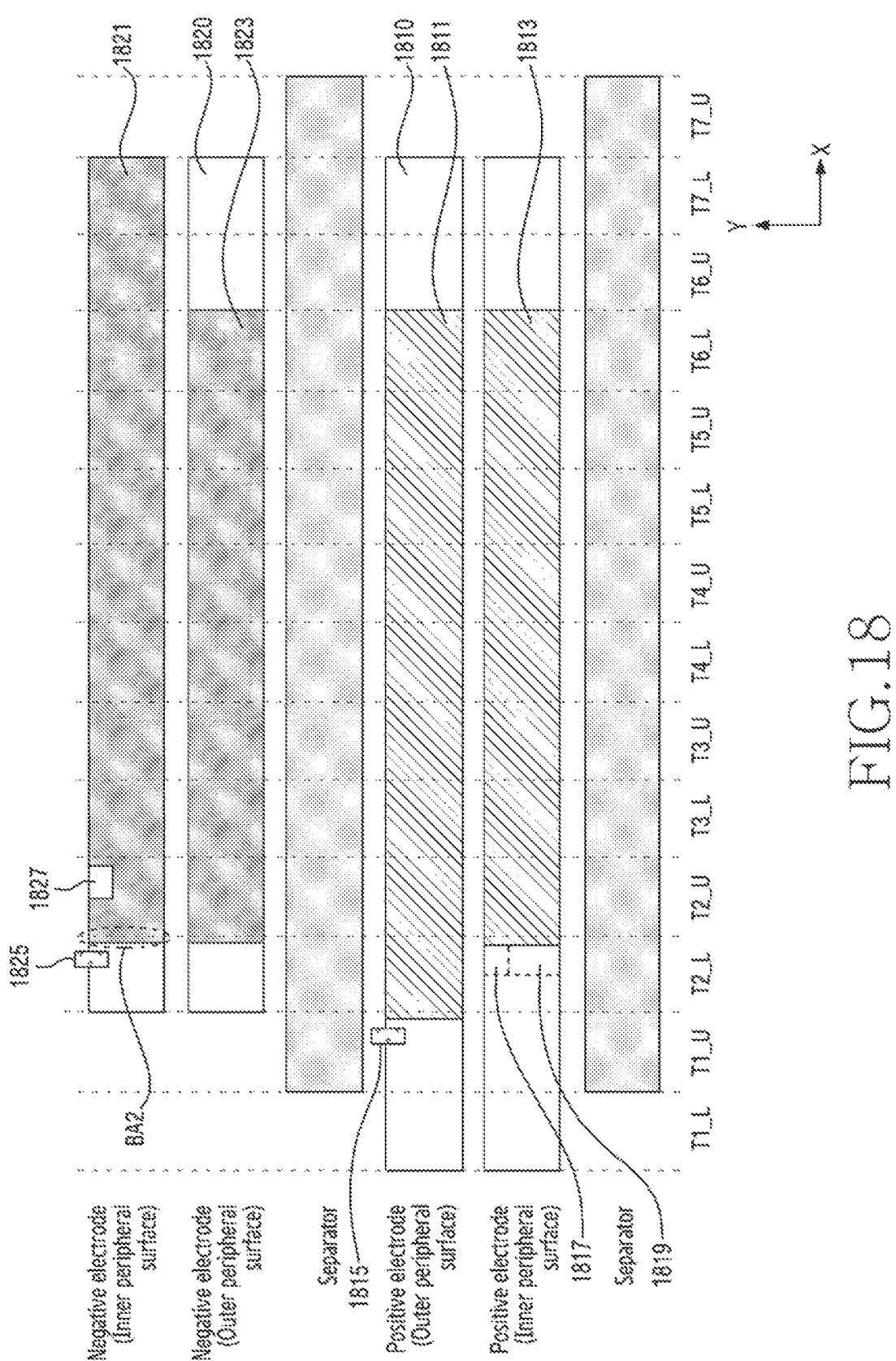
FIG. 18 is a view illustrating an arrangement structure of an electrode assembly according to a fifth embodiment.

FIG. 18 is a view illustrating an arrangement structure of an electrode assembly according to a fifth embodiment.

Referring to FIG. 18, in the electrode assembly (e.g., the electrode assembly 110 in FIG. 1A or FIG. 1B) according to the fifth embodiment, the positive electrode substrate 1810 and the negative electrode substrate 1820 may be configured in a normal type.

For example, the structure of the positive electrode substrate 1810 may differ from the positive electrode substrate 1710 illustrated in FIG. 17 in the shape of the positive active material 1811 application region on the inner peripheral surface of the positive electrode substrate 1710. For example, a first positive active material 1811 may be applied to the outer peripheral surface of the positive electrode substrate 1810, wherein the first positive active material 1811 may be applied only to a portion before the region to which the positive electrode tab 1815 is attached, so that a positive uncoated region may be provided at the end of the outer peripheral surface adjacent to the positive electrode tab 1815.

Alternatively, a second positive active material 1813 may be applied to the inner peripheral surface of the positive electrode substrate 1810, wherein the second positive active material 1813 may be applied only to a portion before the region to which the positive electrode tab 1815 is attached, so that a positive uncoated region may be provided at the end of the inner peripheral surface adjacent to the positive electrode tab 1815. According to an embodiment, on the inner peripheral surface of the positive electrode substrate 1810, a positive uncoated region may be provided in a first region 1817 overlapping the negative electrode tab 1825 and a second region 1819 adjacent to the first region 1817 in the width direction of the positive electrode substrate 1810 (the vertical direction in the drawing).

Additionally, a first negative active material 1821 may be applied to the inner peripheral surface of the negative electrode substrate 1820, wherein the first negative active material 1821 may be applied only to a portion before the region to which the negative electrode tab 1825 is attached, so that a negative uncoated region may be provided at the end of the inner peripheral surface adjacent to the negative electrode tab 1825. According to an embodiment, on the inner peripheral surface of the negative electrode substrate 1820, a negative uncoated region to which the first negative active material 1823 is not applied may be provided in a third region 1827 overlapping the positive electrode tab 1815.

Alternatively, a second negative active material 1823 may be applied to the outer peripheral surface of the negative electrode substrate 1820, wherein the second negative active material 1823 may be applied only to a portion before the region to which the negative electrode tab 1825 is attached, so that a negative uncoated region may be provided at the end of the inner peripheral surface adjacent to the negative electrode tab 1825.

In various embodiments, in the negative electrode substrate (e.g., the negative electrode substrate 420 in FIG. 11), due to the negative uncoated region 1827, a predetermined thickness (e.g., the thickness corresponding to the thickness of the negative active material 421 or 423) difference may occur between the negative uncoated region 1827 and the region which surrounds the negative uncoated region 1827 and to which the negative active material (e.g., the negative active material 421 or 423 in FIG. 11) is applied. In various embodiments, the negative electrode substrate 420 may include an insulating layer (e.g., the insulating layers 441 to 443 in FIGS. 4B to 4E) to compensate for the thickness difference occurring due to the negative uncoated region 1827.

Figure 19A:
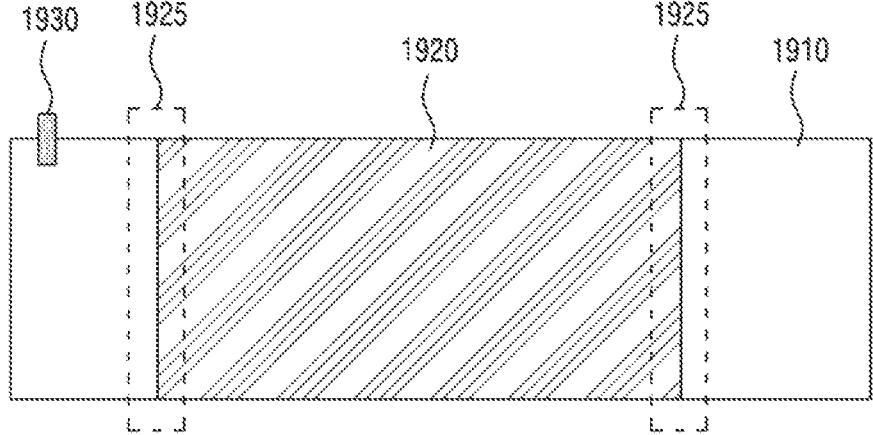
FIG. 19A is a view schematically illustrating an assembly process of a battery according to an embodiment.
Figure 19B:
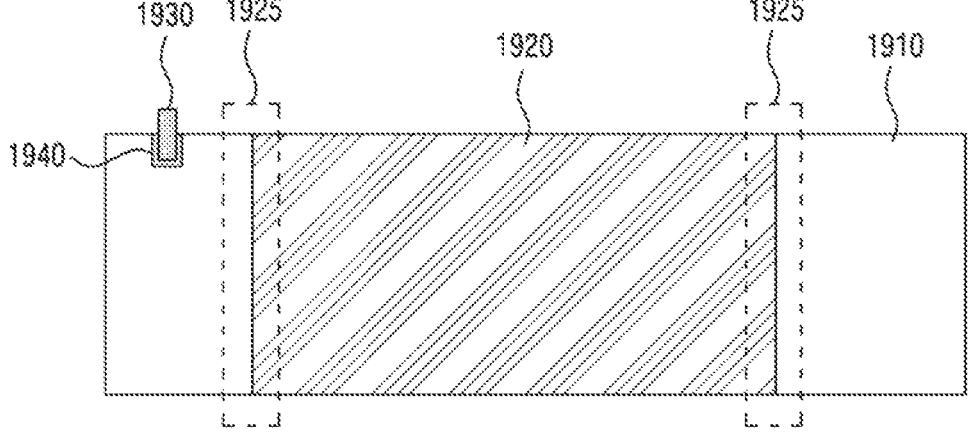
FIG. 19B is a view schematically illustrating an assembly process of a battery according to an embodiment.
Figure 19C:
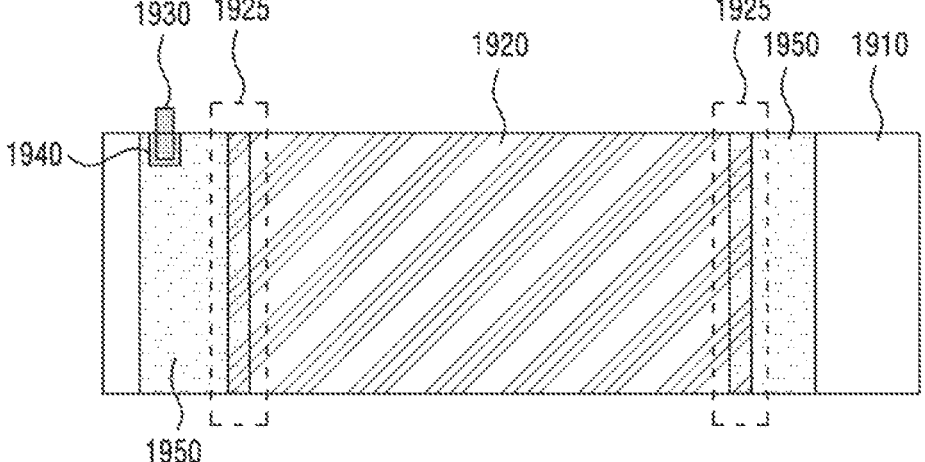
FIG. 19C is a view schematically illustrating an assembly process of a battery according to an embodiment.

FIG. 19A is a view schematically illustrating an assembly process of a battery according to an embodiment. FIG. 19B is a view schematically illustrating the assembly process of the battery according to an embodiment. FIG. 19C is a view schematically illustrating the assembly process of the battery according to an embodiment.

For example, FIGS. 19A to 19C may be views sequentially illustrating an insulating tape attaching process according to an embodiment.

A conventional assembly process may include a process of attaching an insulating tape in order to prevent an active material 1920 from falling off from a boundary region 1925 of the active material 1920 coated on a substrate 1910, and to prevent the electrode tab from coming into contact with an active material of different polarity.

The process of attaching an insulating tape of a battery according to an embodiment may include a first process of attaching a first insulating tape (e.g., the insulating tape 417 or 427) to cover the electrode tab, and a process of attaching a second insulating tape to cover the electrode tab and a boundary region.

For example, as illustrated in FIG. 19A, the active material 1920 (e.g., the positive active material 411 or 413 or the negative active material 421 or 423) is provided on the substrate 1910 (e.g., the positive electrode substrate 410 or the negative electrode substrate 420), and a process of providing an electrode tab 1930 (e.g., the positive electrode tab 415 or the negative electrode tab 425) may be executed, so that a substrate 1910 including the electrode tab 1930 and the active material 1920 may be provided.

Subsequently, as illustrated in FIG. 19B, a process of enclosing the electrode tab 1930 and an attachment area to which the electrode tab is attached by using the first insulating tape 1940 (e.g., a process of enclosing the attachment region 311) may be executed.

Subsequently, as illustrated in FIG. 19C, a process of attaching the second insulating tape 1950 to cover both the electrode tab 1930 and the boundary region 1925 may be executed.

According to various embodiments, the process of attaching the insulating tape of the battery may include a first process of attaching the first insulating tape to cover the electrode tab, and a second process of attaching the second insulating tape to cover the electrode tab and the boundary region 1925, whereby the insulating tape covering the electrode tab may be provided in a double structure. According to an embodiment of the disclosure, by covering the electrode tab in the double structure, it is possible to prevent ignition or explosion that may occur when a portion of an active material comes into contact with the electrode tab.

Figure 20:
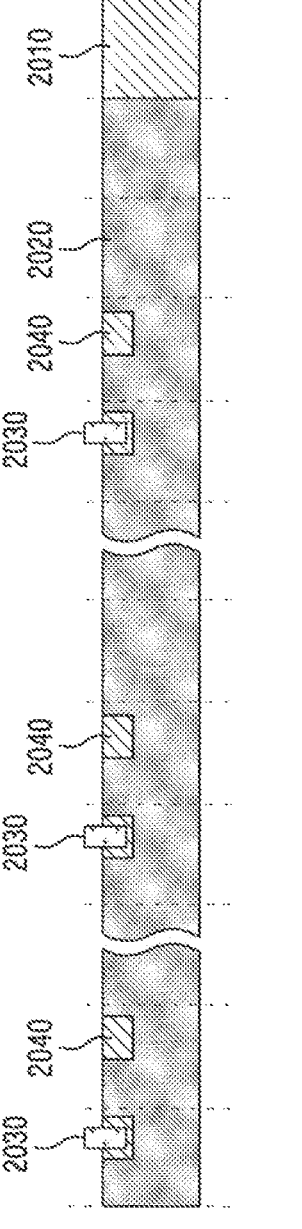
FIG. 20 is a view illustrating one surface of a positive electrode substrate or a negative electrode substrate according to an embodiment in an unwound state.

FIG. 20 is a view illustrating one surface of a positive electrode substrate or a negative electrode substrate according to an embodiment in an unwound state.

Referring to FIG. 20, an electrode plate 2010 (e.g., the positive electrode substrate 410 in FIG. 4 or a negative electrode substrate (e.g., the negative electrode substrate 420 in FIG. 4)) according to an embodiment may include a plurality of electrode tabs 2030 (e.g., the positive electrode tab 415 or the negative electrode tab 425 in FIG. 4). In an embodiment, the plurality of electrode tabs 2030 may be disposed at a predetermined interval.

In an embodiment, the electrode plate 2010 may include a plurality of different electrode plates 2010. In an embodiment, to correspond to a region overlapping a plurality of electrode tabs 2030 (the positive electrode tab 415 or the negative electrode tab 425) attached to any one of the plurality of electrode plates 2010 (the positive electrode substrate 410 or the negative electrode substrate 420), another electrode plate 2010 (the positive electrode substrate 410 or the negative electrode plate 420) among the plurality of electrode plates 2010 may be provided with a plurality of uncoated regions 2040 (e.g., the positive uncoated regions 419a and 419b or the negative uncoated regions 429a and 429b.

In an embodiment, the electrode plate 2010 may be disposed to be wound from a region corresponding to the second turn region T2, and electrode tabs 2030 may be attached to the inner peripheral surface to correspond to the second turn lower region T2_L. For example, in the region to which the electrode tabs 2030 are attached in the second turn lower region T2_L and the region facing the other tabs (e.g., the positive electrode tab 415 or the negative electrode tab 425) in the second turn upper region T2_U, the inner peripheral surface of the electrode plate 2010 may be provided with uncoated regions 2040, and the remaining regions of the inner peripheral surface of the electrode plate 2010 may be applied with active materials (positive active materials 411 and 413 or negative active materials 421 and 423). On the outer peripheral surface of the electrode plate 2010, uncoated regions 2040 may be provided in partial regions overlapping other electrode tabs (the positive electrode tab 415 or the negative electrode tab 425) in the second turn lower region T2_L, and the remaining regions may be applied with active materials (positive active materials 411 and 413 or negative active materials 421 and 423).

In various embodiments, in the electrode plate 2010, due to the uncoated regions 2040, a predetermined thickness (the thickness corresponding to the thickness of the active materials) difference may occur between the uncoated regions 2040 and the regions which surround the uncoated regions 2040 and to which the active materials (the positive active materials 411 and 413 or the negative active materials 421 and 423) are applied. In various embodiments, the electrode substrate 2010 may include insulating layers (e.g., the insulating layers 441 to 443 in FIGS. 4B to 4E) to compensate for the thickness difference occurring due to the uncoated regions 2040.

Figure 21:
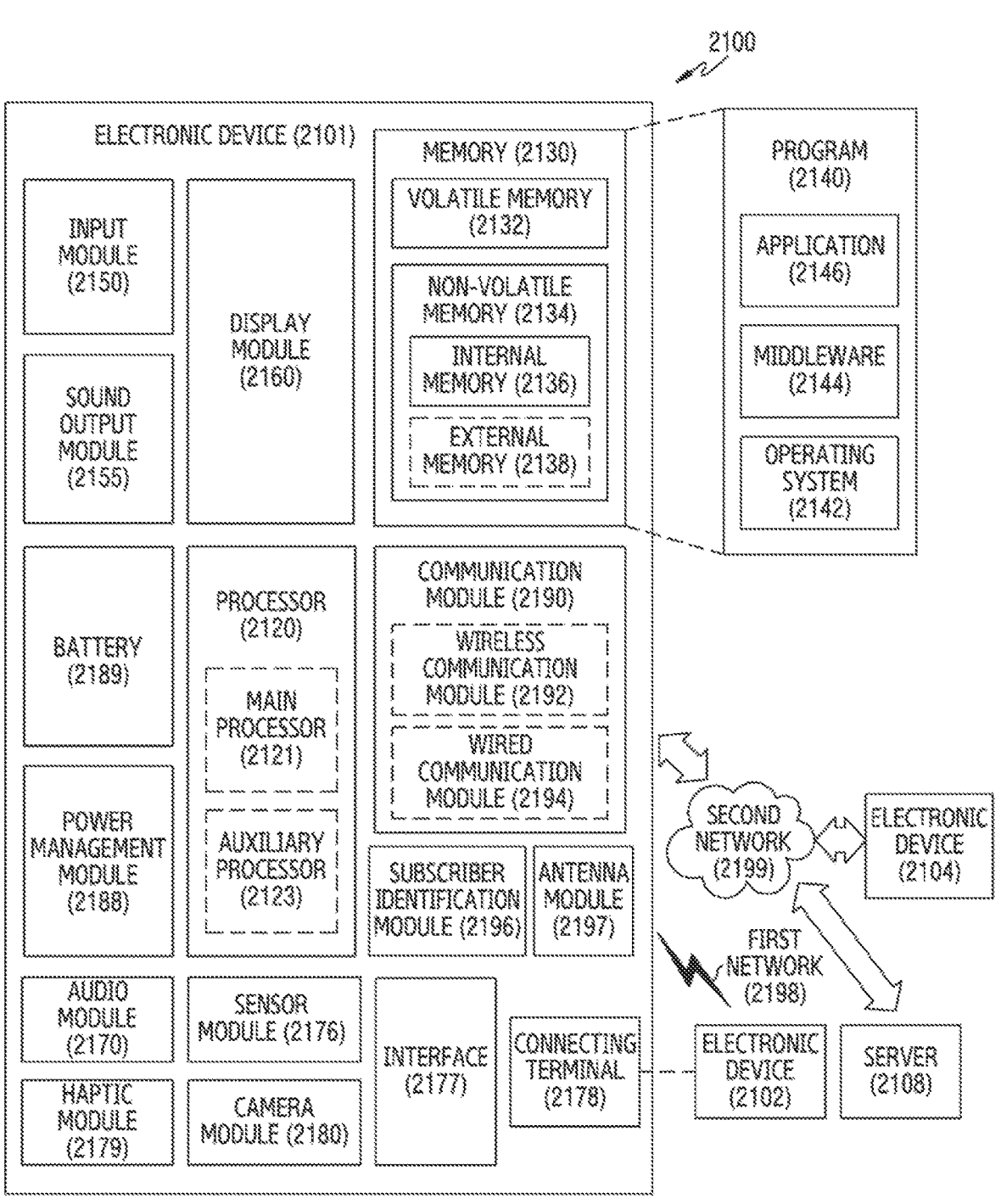
FIG. 21 is a view illustrating an electronic device according to an embodiment within a network environment.

FIG. 21 is a block diagram illustrating an electronic device 2101 in a network environment 2100 according to various embodiments.

Referring to FIG. 21, the electronic device 2101 in the network environment 2100 that may communicate with an electronic device 2102 via a first network 2198 (e.g., a short-range wireless communication network), or at least one of an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input module 2150, a sound output module 2155, a display module 2160, an audio module 2170, a sensor module 2176, an interface 2177, a connecting terminal 2178, a haptic module 2179, a camera module 2180, a power management module 2188, a battery 2189, a communication module 2190, a subscriber identification module (SIM) 2196, or an antenna module 2197. In some embodiments, at least one of the components (e.g., the connecting terminal 2178) may be omitted from the electronic device 2101, or one or more other components may be added in the electronic device 2101. In some embodiments, some of the components (e.g., the sensor module 2176, the camera module 2180, or the antenna module 2197) may be implemented as a single component (e.g., the display module 2160).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may store a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), or an auxiliary processor 2123 (e.g., a graphics processing unit (GPU), a neural processing unit (NPU), an image signal processor (ISP), a sensor hub processor, or a communication processor (CP)) that is operable independently from, or in conjunction with, the main processor 2121. For example, when the electronic device 2101 includes the main processor 2121 and the auxiliary processor 2123, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display module 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123. According to an embodiment, the auxiliary processor 2123 (e.g., the neural processing unit) may include a hardware structure specified for artificial intelligence model processing. An artificial intelligence model may be generated by machine learning. Such learning may be performed, e.g., by the electronic device 2101 where the artificial intelligence is performed or via a separate server (e.g., the server 2108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2130 may store various data used by at least one component (e.g., the processor 2120 or the sensor module 2176) of the electronic device 2101. The various data may include, for example, software (e.g., the program 2140) and input data or output data for a command related thererto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input module 2150 may receive a command or data to be used by another component (e.g., the processor 2120) of the electronic device 2101, from the outside (e.g., a user) of the electronic device 2101. The input module 2150 may include, for example, a microphone, a mouse, a keyboard, a key (e.g., a button), or a digital pen (e.g., a stylus pen).

The sound output module 2155 may output sound signals to the outside of the electronic device 2101. The sound output module 2155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2160 may visually provide information to the outside (e.g., a user) of the electronic device 2101. The display module 2160 may include, for example, a display, a hologram device, or a projector and control circuitry to control a corresponding one of the display, hologram device, and projector. According to an embodiment, the display module 2160 may include a touch sensor adapted to detect a touch, or a pressure sensor adapted to measure the intensity of force incurred by the touch.

The audio module 2170 may convert a sound into an electrical signal and vice versa. According to an embodiment, the audio module 2170 may obtain the sound via the input module 2150, or output the sound via the sound output module 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The wireless communication module 2192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2192 may support a high-frequency band (e.g., the mmWave band) to achieve, e.g., a high data transmission rate. The wireless communication module 2192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2192 may support various requirements specified in the electronic device 2101, an external electronic device (e.g., the electronic device 2104), or a network system (e.g., the second network 2199). According to an embodiment, the wireless communication module 2192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., a printed circuit board (PCB)). According to an embodiment, the antenna module 2197 may include a plurality of antennas (e.g., array antennas). In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

According to various embodiments, the antenna module 2197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 or 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, mobile edge computing (MEC), or client-server computing technology may be used, for example. The electronic device 2101 may provide ultra low-latency services using, e.g., distributed computing or mobile edge computing. In another embodiment, the external electronic device 2104 may include an internet-of-things (IoT) device. The server 2108 may be an intelligent server using machine learning and/or a neural network. According to an embodiment, the external electronic device 2104 or the server 2108 may be included in the second network 2199. The electronic device 2101 may be applied to intelligent services (e.g., smart home, smart city, smart car, or healthcare) based on 5G communication technology or IoT-related technology.

According to various embodiments, the battery (e.g., the battery 100 in FIG. 1A) may include: a positive electrode (e.g., the positive electrode 112 in FIG. 1A) including a positive electrode substrate (e.g., the positive electrode substrate 420 in FIG. 4B), a positive active material (e.g., the second positive active material 413 in FIG. 4B) applied to one surface of the positive electrode substrate 420, and a positive electrode tab (e.g., the positive electrode tab 415) attached to the one surface of the positive electrode substrate 420; a negative electrode (e.g., the negative electrode 114 in FIG. 1A) including a negative electrode substrate (e.g., the negative electrode substrate 420 in FIG. 4B), a negative active material (e.g., the first negative active material 421 in FIG. 4B) applied to one surface of the negative electrode substrate 420 (e.g., the first negative active material 421 in FIG. 4B), and a negative electrode tab (e.g., the negative electrode tab 425 in FIG. 4A) attached to the one surface of the negative electrode substrate 420; and a separator (e.g., the separator 430 of FIG. 4B) located between the positive electrode 112 and the negative electrode 114. In the one surface of the negative electrode substrate 420, a first region (e.g., the negative uncoated region 429b in FIG. 4B) facing the positive electrode tab 415 may include a region to which the negative active material 421 is not applied, and in the one surface of the negative electrode substrate 420, a second region (e.g., the second region 312b in FIG. 3) adjacent to the first region 429b in the longitudinal direction of the positive electrode tab 415 may include a region to which the negative active material 421 is applied. The negative electrode 114 may include an insulating layer (e.g., the insulating layer 440 in FIG. 4A) disposed in at least a portion of the first region 429b.

According to various embodiments, the insulating layer 440 may include a first insulating layer (e.g., the first insulating layer 441 in FIG. 4B) disposed from the first region 429b to a peripheral region of the second region 312b within a predetermined range from the first region 429b.

According to various embodiments, the insulating layer 440 may include a second insulating layer (e.g., the second insulating layer 442 in FIG. 4D) disposed in the first region 429b.

According to various embodiments, the insulating layer 440 may include a third insulating layer (e.g., the third insulating layer 443 in FIG. 4E) disposed up to a peripheral region of the second region 312b within a predetermined range from the first region 429 to cover the first region 429b in which the second insulating layer 442 is disposed. 429b.

According to various embodiments, the insulating layer 440 may be made of an insulative material.

According to various embodiments, the insulating layer 440 may have a thickness corresponding to the thickness of the negative active material (e.g., the first negative active material 421 in FIGS. 4B to 4E) surrounding the first region 429b.

According to various embodiments, an end of the positive electrode substrate 410 in one direction and an end of the negative electrode substrate 420 in one direction may be non-overlappedly arranged.

According to various embodiments, the battery 100 may include a plurality of turn regions including a first turn region (e.g., the first turn region T1 in FIG. 4A) and a second turn region (e.g., the second turn region T2 in FIG. 4A) in which the positive electrode substrate 410, the separator 430, and the negative electrode substrate 420 are wound in a jelly-roll type.

According to various embodiments, the negative electrode substrate 420 may be provided with the first region 429 to which the negative active material 421 is not applied in another turn region adjacent to a turn region in which the positive electrode tab 415 is disposed among the plurality of turn regions.

According to various embodiments, in a surface opposite to the one surface of the negative electrode substrate 420, the negative active material 421 may not applied to a region corresponding to the first region 429b.

According to various embodiments, wherein, in the one surface of the positive electrode substrate 410, a third region (e.g., the positive uncoated region 419b in FIG. 4D) facing the negative tab 425 may include a region to which the positive active material 413 is not applied, in the one surface of the negative electrode substrate 410, a fourth region (e.g., the fourth region 1727 in FIG. 17) adjacent to the third region 419b in the longitudinal direction of the negative electrode tab 425 may include a region to which the positive active material 413 is applied, and the positive electrode 112 may include an insulating layer 440 disposed in at least a portion of the third region 419b.

According to various embodiments, the positive electrode substrate 410 may be provided with the third region 419b to which the positive active material 413 is not applied in another turn region adjacent to a turn region in which the negative electrode tab 425 is disposed among the plurality of turn regions.

According to various embodiments, an electronic device (e.g., the electronic device 2101 in FIG. 21) may include: a memory (e.g., the memory 2130 of FIG. 21); a processor (e.g., processor 2120 of FIG. 21); and a battery 100 configured to supply power to the memory 2130 and the processor 2120. The battery 100 may include: a positive electrode 112 including a positive electrode substrate 410, a positive active material 413 applied to one surface of the positive electrode substrate 410, and a positive electrode tab 415 attached to the one surface of the positive electrode substrate 410; a negative electrode 114 including a negative electrode substrate 420, a negative active material 421 applied to one surface of the negative electrode substrate 420, and a negative electrode tab 425 attached to the one surface of the negative electrode substrate 420; and a separator 430 located between the positive electrode 112 and the negative electrode 114. In the one surface of the negative electrode substrate 420, a first region 429*b* facing the positive electrode tab 415 may include a region to which the negative active material 421 is not applied, and in the one surface of the negative electrode substrate 420, a second region 312*b* adjacent to the first region 429*b* in the longitudinal direction of the positive electrode tab 415 may include a region to which the negative active material 421 is applied. The negative electrode 114 includes an insulating layer 440 disposed in at least a portion of the first region 429*b*.

According to various embodiments, the insulating layer 440 may include a first insulating layer 441 disposed from the first region 429*b* up to a peripheral region of the second region 312*b* within a predetermined range from the first region 429*b*.

According to various embodiments, the insulating layer 440 may include a second insulating layer 442 disposed in the first region 429*b*.

According to various embodiments, the insulating layer 440 may include a third insulating layer 443 disposed up to the peripheral region of the second region 312*b* within the predetermined range from the first region 429*b* to cover the first region 429*b* in which the second insulating layer 442 is disposed.

According to various embodiments, the insulating layer 440 may be made of an insulative material.

According to various embodiments, the insulating layer 440 may have a thickness corresponding to the thickness of the negative active material 421 surrounding the first region 429*b*.

According to various embodiments, in the one surface of the positive electrode substrate 410, a third region 419*b* facing the negative electrode tab 425 may include a region to which the positive active material 413 is not applied, in the one surface of the positive electrode substrate 410, a fourth region 1727 adjacent to the third region 419*b* in the longitudinal direction of the negative electrode tab 425 may include a region to which the positive active material 413 is applied, and the positive electrode tab 112 may include an insulating layer 440 disposed in at least a portion of the third region 419*b*.

According to various embodiments, the positive electrode substrate 410 may be provided with the third region 419*b* to which the positive active material 413 is not applied in another turn region adjacent to a turn region in which the negative electrode tab 425 is disposed among the plurality of turn regions.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A battery comprising:
a positive electrode comprising a positive electrode substrate having a first surface and a second surface, a positive active material applied to the first surface of the positive electrode substrate, and a positive electrode tab attached to the first surface of the positive electrode substrate;
a negative electrode comprising a negative electrode substrate having a first surface and a second surface, a negative active material applied to the first surface of the negative electrode substrate, and a negative electrode tab attached to the first surface of the negative electrode substrate; and
a separator provided between the positive electrode and the negative electrode, wherein the first surface of the negative electrode substrate comprises a first region to which the negative active material is not applied and which faces the positive electrode tab,
wherein the first surface of the negative electrode substrate comprises a second region to which the negative active material is applied and which is adjacent to the first region in a longitudinal direction of the positive electrode tab, and
wherein the negative electrode comprises an insulating layer disposed in at least a portion of the first region.

2. The battery of claim 1, wherein the insulating layer comprises a first insulating layer disposed from the first region up to a peripheral region of the second region within a predetermined range from the first region.

3. The battery of claim 1, wherein the insulating layer comprises a second insulating layer disposed in the first region.

4. The battery of claim 1, wherein an end of the positive electrode substrate and an end of the negative electrode substrate do not overlap.

5. The battery of claim 1, further comprising:
a plurality of turn regions comprising a first turn region and a second turn region,
wherein the positive electrode substrate, the separator, and the negative electrode substrate are wound in a jelly-roll type configuration.

6. The battery of claim 5, wherein the first region to which the negative active material is not applied is disposed in a turn region, from among the plurality of turn regions, that is adjacent to a different turn region from among the plurality of turn regions, and
wherein the positive electrode tab is disposed in the different turn region.

7. The battery of claim 6, wherein on the second surface of the negative electrode substrate, the negative active material is not applied to a region corresponding to the first region.

8. An electronic device comprising:
the battery of claim 1;
a memory; and
a processor,
wherein the battery is configured to supply power to the memory and the processor.

* * * * *